(12) United States Patent
Kim

(10) Patent No.: US 10,470,538 B2
(45) Date of Patent: Nov. 12, 2019

(54) PORTABLE TERMINAL AND DISPLAY METHOD THEREOF

(71) Applicant: SAMSUNG ELECTRONICS CO., LTD., Suwon-si (KR)

(72) Inventor: Dae-myung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 14/751,285

(22) Filed: Jun. 26, 2015

(65) Prior Publication Data

US 2015/0378592 A1 Dec. 31, 2015

Related U.S. Application Data

(60) Provisional application No. 62/018,052, filed on Jun. 27, 2014.

(30) Foreign Application Priority Data

Sep. 2, 2014 (KR) .......................... 10-2014-0116511
Apr. 10, 2015 (KR) .......................... 10-2015-0050811

(51) Int. Cl.
*A45C 11/00* (2006.01)
*G06F 3/0482* (2013.01)
(Continued)

(52) U.S. Cl.
CPC ............ *A45C 11/00* (2013.01); *G06F 1/1626* (2013.01); *G06F 1/3265* (2013.01); *G06F 3/0482* (2013.01); *G06F 3/0487* (2013.01); *G06F 3/04886* (2013.01); *H04M 1/72527* (2013.01); *A45C 2011/002* (2013.01); *A45C 2011/003* (2013.01); *G06F 2200/1633* (2013.01); *G06F 2203/04803* (2013.01);
(Continued)

(58) Field of Classification Search
None
See application file for complete search history.

(56) References Cited

U.S. PATENT DOCUMENTS 7,010,333 B2 3/2006 Trively
8,364,208 B2 1/2013 Choi et al.
(Continued)

FOREIGN PATENT DOCUMENTS

CN 101971603 A 2/2011
CN 103385591 A 11/2013
(Continued)

OTHER PUBLICATIONS

Communication dated Oct. 26, 2015, issued by the European Patent Office in counterpart European Patent Application No. 15173660.0.
(Continued)

*Primary Examiner* — Stella Higgs
(74) *Attorney, Agent, or Firm* — Sughrue Mion, PLLC

(57) ABSTRACT

A portable terminal having a cover that includes a transparent region and a display method thereof are provided. The display method includes displaying a UI element on an exposed display region in a state that the display region is covered by a cover, and controlling the display region that corresponds to the transparent region in response to a user input for selecting the UI element.

8 Claims, 55 Drawing Sheets

(51) Int. Cl.
   *G06F 3/0487* (2013.01)
   *H04M 1/725* (2006.01)
   *G06F 3/0488* (2013.01)
   *G06F 1/16* (2006.01)
   *G06F 1/3234* (2019.01)

(52) U.S. Cl.
   CPC .... *H04M 1/72583* (2013.01); *H04M 2250/22* (2013.01); *Y02D 10/153* (2018.01)

(56) References Cited

U.S. PATENT DOCUMENTS

| | | | |
|---|---|---|---|
| 9,801,442 B2 | 10/2017 | Oh et al. | |
| 2002/0132634 A1 | 9/2002 | Hiltunen | |
| 2004/0176047 A1 | 9/2004 | Trively | |
| 2008/0292007 A1 | 11/2008 | Lida et al. | |
| 2010/0056222 A1* | 3/2010 | Choi | H04M 1/0245 455/566 |
| 2010/0122194 A1* | 5/2010 | Rogers | G06F 3/04817 715/769 |
| 2011/0151935 A1* | 6/2011 | Oksman | G06F 1/1624 455/566 |
| 2011/0279383 A1 | 11/2011 | Wilson et al. | |
| 2013/0109435 A1* | 5/2013 | McCaughey | H01Q 1/243 455/556.1 |
| 2013/0127918 A1 | 5/2013 | Kang et al. | |
| 2013/0176237 A1 | 7/2013 | Chu | |
| 2013/0300697 A1 | 11/2013 | Kim et al. | |
| 2013/0328917 A1* | 12/2013 | Zambetti | G06F 1/1626 345/620 |
| 2014/0128131 A1 | 5/2014 | Sin | |
| 2014/0370398 A1* | 12/2014 | Lee | H01M 4/5815 429/322 |
| 2014/0370938 A1* | 12/2014 | Lee | H04M 1/72583 455/566 |
| 2015/0138135 A1 | 5/2015 | Gan | |
| 2015/0155903 A1* | 6/2015 | Jang | H04B 1/3888 455/575.8 |
| 2015/0346899 A1* | 12/2015 | Jung | G06F 3/0416 345/173 |

FOREIGN PATENT DOCUMENTS

| | | |
|---|---|---|
| CN | 103637529 A | 3/2014 |
| CN | 103885544 A | 6/2014 |
| EP | 2728762 A2 | 5/2004 |
| EP | 2662746 A2 | 11/2013 |
| JP | 4367786 B2 | 11/2009 |
| JP | 2013-142904 A | 7/2013 |
| JP | 201493770 A | 5/2014 |
| KR | 10-2010-0027544 A | 3/2010 |
| KR | 1020130127050 A | 11/2013 |
| KR | 10-2014-0057462 A | 5/2014 |
| KR | 10-2014-0066064 A | 5/2014 |
| WO | 2009/009160 A1 | 1/2009 |

OTHER PUBLICATIONS

Communication dated Apr. 22, 2015, issued by the Korean Intellectual Property Office in counterpart Korean Application No. 10-2014-0116511, 8 pages in Korean and English.

Communication dated May 24, 2017, issued by the European Patent Office in counterpart European Patent Application No. 15173660.0.

Communication dated Aug. 31, 2017 by the Australian Patent Office in counterpart Australian Patent Application No. 2015280785.

Communication dated Dec. 19, 2017 by the Australian Patent Office in counterpart Australian Patent Application No. 2015280785.

Stewart Wolpin, "Motorola Krave ZN4 Review", Wayback Machine, Dec. 16, 2011, <URL:https://web.archive.org/web/20111216175803/https://www.digitaltrends.com/cell-phone-reviews/motorola-krave-zn4-review/>. (7 pages total).

Communication dated Mar. 16, 2018 by the Australian Intellectual Property Office in counterpart Australian Patent Application No. 2015280785.

Communication dated Jun. 12, 2018 by the Australian Intellectual Property Office in counterpart Australian Patent Application No. 2015280785.

Communication dated Dec. 10, 2018, issued by the Taiwanese Patent Office in counterpart Taiwanese Application No. 104119213.

Communication dated Aug. 2, 2018, issued by the Australian Intellectual Property Office in counterpart Australian Patent Application No. 2015280785.

Communication dated Aug. 27, 2018, issued by the Australian Intellectual Property Office in counterpart Australian Patent Application No. 2015280785.

Communication dated Jul. 10, 2019, issued by the State Intellectual Property Office of P.R. China in counterpart Chinese Patent Application No. 201510363436.1.

Communication dated Aug. 9, 2019 issued by the Korean Intellectual Property Office in counterpart Korean Patent Application No. 10-2015-0050811.

\* cited by examiner

FIG. 3E
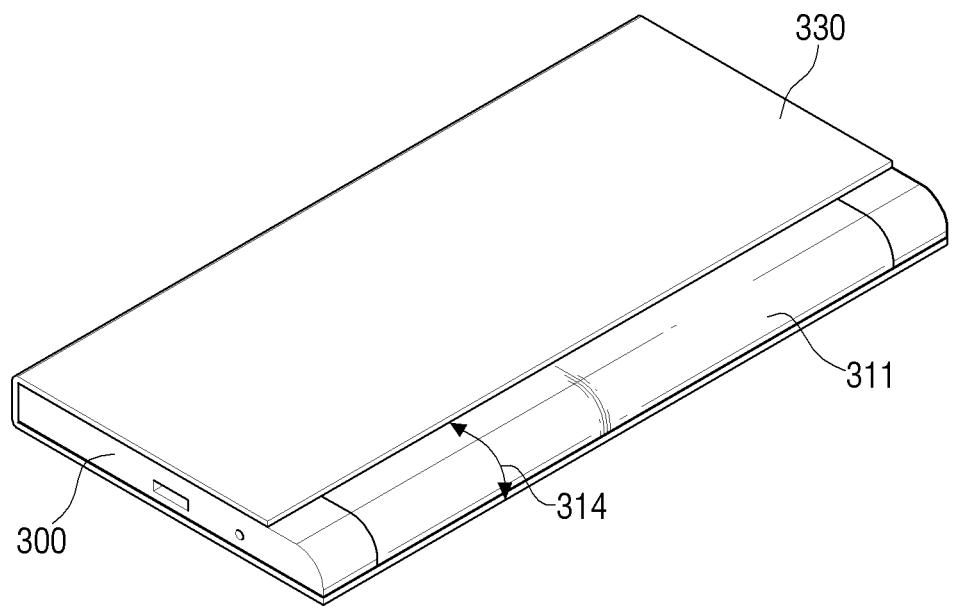
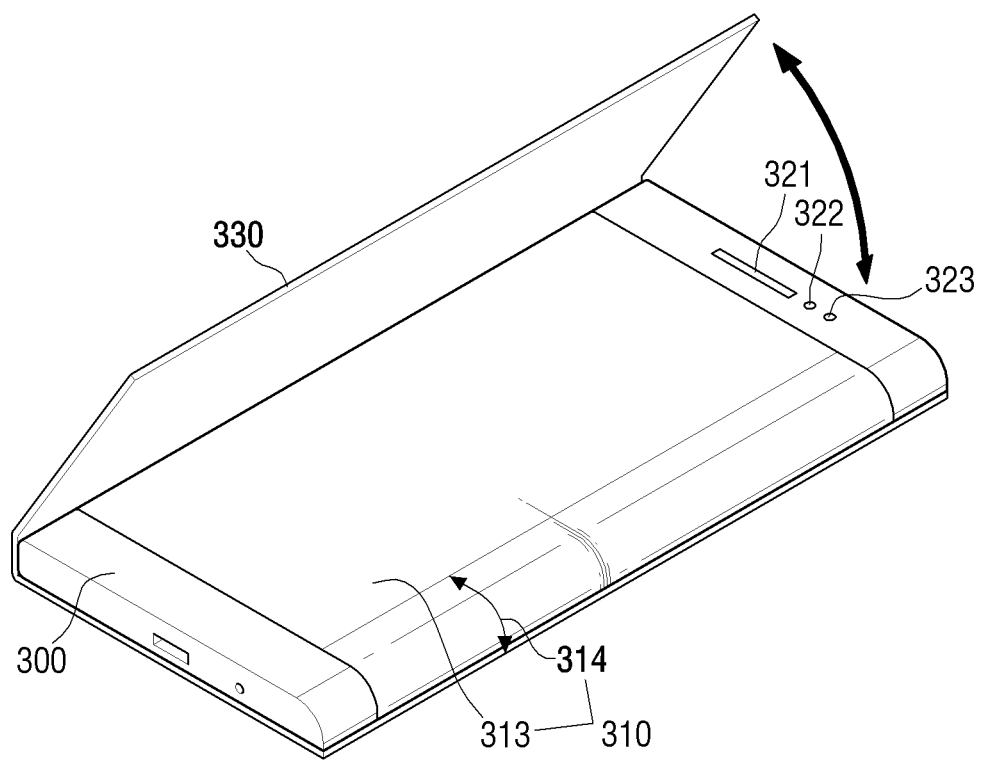

FIG. 3F
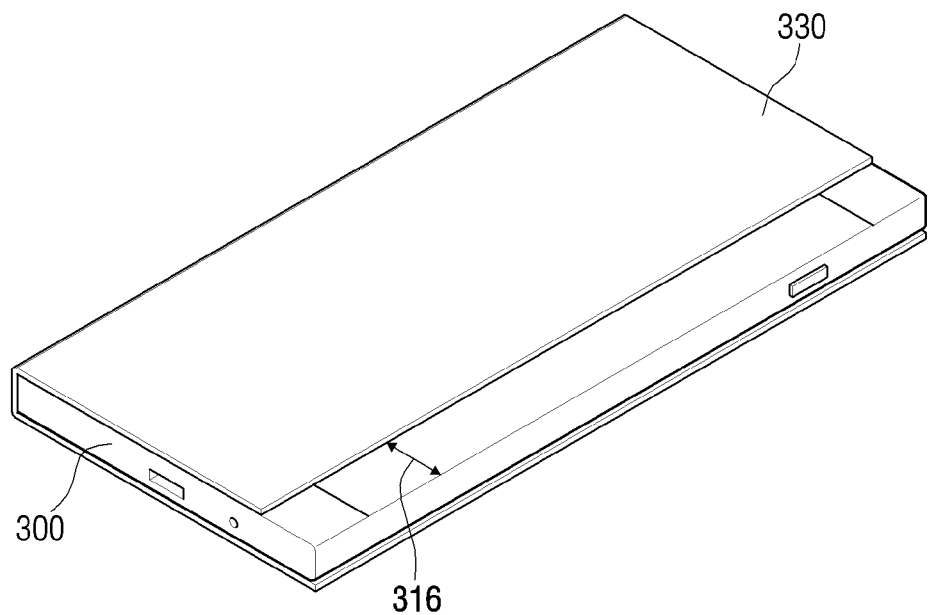
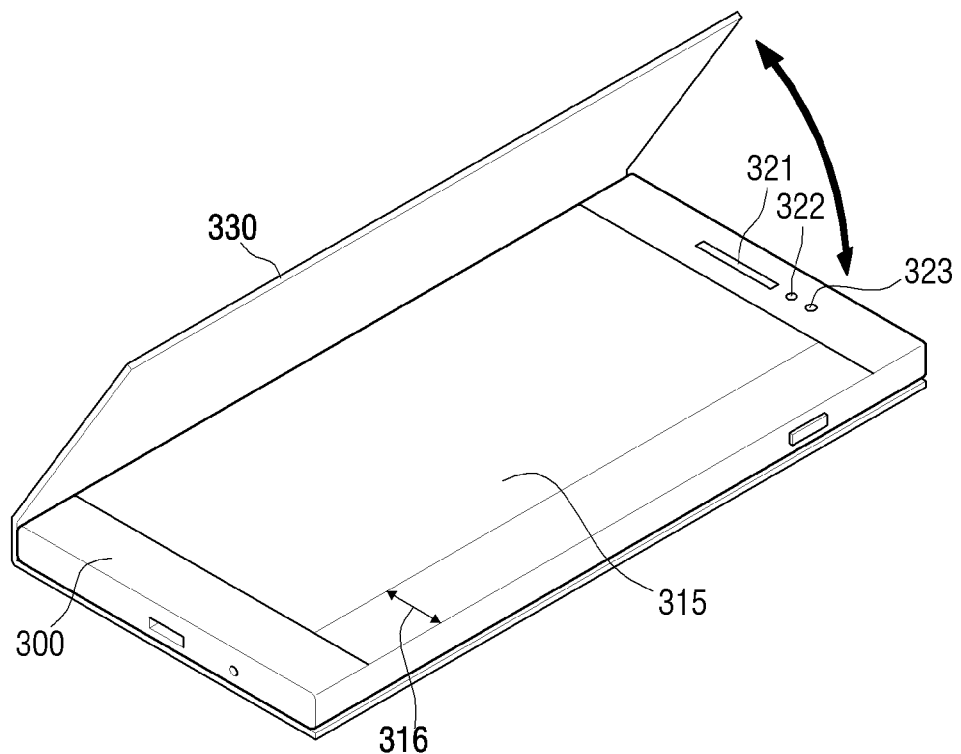

FIG. 6A
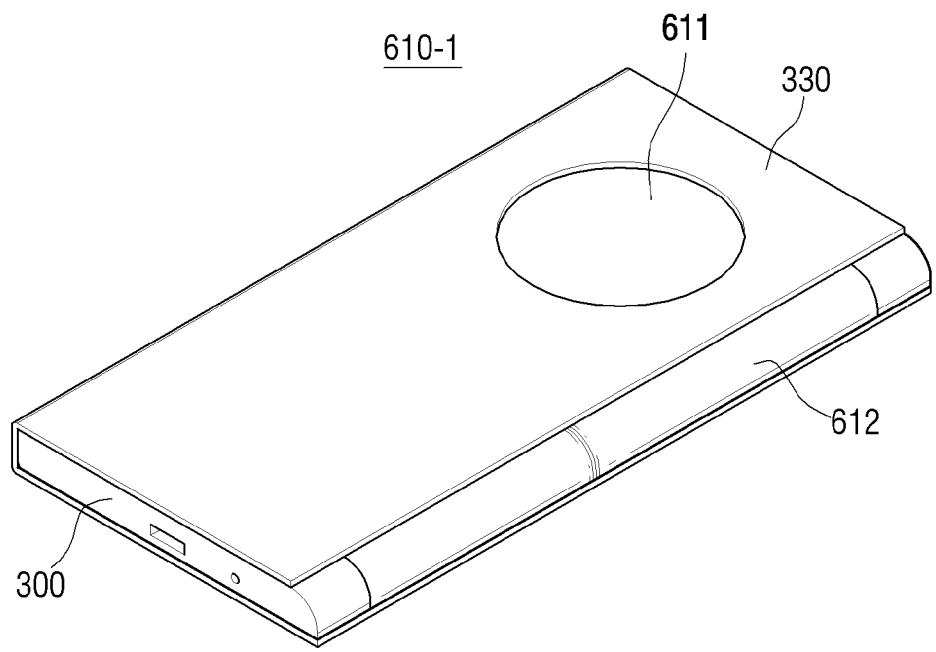
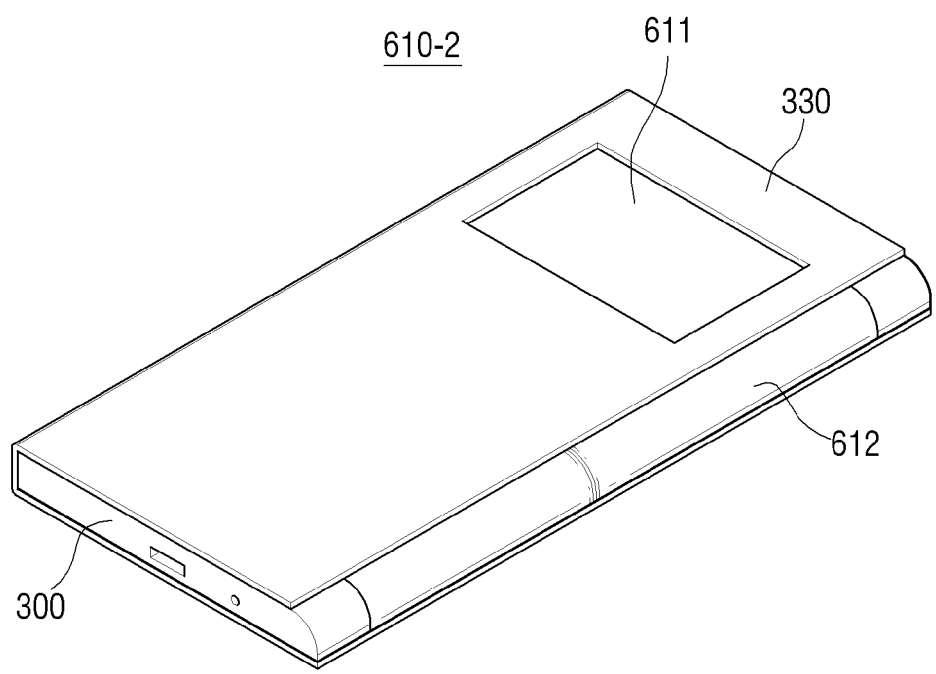

FIG. 6B
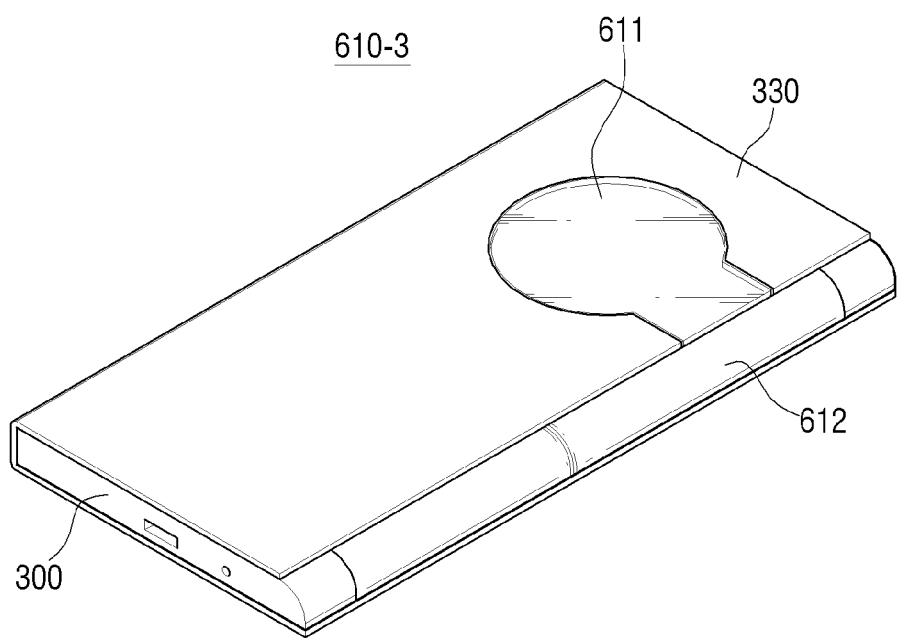
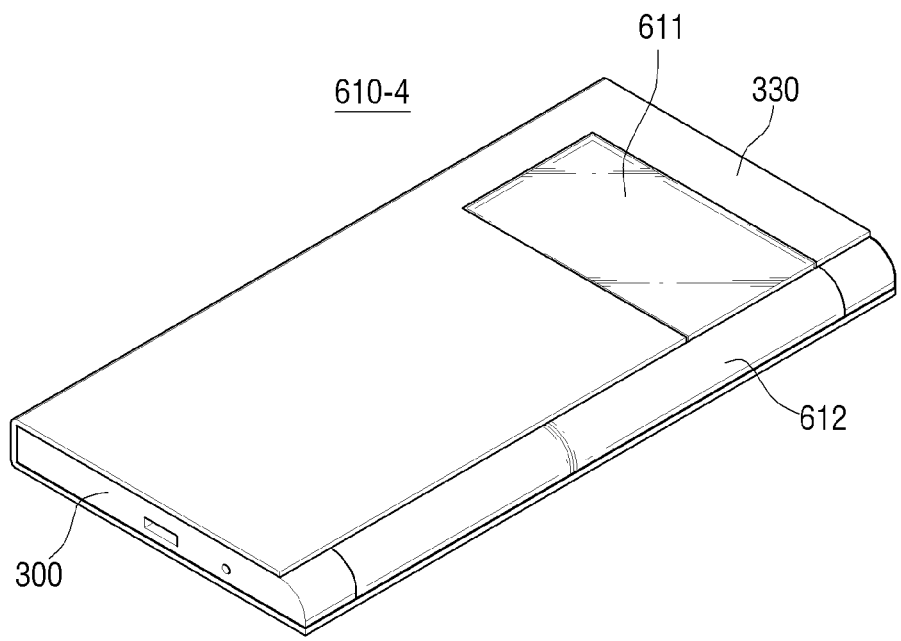

FIG. 6C
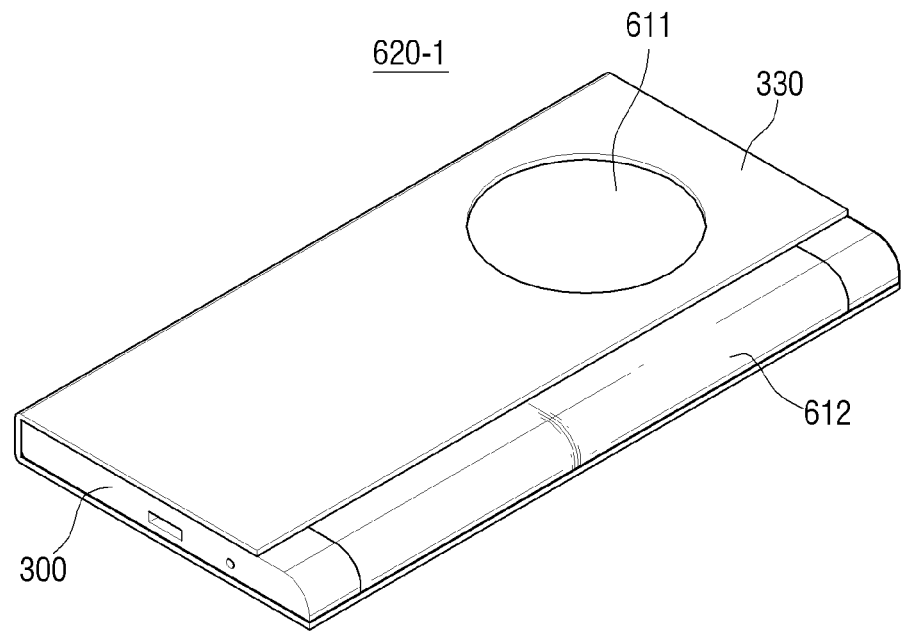
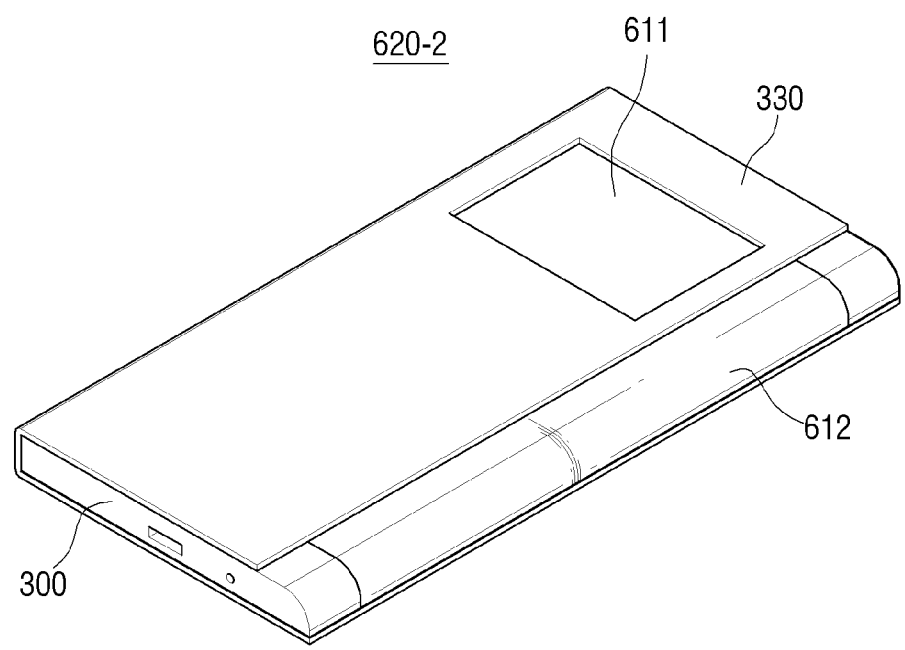

FIG. 6D
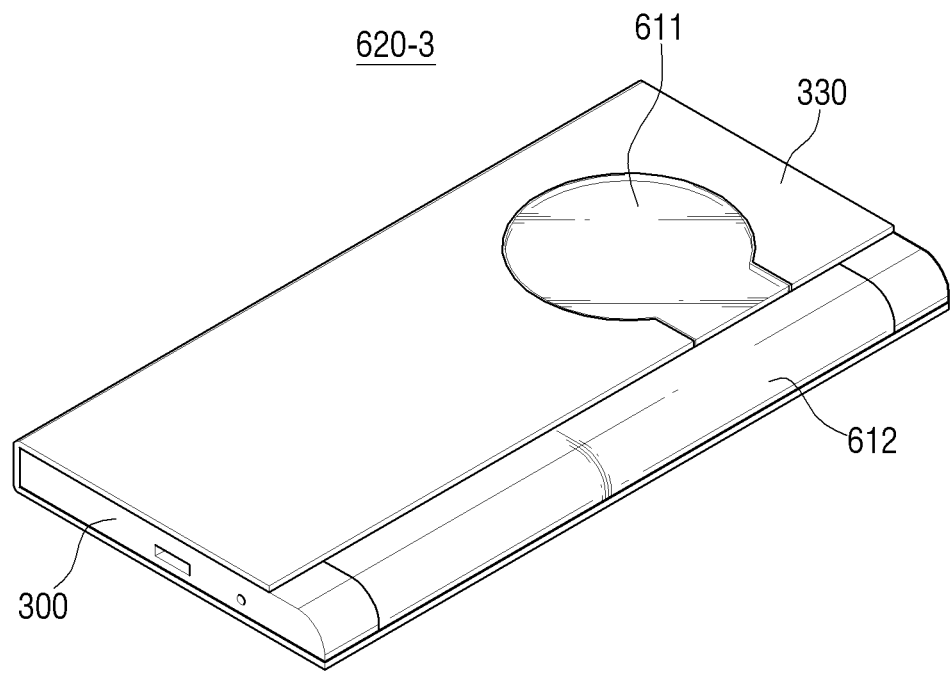
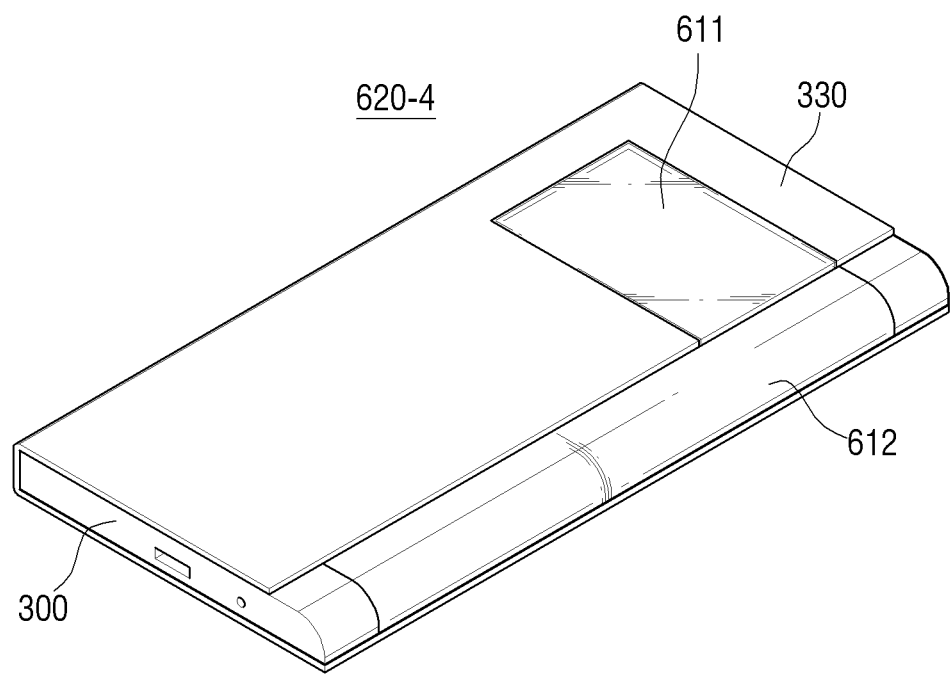

FIG. 6E
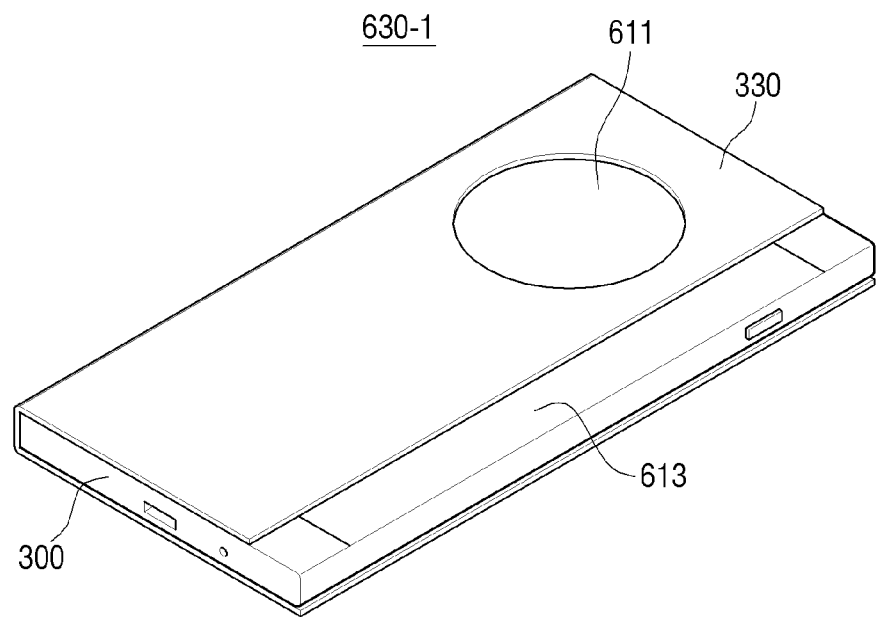
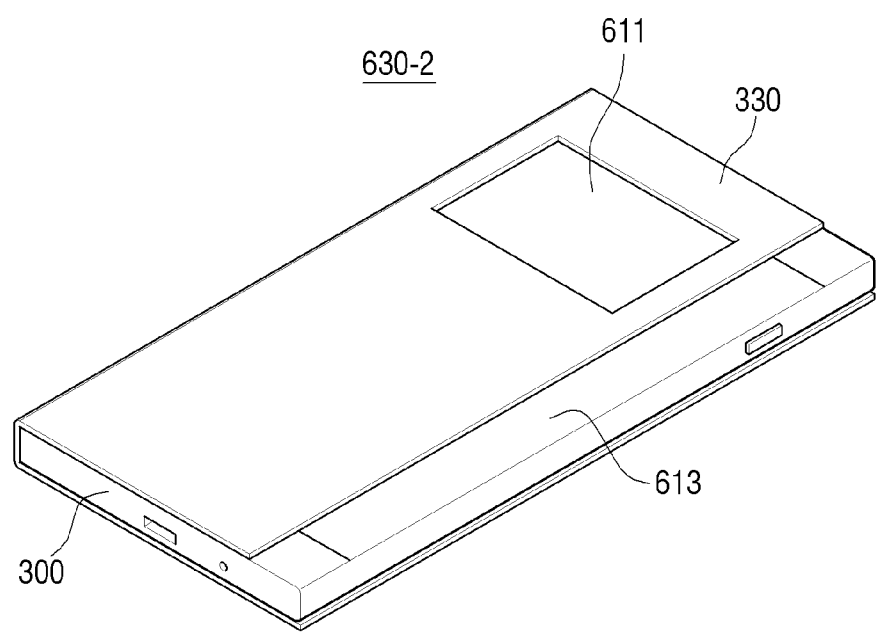

FIG. 6F
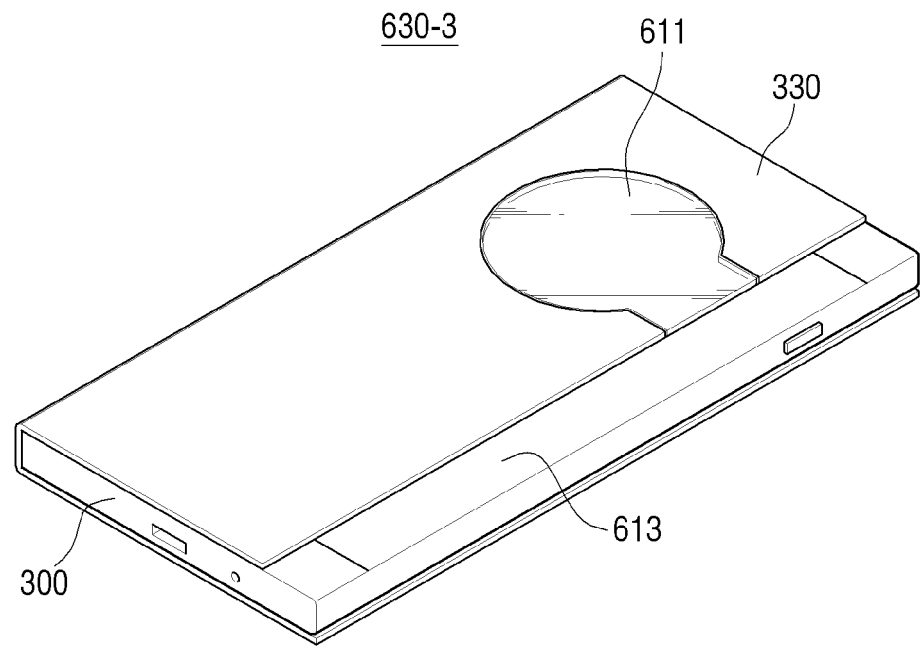
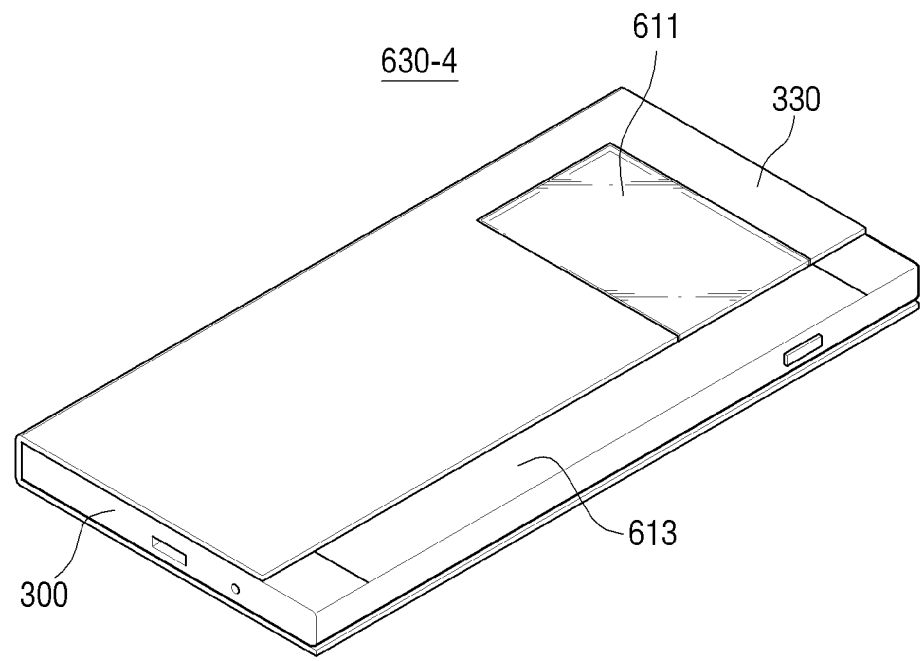

FIG. 6G
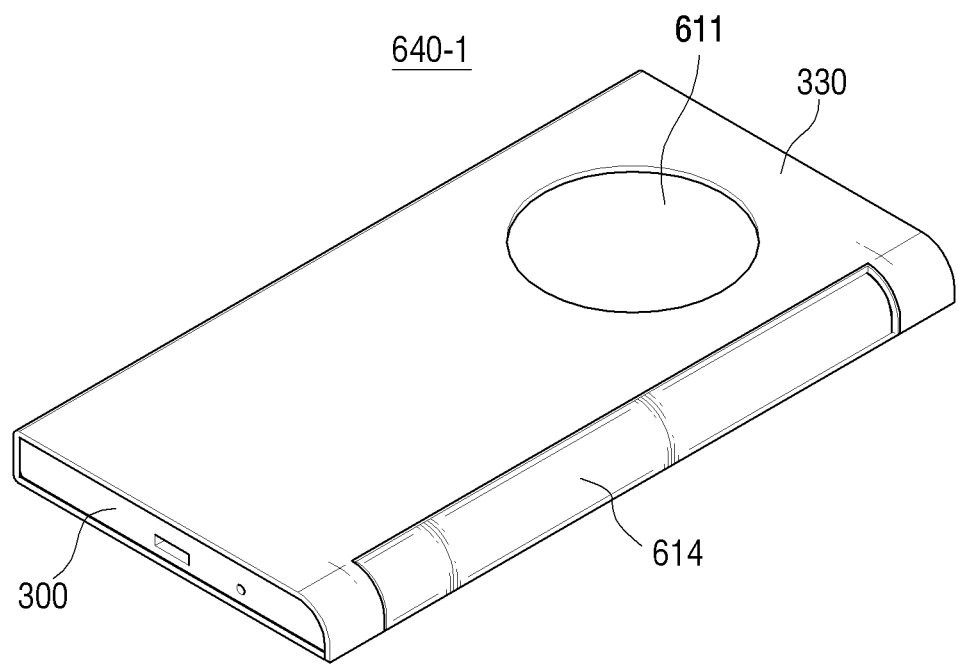
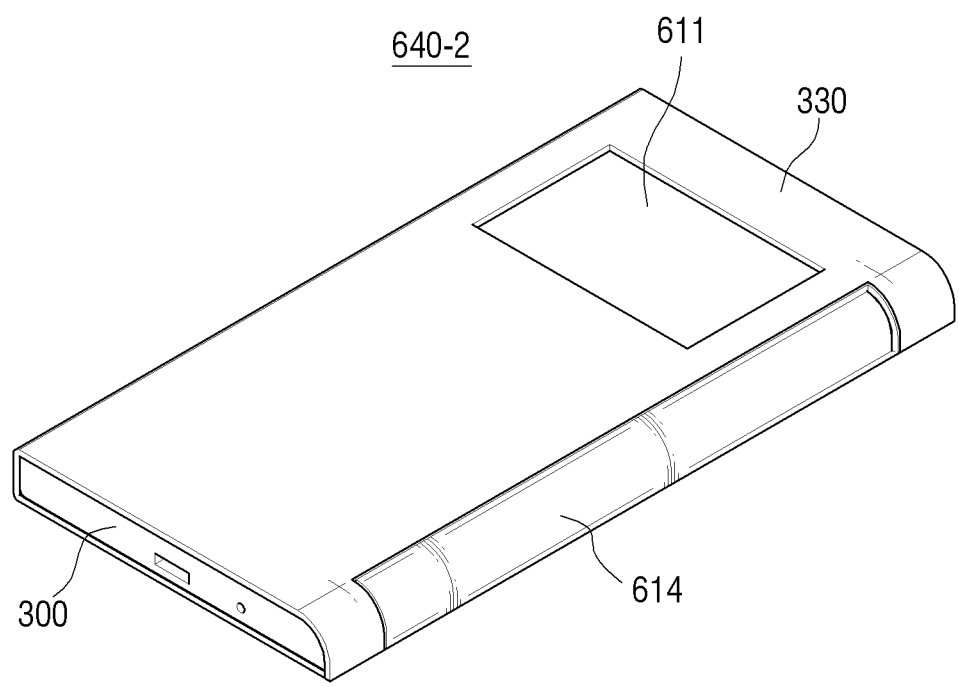

FIG. 6H
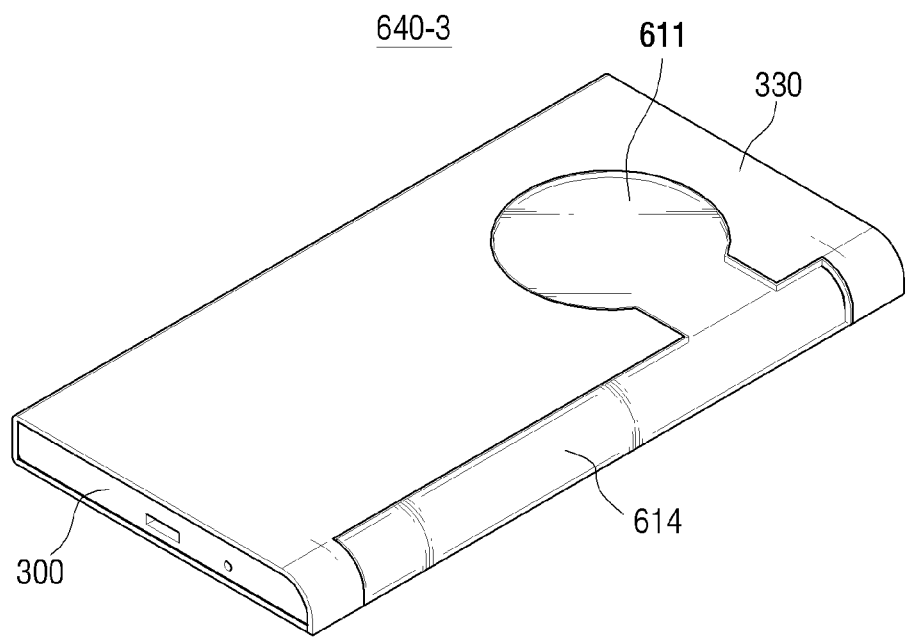
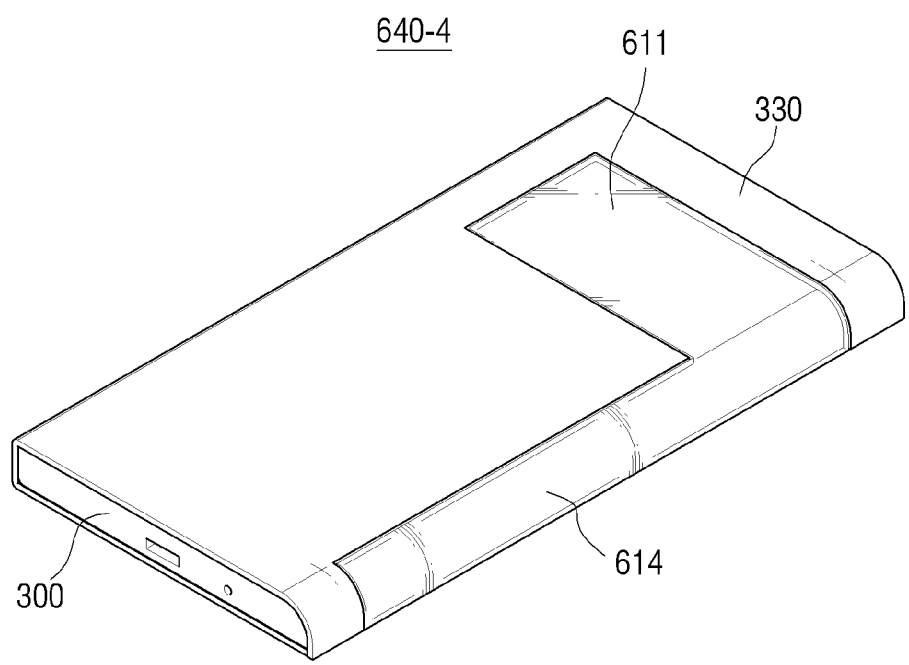

FIG. 8
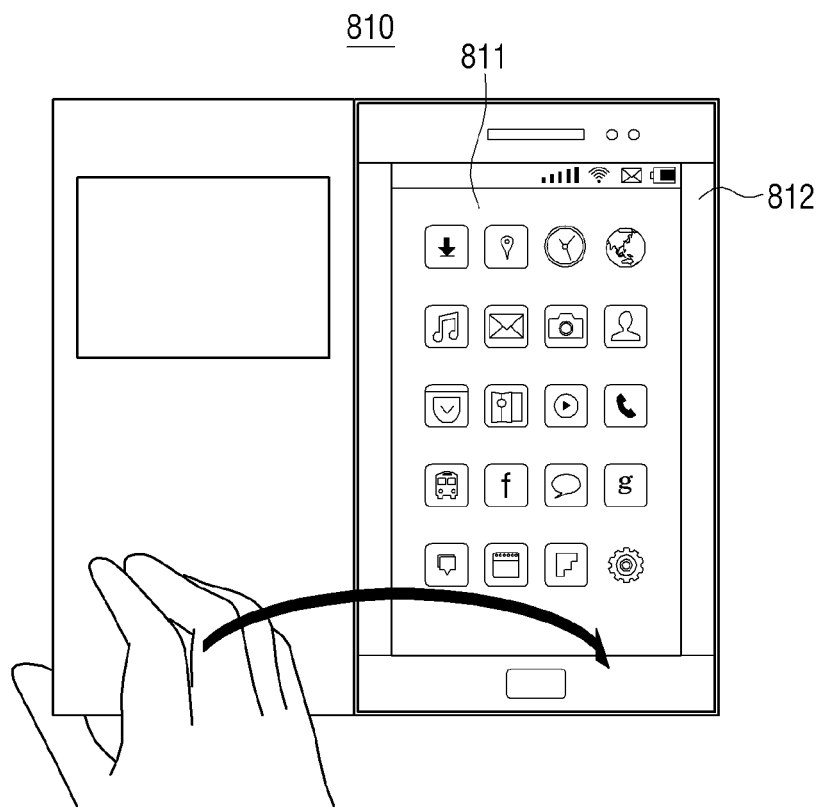
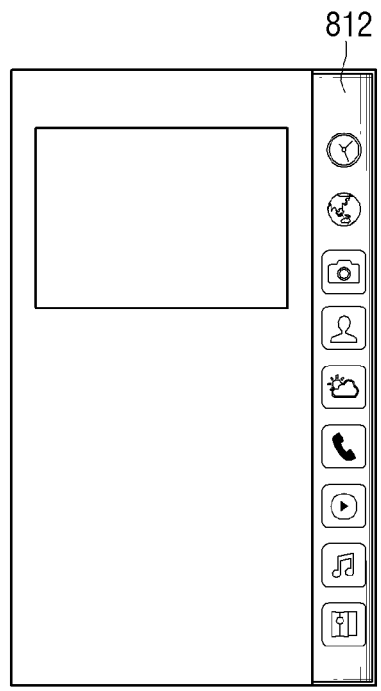

FIG. 9
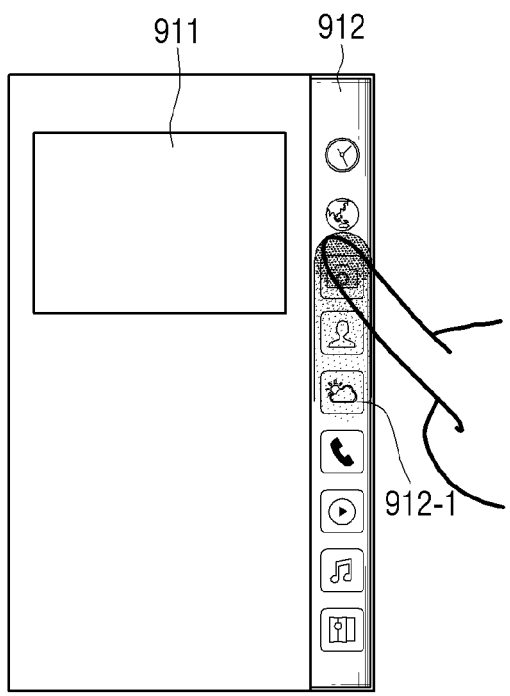
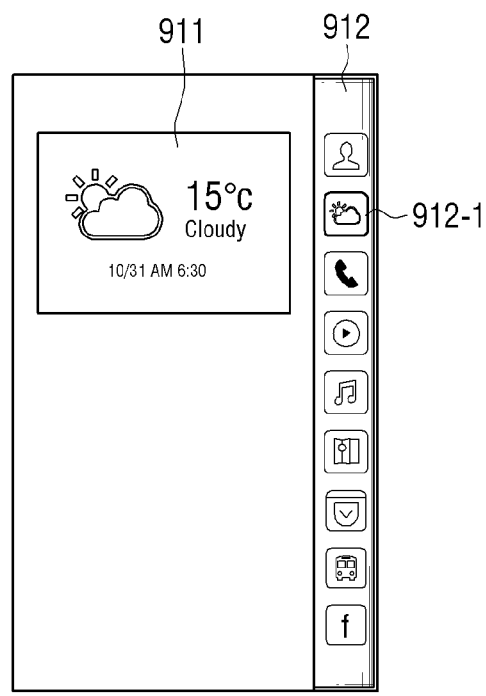

FIG. 10A
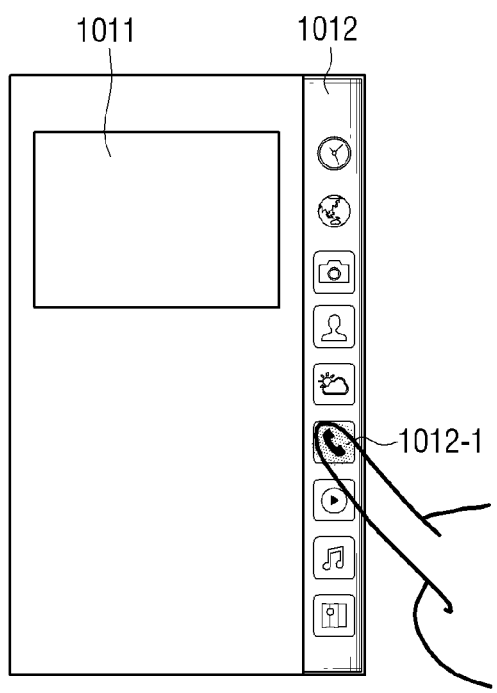
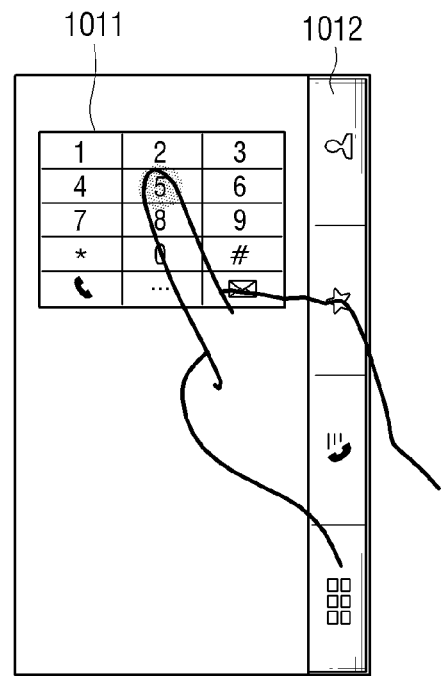

FIG. 10B
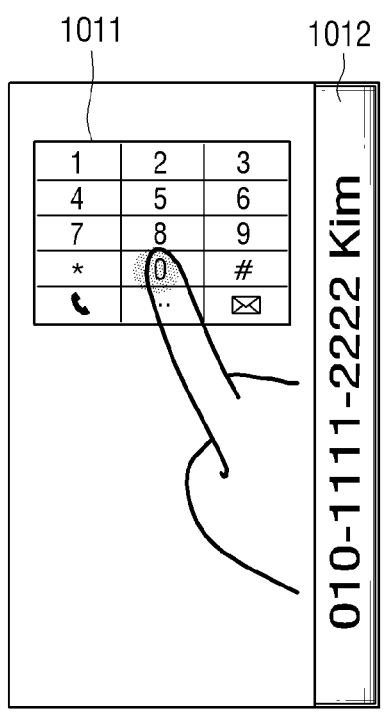
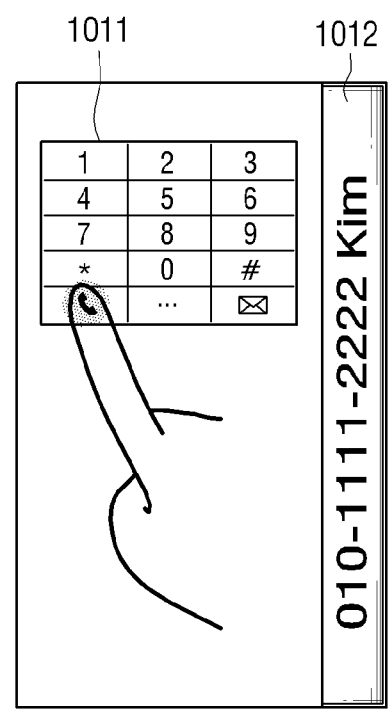

FIG. 11B
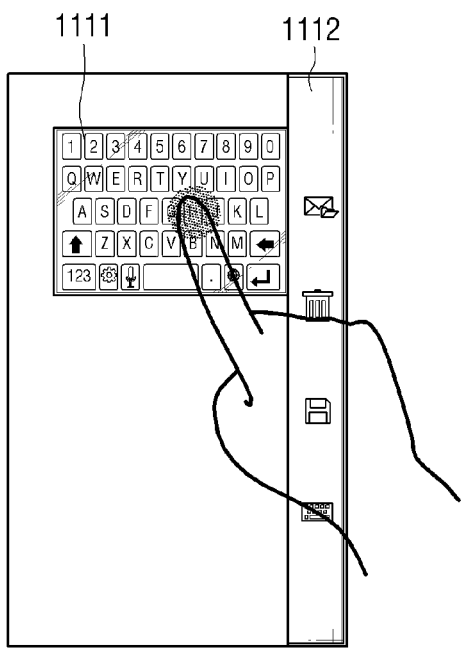
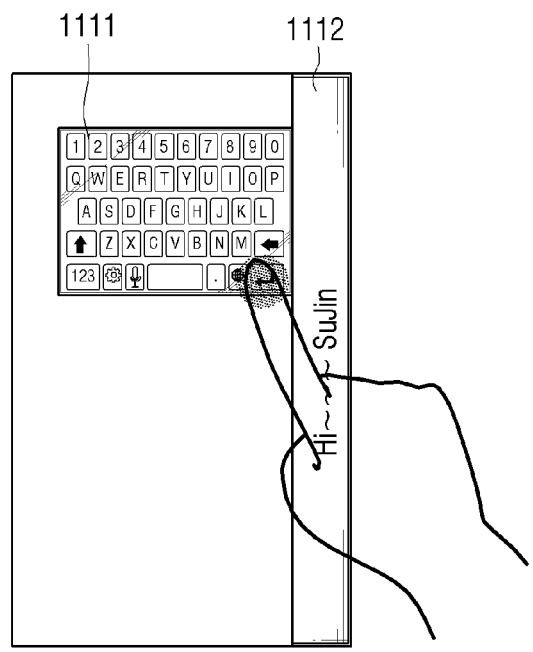

FIG. 15
1510
1511 1512
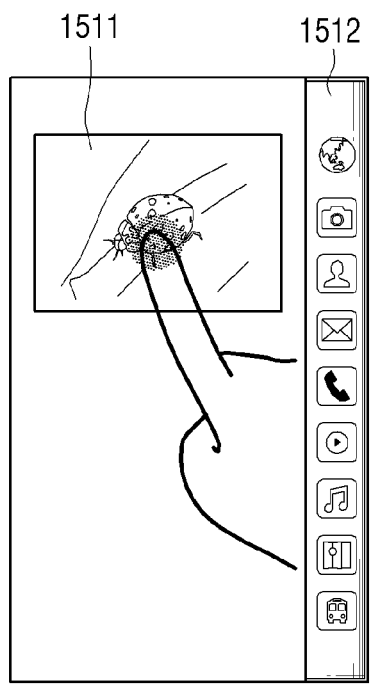
1520
1511 1512
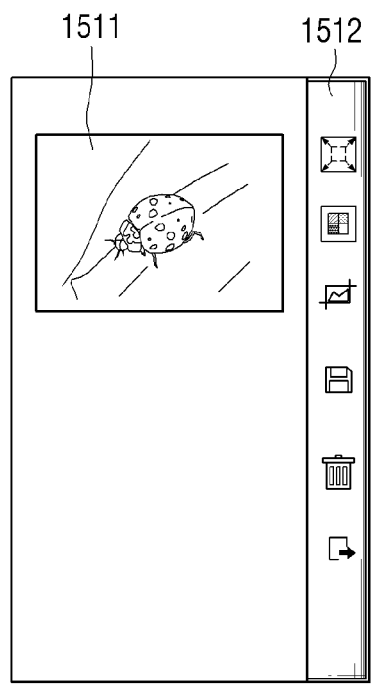

FIG. 19
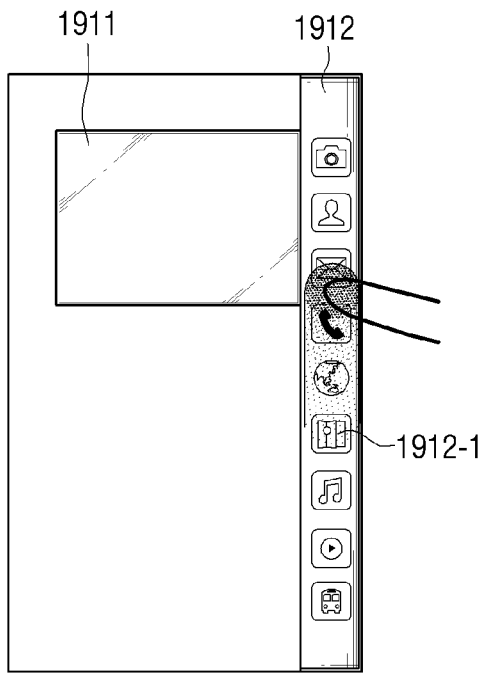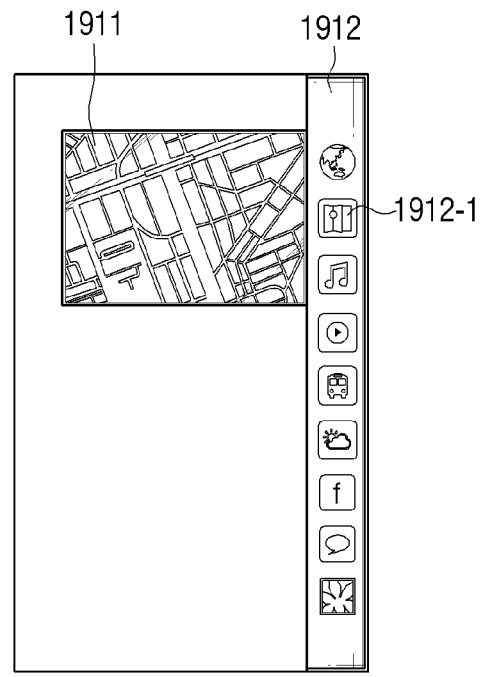

FIG. 21
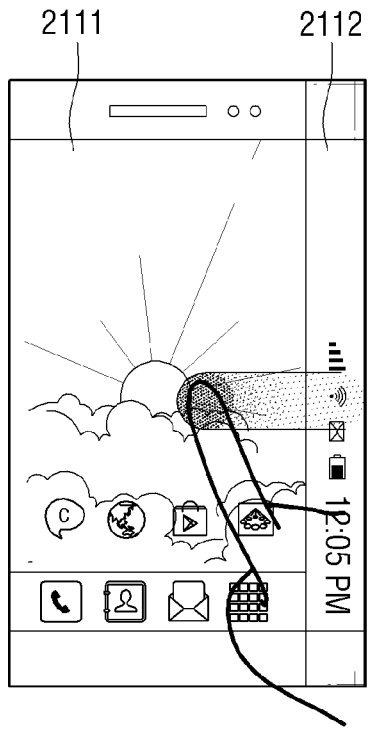
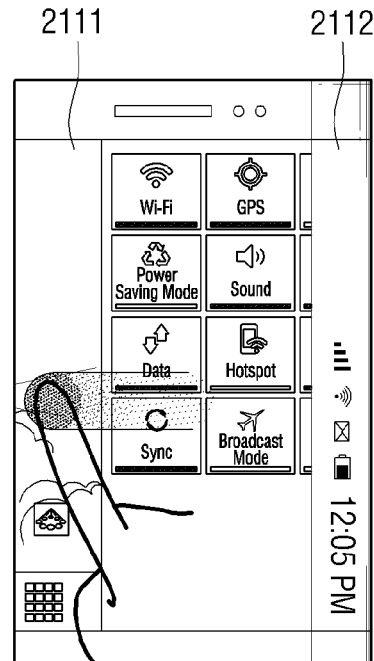
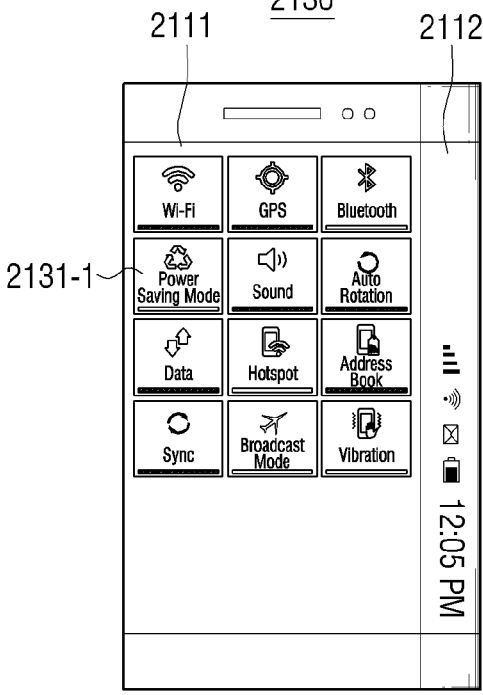

2530

PORTABLE TERMINAL AND DISPLAY METHOD THEREOF

CROSS-REFERENCE TO RELATED APPLICATIONS

This application claims priority under 35 U.S.C. § 119(a) from Korean Patent Application No. 10-2014-0116511 filed on Sep. 2, 2014, in the Korean Intellectual Property Office and Korean Patent Application No. 10-2015-0050811 filed on Apr. 10, 2015, in the Korean Intellectual Property Office, and the benefit of U.S. Provisional Application No. 62/018,052 filed on Jun. 27, 2014, in the United States Patent and Trademark Office, the disclosures of which are incorporated herein by reference in their entireties.

BACKGROUND

1. Field

Methods and apparatuses consistent with exemplary embodiments relate to a portable terminal having a cover that protects a display of the portable terminal and a display method thereof, and more particularly to a portable terminal having a cover that includes a transparent region and a display method thereof.

2. Description of the Related Art

With the development of digital technology, various portable terminals that can perform mobile communication and personal information processing, such as a mobile communication terminal, a PDA (Personal Digital Assistant), an electronic organizer, a smart phone, and a tablet PC (Personal Computer), have been launched. Such mobile terminals are reaching a mobile convergence stage, in which the devices are not limited to their traditional functionalities, but incorporate functionalities of other terminals. Representatively, a portable terminal may have various functions, such as voice call, video call, message transmission, such as SMS (Short Message Service)/MMS (Multimedia Message Service), electronic organizer, imaging, e-mail transmission/reception, broadcast reproduction, moving image reproduction, Internet, electronic commerce, music reproduction, schedule management, SNS (Social Networking Service), find friend service, messenger, and dictionary.

Such a portable terminal may be carried together with various types of portable terminal accessories. For example, the portable terminal may be provided with a USB storage device, a portable stand on which the portable terminal may be disposed for convenient viewing (corresponding to a DMB mode or a TV mode) through a connection device, or a cover that protects the portable terminal.

The cover can protect the portable terminal against an impact, such as dropping, which may frequently occur due to the characteristics of the portable terminal. In addition to the impact absorption, the cover can have various colors or designs to express a user's personality. Particularly, in the case that the cover has a transparent region, a user can confirm simple information through the transparent region of the cover in a state where the portable terminal is still protected by the cover. For example, a user can confirm the current time or message receipt through the transparent region of the cover. However, although the transparent region of the cover is a display region that can be rapidly and easily confirmed by the user, functions for utilizing the transparent region of the cover are limited.

SUMMARY

Aspects of the exemplary embodiments address at least the above needs and to provide at least the advantages described below, and an aspect of an exemplary embodiment provides various display functions of a portable terminal through a transparent region of a cover.

Aspects of the exemplary embodiments also provide various display functions of a portable terminal in accordance with opening and closing of a cover having a transparent region.

Aspects of the exemplary embodiments also provide various display functions of a portable terminal in association with a display region that is exposed out of a cover and a display region that corresponds to a transparent region of the cover in a state that the display region of the portable terminal is covered by the cover.

According to an aspect of an exemplary embodiment, there is provided a method of displaying information on a portable terminal configured to be connected to a cover comprising a transparent region and having a width that is less than a width of a display region of the portable terminal, the method comprising: displaying a user interaction (UI) element on an exposed display region uncovered by the cover in a state that a part of the display region having the width of the cover and including the transparent region is covered by the cover; and controlling a portion of the display region that corresponds to the transparent region of the cover to display information, in response to receiving a user input selecting the UI element while the UI element is displayed on the exposed display region uncovered by the cover.

According to an aspect of an exemplary embodiment, there is provided a method of displaying information on a portable terminal configured to be connected to a cover comprising a transparent region and having a width that is less than a width of a display region of the portable terminal, the method comprising: displaying a user interaction (UI) element on a portion of the display region that corresponds to the transparent region of the cover in a state that a part of the display region having the width of the cover and including the transparent region is covered by the cover; and controlling an exposed display region uncovered by the cover, in response to a user input selecting the UI element while the UI element is displayed on the portion of the display region that corresponds to the transparent region of the cover.

According to an aspect of an exemplary embodiment, there is provided a method of displaying information on a portable terminal configured to be connected to a front cover comprising a transparent region, the method comprising: displaying a user interaction (UI) element on a side display region of a display of the portable terminal in a state that a front display region of the display of the portable terminal including the transparent region is covered by the front cover; and controlling a portion of the display region that corresponds to the transparent region of the cover to display information, in response to a user input selecting the UI element while the UI element is displayed on the side display region.

According to an aspect of an exemplary embodiment, there is provided a portable terminal configured to be connected to a cover comprising a transparent region and having a width that is less than a width of a display region of the portable terminal, the portable terminal comprising: a sensor configured to sense a user input; a display configured to display a UI element on an exposed display region uncovered by the cover in a state that a part of the display region having the width of the cover and including the transparent region is covered by the cover; and a controller configured to control a portion of the display region that corresponds to the transparent region of the cover to display information, in response to the sensor sending user input selecting the UI element while the UI element is displayed.

According to an aspect of an exemplary embodiment, there is provided a portable terminal configured to be connected to a front cover comprising a transparent region, the portable terminal comprising: a sensor configured to sense a user input; a display configured to display a UI element on a side display region of a display of the portable terminal in a state that a front display region of the display of the portable terminal including the transparent region is covered by the front cover; and a controller configured to control a portion of the display region that corresponds to the transparent region of the cover to display information, in response to the sensor receiving the user input selecting the UI element while the UI element is displayed on the side display region.

According to an aspect of an exemplary embodiment, there is provided a portable terminal configured to be connected to a cover comprising a transparent region and having a width that is less than a width of a display region of the portable terminal, the portable terminal comprising: a sensor configured to sense a user input; a display configured to display a user interaction (UI) element on a portion of the display region that corresponds to the transparent region of the cover in a state that a part of the display region having the width of the cover and including the transparent region is covered by the cover; and a controller configured to control an exposed display region uncovered by the cover, in response to the sensor receiving the user input selecting the UI element while the UI element is displayed.

According to an aspect of an exemplary embodiment, there is provided a portable terminal comprising: a touch-sensitive display configured to sense user input and display information; and a controller configured to: detect that a cover is covering the touch-sensitive display of the portable terminal, the cover comprising a transparent portion and the cover having a width that is less than a width of the touch-sensitive display, control the touch-sensitive display to display a user interface (UI) element on one of: an exposed portion of the touch-sensitive display that is uncovered by the cover, and a portion of the touch-sensitive display that corresponds to the transparent portion of the cover, in response to detecting that the cover is covering the touch-sensitive display, and control display of information related to the UI element on: the portion of the touch-sensitive display that corresponds to the transparent portion of the cover, in response to the touch-sensitive display sensing a user input selecting the UI element displayed on the exposed portion of the touch-sensitive display, and the exposed portion of the touch-sensitive display, in response to the touch-sensitive display sensing a user input selecting the UI element displayed on the portion of the touch-sensitive display that corresponds to the transparent portion of the cover.

BRIEF DESCRIPTION OF THE DRAWINGS

The above and other aspects of the present disclosure will be more apparent from the following detailed description when taken in conjunction with the accompanying drawings, in which:

FIGS. 3A to 3F are views illustrating portable terminals according to exemplary embodiments of the present disclosure;

FIGS. 6A to 6H are views illustrating various examples of covers having transparent regions according to exemplary embodiments of the present disclosure;

FIGS. 7A to 25B are views illustrating information being displayed on a portable terminal according to exemplary embodiments of the present disclosure;

DETAILED DESCRIPTION OF EXEMPLARY EMBODIMENTS

Figure 1:
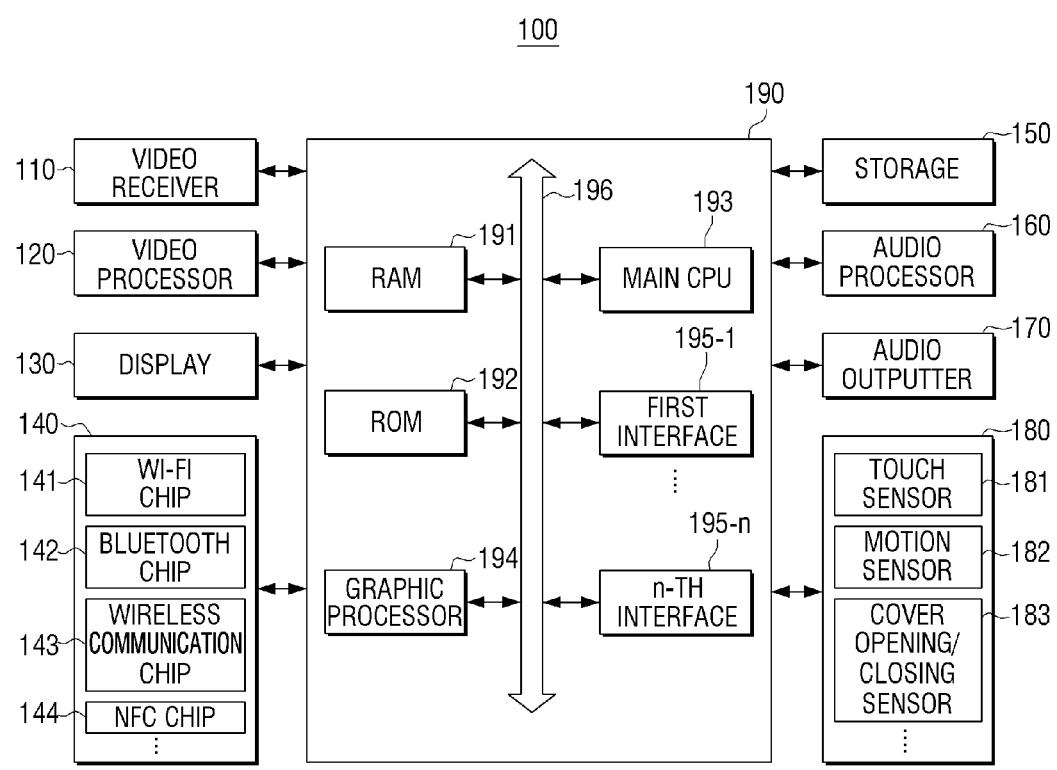
FIG. 1 is a block diagram illustrating a portable terminal according to an exemplary embodiment of the present disclosure.

Hereinafter, terms that are used in the description will be briefly described, and the present disclosure will be described in detail.

In the present disclosure, all terms used in the description are general terms that are widely used in consideration of their functions in the present disclosure, but may differ depending on intentions of a person skilled in the art to which the present disclosure belongs, customs, or appearance of new technology. Further, in a specific case, an inventor may optionally select terms, and in this case, their meanings could be described in detail in the description of the present disclosure. Accordingly, they should be defined on the basis of the contents of the whole description of the present disclosure.

The present disclosure is not limited to the exemplary embodiments disclosed hereinafter, but can be implemented in diverse forms. The matters defined in the description, such as the detailed construction and elements, are provided to assist those of ordinary skill in the art in a comprehensive understanding of the disclosure, and the present disclosure is only defined within the scope of the appended claims. In describing the present disclosure, well-known element structures and technologies are not described in detail because they would obscure the disclosure in unnecessary detail.

Although the terms "first" and "second" are used to describe diverse elements, components and/or sections, such elements, components and/or sections are not limited by the terms. The terms are labels used only to discriminate an element, component, or section from other elements, components, or sections.

In the description, a singular expression may include a plural expression unless specially described. The term "includes" and/or "is composed of" used in the description means that one or more other components, steps, operation and/or existence or addition of elements are not excluded in addition to the described components, steps, operation and/ or elements.

In embodiments of the present disclosure, the term "module" or "portion," as used herein, means, but is not limited to, software or hardware component or a combination thereof, which performs certain tasks. Further, "a plurality of modules or portions" may be integrally formed as at least one module and can be implemented by at least one processor except for "modules" or "portions" that are required to be implemented by specific hardware.

In embodiments of the present disclosure, the term "connected to" or "coupled to" that is used to designate a connection or coupling of one element to another element includes both a case that an element is "directly connected or coupled to" another element and a case that an element is connected or coupled to another element via still another element. In this case, the term "directly connected to" or "directly coupled to" means that an element is connected or coupled to another element without intervention of any other element.

Hereinafter, preferred embodiments of the present disclosure will be described in detail with reference to the accompanying drawings. The aspects and features of the present disclosure and methods for achieving the aspects and features will be apparent by referring to the exemplary embodiments to be described in detail with reference to the accompanying drawings. However, the present disclosure may be implemented in various different forms, and is not limited to the exemplary embodiments described hereinafter. In the entire description of the present disclosure, the same drawing reference numerals are used for the same elements across various figures.

In exemplary embodiments of the present disclosure, a cover may be an object or a device that covers a part or the whole of a display region of a portable terminal to protect a display. The cover may be electrically or non-electrically connected to the portable terminal. Further, according to circumstances, the cover may communicate with the portable terminal. Further, the cover may be detachably attached to the portable terminal as a separate product, or may be integrally formed with the portable terminal to be sold together with the portable terminal.

In exemplary embodiments of the present disclosure, a user input may include at least one of touch input, bending input, voice input, button input, and multimodal input, but the user input is not limited thereto.

In exemplary embodiments of the present disclosure, the term "touch input" means a touch gesture that a user makes on a display or a cover to control the device. Further, the term "touch input" may include a touch (e.g., floating or hovering) that is in a state that the user does not come in contact with the display, but is spaced apart from the display over a predetermined distance. The touch input may be a touch and hold gesture, a tap gesture that makes a touch and then releases the touch, a double tap gesture, a panning gesture, a flick gesture, a touch drag gesture that makes a touch and then moves in one direction, or a pinch gesture, but is not limited thereto.

In exemplary embodiments of the present disclosure, the term "button input" means an input that a user makes to control the device using physical buttons provided on the device.

In exemplary embodiments of the present disclosure, the term "motion input" means a motion that a user applies to the device to control the device. For example, the term "motion input" may include an input that a user makes to rotate the device, to tilt the device, or to move the device in upper, lower, left, and right directions.

In exemplary embodiments of the present disclosure, the term "multimodal input" means a combination of at least two input methods. For example, the device may receive the touch input and the motion input from the user, or may receive the touch input and the voice input from the user.

Further, in exemplary embodiments of the present disclosure, the term "application" means a set of computer programs that are devised to perform specific tasks. In exemplary embodiments of the present disclosure, various applications may be provided. For example, a game application, a moving image reproduction application, a map application, a memo application, a calendar application, a phone book application, a broadcasting application, an exercise support application, a settlement application, and a photo folder application may be provided, but the applications are not limited thereto.

Further, in exemplary embodiments of the present disclosure, the term "application identification information" may be inherent information for discriminating an application from other applications. For example, the application identification information may be an icon, an index item, or link information, but the application identification information is not limited thereto.

Further, in exemplary embodiments of the present disclosure, the term "UI (User Interaction) element" means an element that can interact with a user to achieve visual, auditory, and olfactory feedbacks in accordance with user inputs. The UI element may be expressed in the form of at least one of an image, a text, and a moving image, or may be one region in which the above-described information is not displayed, but the feedback becomes possible in accordance with the user input. Further, the UI element may be, for example, the application identification information as described above.

FIG. 1 is a block diagram illustrating the detailed configuration of a portable terminal 100 according to an exemplary embodiment of the present disclosure.

A portable terminal 100 may be, for example, a smart phone, a notebook computer, a PDA, a media player, an MP3 player, a micro server, a GPS device, an electronic book terminal, a terminal for digital broadcasting, a kiosk, a digital photo frame, a navigation, a wearable device, such as a wrist watch or a HMD (Head-Mounted Display), or other mobile or non-mobile computing devices.

As illustrated in FIG. 1, the portable terminal 100 includes a video receiver 110, a video processor 120, a display 130, a communicator 140, a storage 150, an audio processor 160, a speaker 170, a sensor 180, and a controller 190.

On the other hand, FIG. 1 generally illustrates various kinds of constituent elements on the assumption that the portable terminal 100 is a device having various functions, such as a content providing function and a display function. Accordingly, a part of the constituent elements illustrated in FIG. 1 may be omitted or changed, or other constituent elements may be added thereto.

The video receiver 110 receives video data through various sources. For example, the video receiver 110 may receive broadcasting data from an external broadcasting station, receive real time VOD data from an external server, and receive video data from an external device.

The video processor 120 is a constituent element that processes the video data that is received through the video receiver 110. The video processor 120 may perform various reproduction processes, such as video data decoding, scaling, noise filtering, frame rate conversion, and resolution conversion.

The display 130 displays at least one of processed video frames that are processed through the video processor 120 and various images that are generated by a graphic processor 194.

The implementation method of the display 130 is not limited, and for example, the display 130 may be implemented by one of various types of displays, such as an LCD (Liquid Crystal Display), an OLED (Organic Light Emitting Diode) display, an AM-OLED (Active-Matrix Organic Light-Emitting Diode) display, and a PDP (Plasma Display Panel). The display 130 may include additional configurations according to the implementation method thereof. For example, if the display 130 is of a liquid crystal type, the display 130 may include an LCD display panel, a backlight unit that provides light to the LCD display panel, and a panel driving substrate that drives the panel. The display 110 may be combined with a touch sensor 181 of the sensor 180 to be provided as a touch screen.

The display 130 may be in the form of a bended display and may be combined with at least one of a front region, a side region, and a rear region of the portable terminal 100. The bended display may be implemented by a flexible display or a general display that is not flexible. For example, the bended display may be implemented by connecting a plurality of flat displays to each other. Alternatively, the display 130 may be a curved display, having a central flat main display area and one or more curved display areas disposed on one or more sides of the display 130 corresponding to one or more edges of the portable terminal 100.

In the case that the bended display is implemented by a flexible display, the flexible display may be flexed, bended, or rolled without being damaged through a substrate that is thin and flexible like a paper. The flexible display may be manufactured using, not only a glass substrate that is generally used but also a plastic substrate. In the case of using a plastic substrate, the flexible display may be formed using a low-temperature manufacturing processor rather than the existing manufacturing processor to prevent the substrate from being damaged. Further, the flexible display may have flexibility so that the flexible display can be folded and unfolded through replacement of a glass substrate with a plastic film, which surrounds liquid crystals in an LCD (Liquid Crystal Display), an OLED (Organic Light Emitting Diode) display, an AM-OLED (Active-Matrix Organic Light-Emitting Diode) display, or a PDP (Plasma Display Panel). The flexible display has the advantages that the flexible display is thin, light, and strong against impacts, and can be manufactured in various shapes including flexible and bendable shapes.

The flexible display may have an active matrix screen of a specific screen size (e.g., 3 inches, 4 inches, 4.65 inches, 5 inches, 6.5 inches, or 8.4 inches) depending on the size of the portable terminal 100, and may extend up to at least one side surface (e.g., at least one of left, right, upper, and lower side surfaces) of the portable terminal 100. Further, the flexible display may be curved with a radius of curvature (e.g., a radius curvature of 5 cm, 1 cm, 7.5 mm, 5 mm, or 4 mm) in which the flexible display can operate, and may be fastened to the side surface of the portable terminal 100.

The communicator 140 is a communication interface that performs communication with various types of external devices according to various types of communication methods. The communicator 140 includes a Wi-Fi chip 141, a Bluetooth chip 142, a wireless communication chip 143, and an NFC (Near Field Communication) chip 144. The controller 190 performs communication with various kinds of external devices using the communicator 140.

In particular, the Wi-Fi chip 141 and the Bluetooth chip 142 perform communication in a Wi-Fi method and a Bluetooth method, respectively. In the case of using the Wi-Fi chip 141 or the Bluetooth chip 142, various kinds of connection information, such as a SSID and a session key, may be first transmitted and received to perform communication connection using the connection information, and then various kinds of information may be transmitted and received. The wireless communication chip 143 means a chip that performs communication according to various communication standards, such as IEEE, Zigbee, 3G ($3^{rd}$ Generation), 3GPP ($3^{rd}$ Generation Partnership Project), and LTE (Long Term Evolution). The NFC chip 144 means a chip that operates in an NFC method using a frequency band of 13.56 MHz among various RF-ID frequency bands of 135 kHz, 13.56 MHz, 433 MHz, 860-960 MHz, and 2.45 GHz.

The storage 150 may store various kinds of programs and data that are required to operate the portable terminal 100. The storage 150 may include a nonvolatile memory, a volatile memory, a flash memory, a HDD (Hard Disk Drive), or a SSD (Solid State Drive). The storage 150 may be accessed by the controller 190, and may perform data read/write/correction/delete/update through the controller 190. In the present disclosure, the term "storage" may include a ROM or a RAM that is provided in the storage 150 or the controller 190, or a memory card (e.g., a micro SD card or a memory stick) that is mounted in the portable terminal 100.

Specifically, programs and data for providing various kinds of information to be displayed on a display region may be stored in the storage 150.

Figure 2:
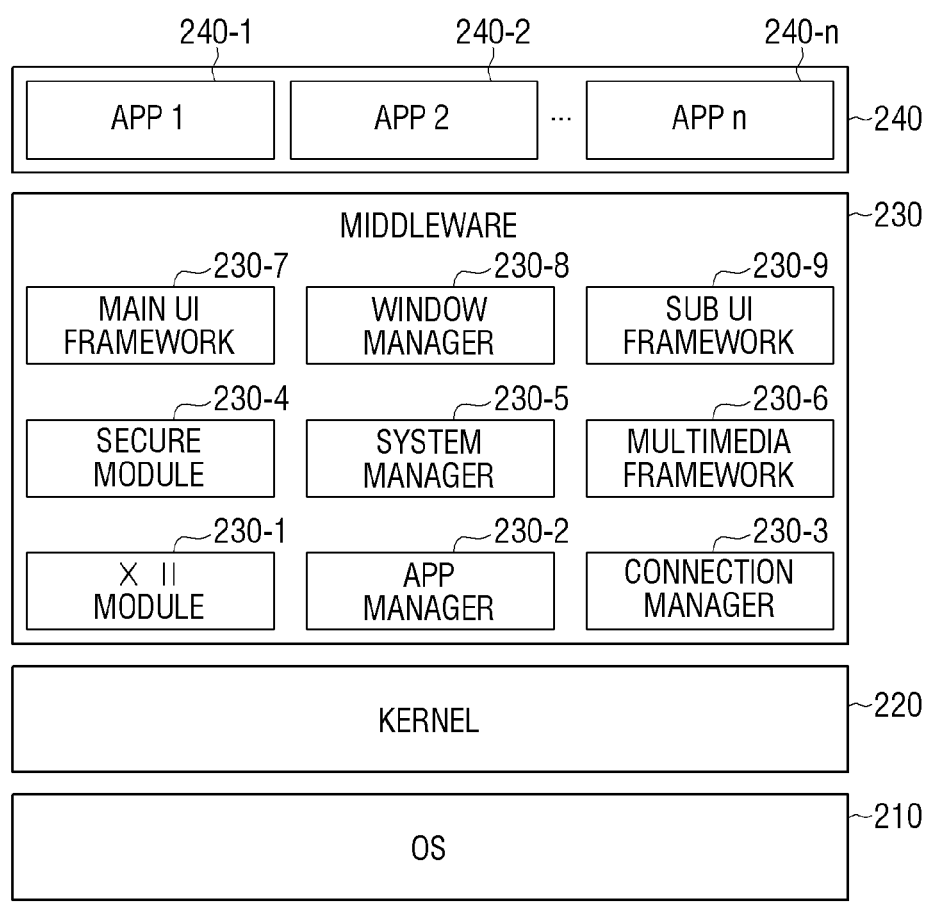
FIG. 2 is a diagram illustrating software stored in a portable terminal according to an exemplary embodiment of the present disclosure.

Hereinafter, referring to FIG. 2, the software that is stored in the portable terminal 100 will be described. Referring to FIG. 2, software includes an OS (Operating System) 210, a kernel 220, middleware 230, and applications 240.

The OS 210 controls and manages the whole operation of the portable terminal 100. That is, the OS 210 is a layer that takes charge of basic functions, such as hardware management, memory, and security.

The kernel 220 serves as a path for transferring various kinds of signals including touch signals sensed through the display 130 to the middleware 230.

The middleware 230 includes various kinds of software modules that control the operation of the portable terminal 100. Referring to FIG. 2, the middleware 230 includes an X11 module 230-1, an APP manager 230-2, a connection manager 230-3, a secure module 230-4, a system manager 230-5, a multimedia framework 230-6, a UI framework 230-7, a window manager 230-8, and a handwriting recognition module 230-9.

The X11 module 230-1 is a module that receives various kinds of event signals from various kinds of hardware provided in the portable terminal 100. Here, the term "event" may be variously set as an event in which a user gesture is sensed, an event in which a system alarm is generated, or an event in which a specific program is executed or ended.

The APP manager 230-2 is a module that manages execution states of various kinds of applications 240 installed in the storage 150. If an application execution event is sensed by the X11 module 230-1, the APP manager 230-2 calls and executes an application that corresponds to the corresponding event.

The connection manager 230-3 is a module for supporting a wired or wireless network connection. The connection manager 230-3 may include various detailed modules, such as a DNET module and an UPnP module.

The secure module 230-4 is a module that supports hardware certification, request permission, and secure storage.

The system manager 230-5 monitors states of respective constituent elements in the portable terminal 100, and provides the results of monitoring to other modules. For example, in the case where a battery residual amount becomes insufficient, an error occurs, or a communication connection becomes in a disconnection state, the system manager 230-5 may provide the results of monitoring to the main UI framework 230-7 or the sub UI framework 230-9 to output a notification message or notification sound.

The multimedia framework 230-6 is a module for reproducing multimedia content that is stored in the portable terminal 100 or is provided from an external source. The multimedia framework 230-6 may include a player module, a camcorder module, and a sound processing module. Accordingly, the multimedia framework 230-6 can reproduce various kinds of multimedia content to generate a screen and sound.

The main UI framework 230-7 is a module for providing various kinds of UIs to be displayed on a main region of the display 130, and the sub UI framework 230-9 is a module for providing various kinds of UIs to be displayed on a sub region. Each of the main UI framework 230-7 and the sub UI framework 230-9 may include an image compositor module that configures various kinds of UI elements, a coordinate compositor module that calculates coordinates at which the UI element is displayed, a rendering module that renders the configured UI element at the calculated coordinates, and a 2D/3D UI tool kit that provides a tool for configuring a 2D or 3D type UI.

The window manager 230-8 may sense a touch event using a user's body or a pen and other input events. If such an event is sensed, the window manager 230-8 transfers an event signal to the main UI framework 230-7 or the sub UI framework 230-9 to perform an operation that corresponds to the event.

In addition, various program modules, such as a handwriting module for drawing a line along a drag trace when a user touches and drags the screen and an angle calculation module for calculating a pitch angle, a roll angle, and a yaw angle based on sensor values sensed by the motion sensor 182, may be stored.

The application module 240 includes applications 240-1 to 240-n for supporting various functions. For example, the application module 240 may include program modules for providing various services, such as a navigation program module, a game module, an electronic book module, a calendar module, and an alarm management module. Such applications may be installed by default or may be optionally installed by a user. If a UI element is selected, the main CPU 194 may execute an application that corresponds to the UI element selected using the application module 240.

The software indicated in FIG. 2 is merely exemplary, and the software is not limited thereto. If necessary, a part thereof may be omitted, modified, or added. For example, various programs, such as a sensing module for analyzing signals sensed by various kinds of sensors, a messaging module including a messenger program, an SMS (Short Message Service) and MMS (Multimedia Message Service) program, and an e-mail program, a call information aggregator program module, a VoIP module, and a web browser module, may be additionally provided in the storage 150.

Referring again to FIG. 1, the audio processor 160 is a constituent element that processes audio data of video content. The audio processor 160 may perform various processes, such as audio data decoding, amplification, and noise filtering. The audio data that is processed by the audio processor 160 may be output to the audio outputter 170.

The audio outputter 170 is a configuration that outputs not only various kinds of audio data, of which various processes, such as decoding, amplification, and noise filtering, have been performed by the audio processor 160, but also various kinds of notification sound or voice messages. In particular, the audio outputter 170 may be implemented by a speaker. However, this is merely exemplary, and the audio outputter 170 may also be implemented by an output terminal that can output the audio data.

The sensor 180 senses various user interactions. The sensor 180 may detect at least one of various changes, such as posture change, illumination change, and acceleration change, and transfer a corresponding electrical signal to the controller 190. That is, the sensor 180 may sense a state change of the portable terminal 100, generate and transfer a corresponding sensing signal to the controller 190. In the present disclosure, the sensor 180 may be composed of various sensors, and when the potable terminal 100 is driven (or based on user's setting), power is supplied to at least one sensor that is set under the control of the sensor 180, so that the sensor can sense the state change of the portable terminal 100.

The sensor 180 may be configured to include one or more of various types of sensing devices that can detect the state change of the portable terminal 100. For example, the sensor 180 may be configured to include at least one of various sensing devices, such as a touch sensor, an acceleration sensor, a gyro sensor, an illumination sensor, a proximity sensor, a pressure sensor, a noise sensor (e.g., microphone), a video sensor (e.g., camera module), and a timer.

As illustrated in FIG. 1, the sensor 180 may be divided into a touch sensor 181, a motion sensor 182, and a cover opening/closing sensor 183 for the purpose of sensing, but is not limited thereto. The sensor 180 may be divided for more various purposes. This does not mean physical division, and at least one sensor may be combined to serve as the sensors 181, 182, and 183. Further, depending on the implementation method, part of configurations or functions of the sensor 180 may be included in the controller 190.

For example, the touch sensor 181 may sense user's touch input using the touch sensor attached to the rear surface of a display panel. The controller 190 may acquire information about touch coordinates and touch time from the touch sensor 181, and determine the kind of the touch input (e.g., tap gesture, double tap gesture, panning gesture, flick gesture, and touch drag gesture). Further, the controller 190 may directly determine the kind of the touch input using the touch coordinates and the touch time that are acquired by the touch sensor 181.

The cover opening/closing sensor 183 may determine the opening/closing state of the cover that is connected to the portable terminal 100 using at least one of, for example, a hall sensor, an illumination sensor, and a pressure sensor. The hall sensor is a device that varies its output voltage in response to the intensity of a magnetic field, and may sense the electric potential difference that occurs when the cover is opened or closed in a state where current flows through a conductor. The controller 190 may acquire the electric potential difference, which occurs when the cover is opened or closed, from the cover opening/closing sensor 183 and determine the opening/closing state of the cover using information related to the acquired electric potential difference.

Further, in the case of using the illumination sensor, the illumination sensor may sense an electrical signal that is generated in response to the illumination change of the surroundings in accordance with the opening/closing of the cover. The controller 190 may determine the opening/closing state of the cover through comparison of the result of sensing that is acquired from the cover opening/closing sensor 183 with a predetermined reference value. For example, if it is assumed that the highest intensity of illumination that is measured by the illumination sensor is 100, the lowest intensity of illumination is 0, and a predetermined reference intensity of illumination is 30, the controller 190 may determine that the cover is closed in the case where the intensity of illumination that is measured by the illumination sensor is equal to or lower than the reference intensity of illumination of 30.

Figure 4:
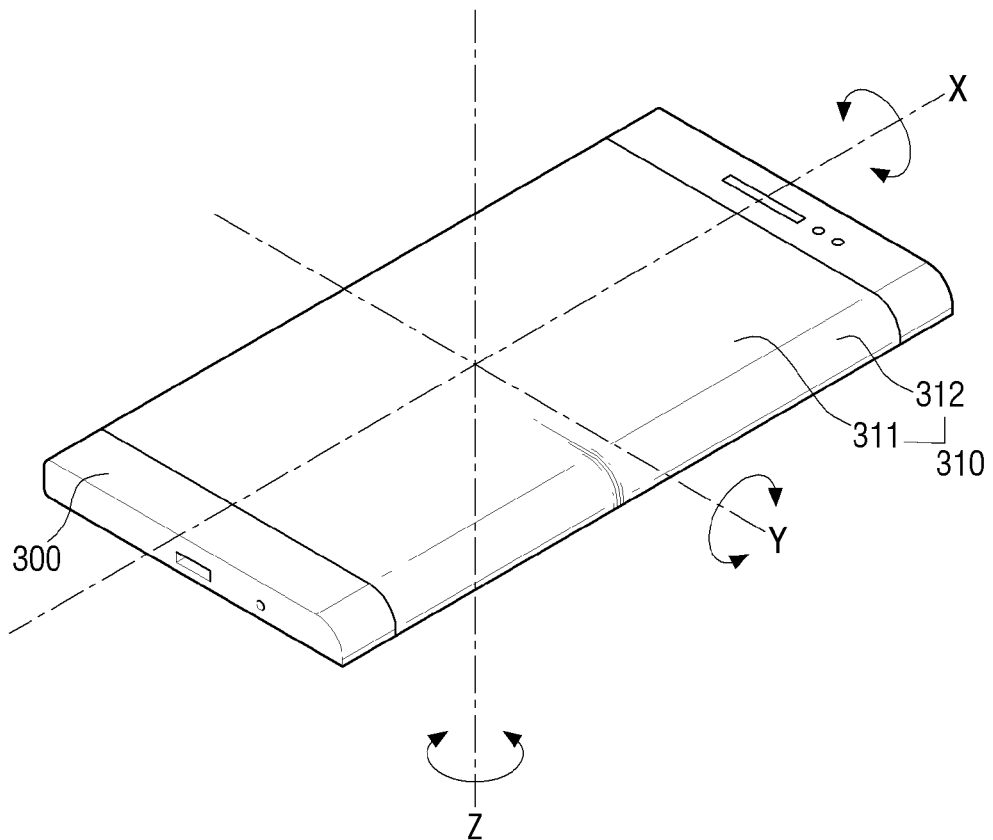
FIG. 4 is a view explaining motion of a portable terminal according to an exemplary embodiment of the present disclosure.

The motion sensor 182 may sense a motion (e.g., rotating motion or tilting motion) of the portable terminal 100 using at least one of an acceleration sensor, a tilt sensor, a gyro sensor, and a 3-axis magnetic sensor, and transfer a generated electrical signal to the controller 190. For example, in the case of the acceleration sensor, as shown in FIG. 4, the motion sensor 182 may measure the gravitational acceleration with respect to X, Y, and Z axes based on the portable terminal 100. In particular, the motion sensor 182 may measure an acceleration in which the kinetic acceleration of the portable terminal 100 and the gravitational acceleration are added, and measure only the gravitational acceleration if the portable terminal 100 has no motion. As an example, explanation will be made on the assumption that a direction in which the front surface of the portable terminal 100 is directed upward is a positive (+) direction of the gravitational acceleration, and a direction in which the rear surface of the portable terminal 100 is directed upward is a negative (−) direction of the gravitational acceleration.

As illustrated in FIG. 4, if the rear surface of the portable terminal 100 comes in contact with a horizontal surface, the gravitational acceleration measured by the motion sensor 182 may include X-axis and Y-axis components measured as 0 m/sec$^2$ and a Z-axis component measured as a specific positive value (e.g., +9.8 m/sec$^2$). In contrast, if the front surface of the portable terminal 100 comes in contact with the horizontal surface, the gravitational acceleration measured by the motion sensor 182 may include X-axis and Y-axis components measured as 0 m/sec$^2$ and a Z-axis component measured as a specific negative value (e.g., −9.8 m/sec$^2$).

In addition, if it is assumed that the portable terminal 100 is slantingly put on the surface of a table, the gravitational acceleration measured by the motion sensor 182 may include a value that is not 0 m/sec$^2$ with respect to at least one axis, and in this case, the square root of the sum of squares of three-axis components, i.e., the length of a vector sum, may be the specific value (e.g., 9.8 m/sec$^2$). In this case, the motion sensor 182 senses accelerations with respect to X, Y, and Z-axis directions in the coordinate system. In accordance with the position to which the sensor is attached, the respective axes and the corresponding gravitational accelerations may be changed.

In the case where the gravitational acceleration that is transferred from the motion sensor 182 is measured with respect to at least one axis component, the controller 190 may confirm (calculate) the posture of the portable terminal 100 using the accelerations with respect to the axes. The posture may be indicated by a roll angle $\Phi$, a pitch angle $\theta$, and a yaw angle $\Psi$. In FIG. 4, the roll angle $\Phi$ may be a rotating angle about the X-axis, the pitch angle $\theta$ may be a rotating angle about the Y-axis, and the yaw angle $\Psi$ may be a rotating angle about the Z-axis. As exemplified in FIG. 4, if the Z-axis gravitational acceleration that is transferred from the motion sensor 182 is +9.8 m/sec$^2$, the posture of the portable terminal 100 corresponds to the roll angle $\Phi$ of "0" and the pitch angle $\theta$ of "0", and thus the rear surface that receives the Z-axis gravitational acceleration is put in the direction of gravity. Through this, any posture of the portable terminal 100 can be sensed, and a posture detector for detecting the posture of the portable terminal 100 may be additionally implemented.

The controller 190 can determine the posture of the portable terminal using algorithms, such as a posture calculation algorithm using Euler angles, a posture calculation algorithm using extended Kalman filters, and an acceleration prediction switching algorithm. According to exemplary embodiments of the present disclosure, various methods for measuring the posture of the portable terminal can be implemented.

The controller 190 controls the whole operation of the portable terminal 100 using various kinds of programs stored in the storage 150.

As illustrated in FIG. 1, the controller 190 includes a RAM 191, a ROM 192, a graphic processor 193, a main CPU 194, first to n-th interfaces 195-1 to 195-n, and a bus 196. In this case, the RAM 191, the ROM 192, the graphic processor 193, the main CPU 194, and the first to n-th interfaces 195-1 to 195-n may be connected to each other through the bus 196.

A command set for system booting is stored in the ROM 192. If a turn-on command is input and the power is supplied, the main CPU 194 copies the OS stored in the storage 150 into the RAM 191 according to the command stored in the ROM 192, and boots the system by executing the OS. If the booting is completed, the main CPU 194 copies various kinds of application programs stored in the storage 150 into the RAM 191, and performs various kinds of operations by executing the application programs copied into the RAM 191.

The graphic processor 193 generates a screen that includes various objects, such as items, images, and texts using an operator and a renderer. The operator operates attribute values, such as coordinate values, shapes, sizes, and colors of the objects to be displayed according to the layout of the screen using a control command that is received from the sensor 180. The renderer generates screens of various layouts including the objects on the basis of the attribute values operated by the operator. The screens generated by the renderer are displayed in the display region of the display 130.

The main CPU 194 accesses the storage 150 and performs booting using the OS stored in the storage 150. Further, the main CPU 194 performs various operations using various kinds of programs, content, and data stored in the storage 150.

The first to n-th interfaces 195-1 to 195-n are connected to the various kinds of constituent elements as described above. One of the interfaces may become a network interface that is connected to an external device through a network.

In particular, the controller 190 may control the display region that corresponds to a transparent region that is provided by the display 130 in response to a user input for selecting a UI element through the sensor 180 while the UI element is displayed on the exposed display region in a state where a part of the display region is covered by a cover that includes the transparent region to be exposed to an outside of the cover.

In another embodiment, the controller 190 may control the display region that is exposed to an outside of a cover that is provided by the display 130 in response to a user input for selecting a UI element through the sensor 180 while the UI element is displayed on the display region that corresponds to a transparent region in a state where a part of the display region is covered by the cover that includes the transparent region to be exposed to the outside of the cover.

In still another embodiment, the controller 190 may control the display region that corresponds to a transparent region that is provided by the display 130 in response to a user input for selecting a UI element through the sensor 180 while the UI element is displayed on a side display region in a state that a front display region is covered by a front cover including the transparent region.

FIGS. 3A to 3F are views illustrating examples of a portable terminal 100 according to exemplary embodiments of the present disclosure.

As illustrated in FIGS. 3A to 3F, a portable terminal 100 according to an exemplary embodiment of the present disclosure is configured to include a curved display 310, a main body 300 on which the curved display 310 is seated to be fastened thereto, and an additional device formed on the main body 300 to perform functions of the portable terminal 100. The additional device may include a speaker 321, sensors (e.g., an illumination sensor 322 and a front camera module 323), a connection interface (e.g., a charging port, a data input/output port, and an audio input/output port) 324, a microphone 325, and a physical button.

In an exemplary embodiment of the present disclosure, the term "curved display region" means a region on which data is displayed on the display 310. Further, the term "display region" means a region on which data is displayed on a curved portion of the display and a flat portion of the display. The data means all pieces of information that can be displayed on the display region, such as images, texts, and moving images, and may be displayed through various kinds of screens. A screen may be composed of one layer or a plurality of layers. A plurality of layers may successively overlap each other to form the screen, and in this case, a user may recognize various kinds of data arranged on the plurality of layers as one screen.

Figure 3A:
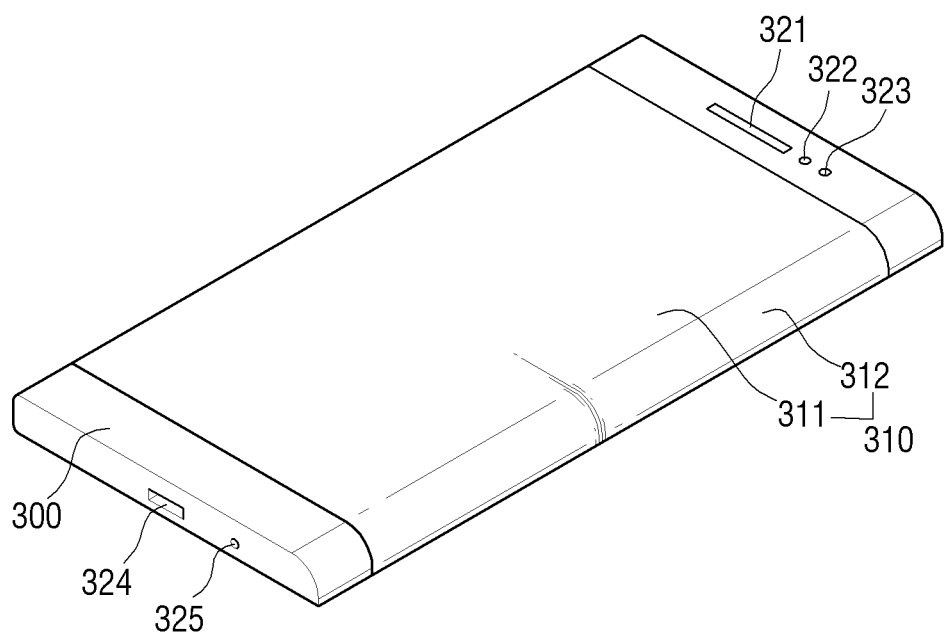
Figure 3B:
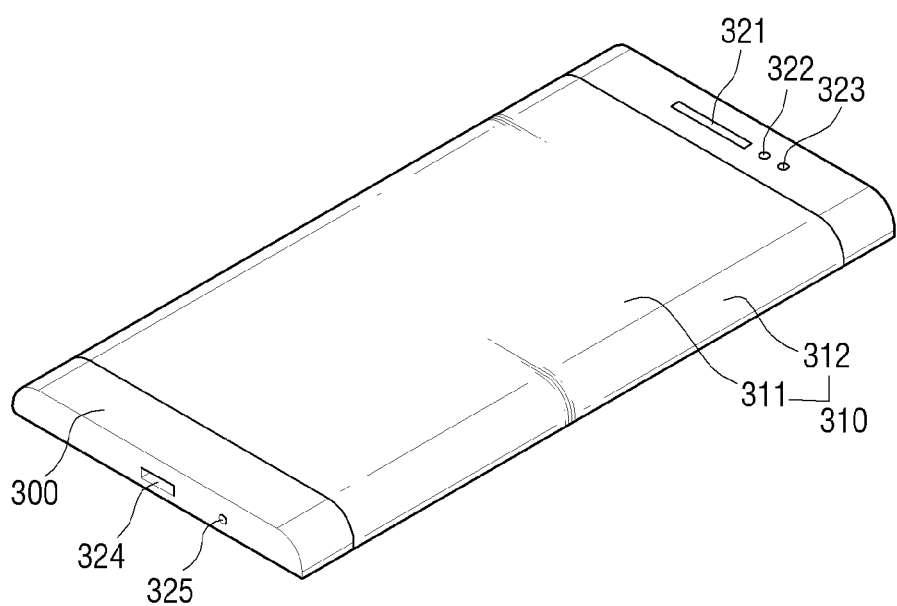
Figure 3C:
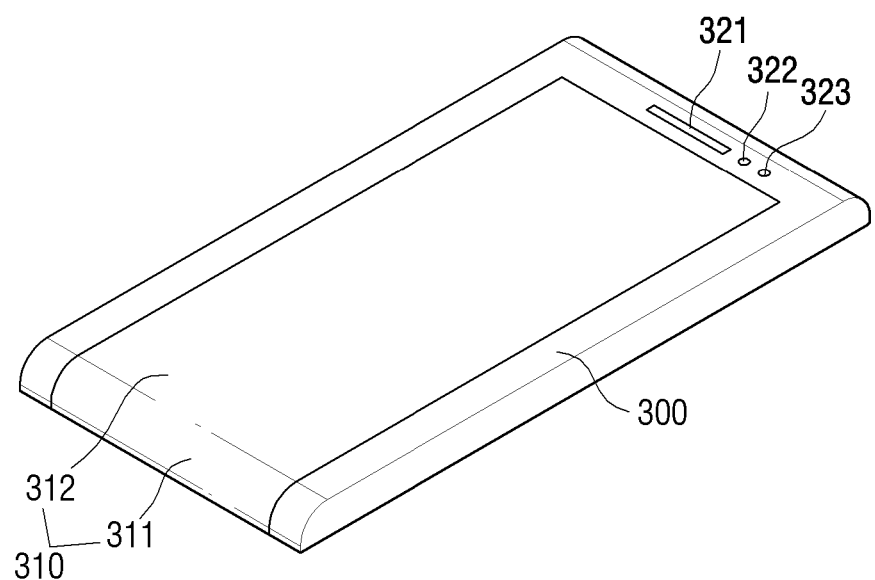

Further, in the portable terminal 100 having a curved display as shown in FIGS. 3A to 3C, a display region 311 that corresponds to the front surface of the portable terminal 100 may be called a front display region 311 or a main display region 311, and a display region 312 that corresponds to the side surface of the portable display 100 may be called a side display region 312 or an auxiliary display region 312.

Figure 3D:
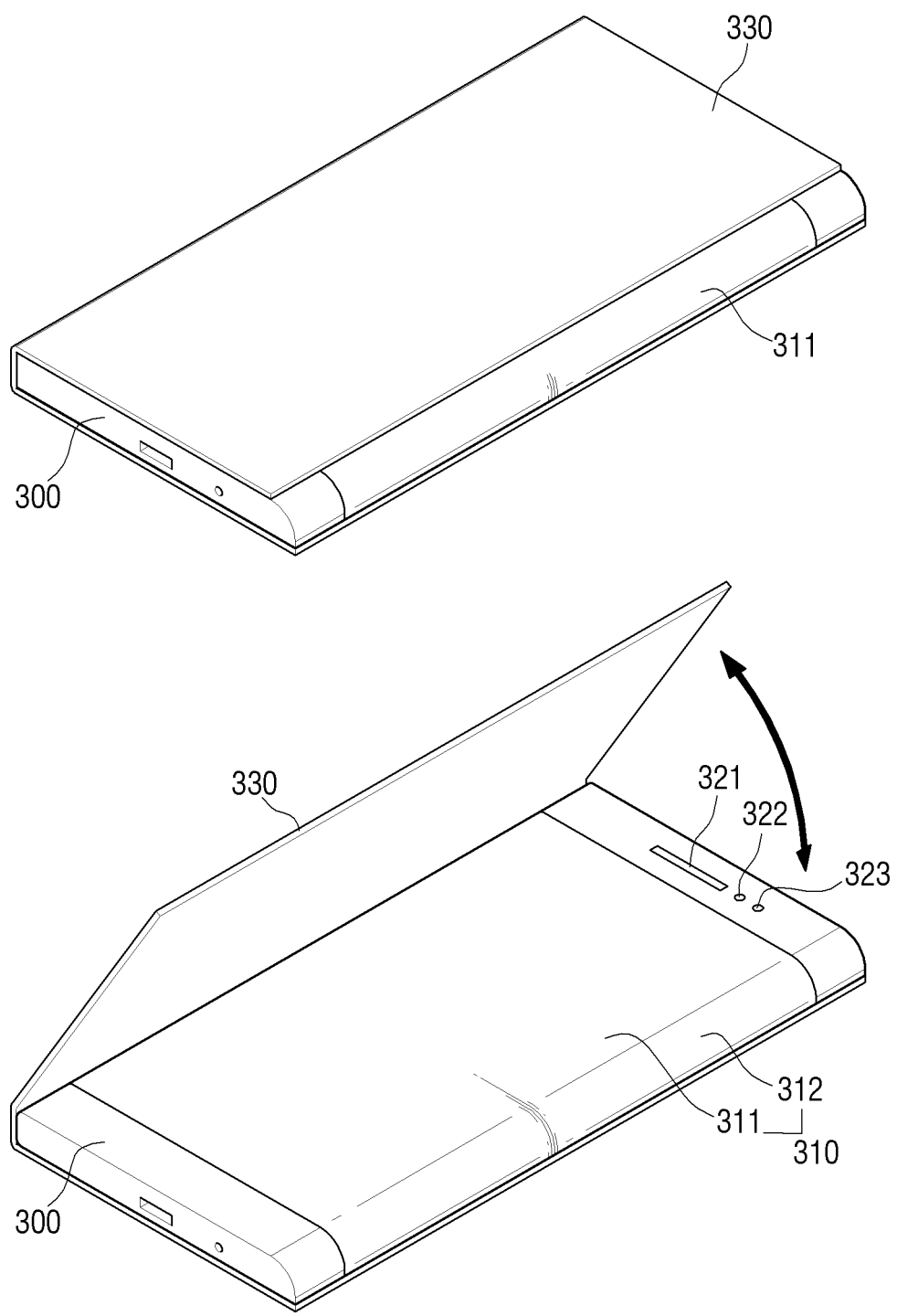

Further, in the portable terminal 100 having both a curved display and a cover as shown in FIG. 3D, in the case that the front surface of the portable terminal 100 is covered by the cover, a display region that is covered by the cover on the front surface of the portable terminal 100 may be called a front display region 311, a main display region 311, or a display region 311 within the cover. In contrast, a display region that is not covered by the cover on the side surface of the portable terminal 100 may be called a side display region 312, an auxiliary display region 312, a display region 312 outside the cover, or an exposed display region 312.

Further, as shown in FIG. 3E, a display region 313 that is covered by the cover of the portable terminal 100 may be called a main display region 313 or a display region 313 within the cover. In contrast, a display region on the side surface of the portable terminal 100 that is not covered by the cover and a partial display region on the front surface of the portable terminal 100 may be called an auxiliary display region 314, a display region 314 outside the cover, or an exposed display region 314.

Further, in the portable terminal 100 having a flat display as shown in FIG. 3F, in the case that a part of the front display region of the portable terminal 100 is covered by the cover, a display region 315 that is covered by the cover may be called a main display region 315 or a display region 315 within the cover. In contrast, a partial display region on the front surface of the portable terminal 100 and a display region that is not covered by the cover on the side surface of the portable terminal 100 may be called an auxiliary display region 316, a display region 316 outside the cover, or an exposed display region 316.

Further, in an exemplary embodiment of the present disclosure, the cover may include not only a cover that covers the front display region of the portable terminal 100 but also a cover that covers the whole or at least a part of the side display region of the portable terminal 100. In this case, the cover that covers the front display region may be called a front cover, and the cover that covers the side display region may be called a side cover. Further, the front cover and the side cover may be provided in a body or separately.

In an exemplary embodiment of the present disclosure, a case that the portable terminal 100 is provided with the front cover means that the portable terminal 100 may be provided with not only the front cover but also the side cover.

Figure 5:
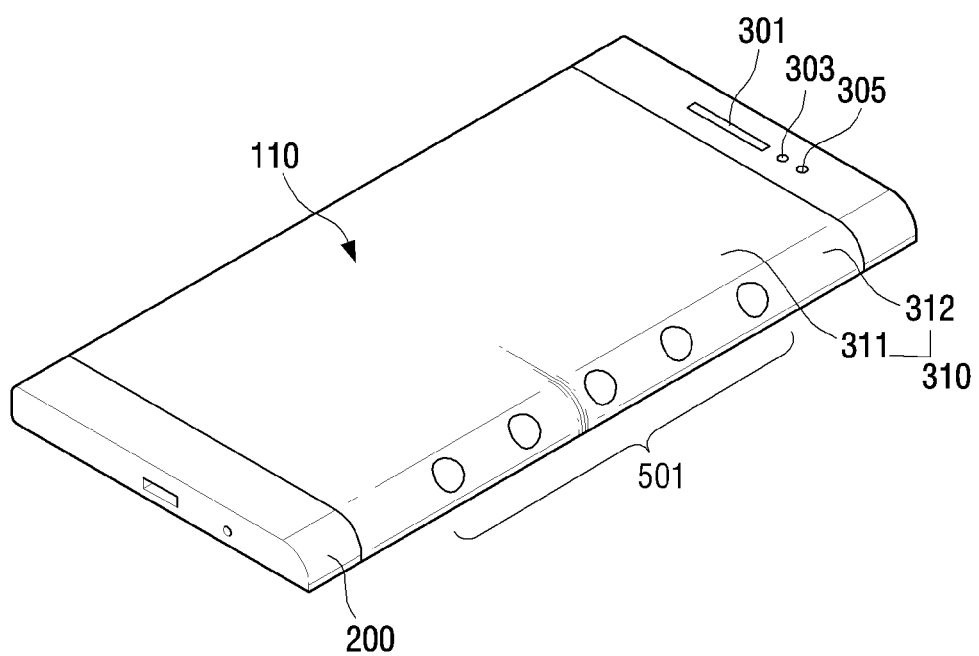
FIG. 5 is a view illustrating a portable terminal providing notification information according to an exemplary embodiment of the present disclosure.

FIG. 5 is a view illustrating a portable terminal 100 providing notification information according to an exemplary embodiment of the present disclosure.

Referring to FIG. 5, the portable terminal may provide notification information 501 using the side display region 312. The notification information 501 may mean information that the portable terminal 100 displays in response to receiving data or information from another external device. For example, the notification information 501 may include an event, such as call reception, message reception (e.g., message reception based on SMS (Short Message Service)/MMS (Multimedia Message Service), mail reception, reception of information of a push service, or reception of a notification of an SNS (Social Networking Service). Further, the notification information 501 is information that is generated in the portable terminal 100, and may mean information related to the current state of the portable terminal 100. For example, the notification mode 501 may include information, such as a battery residual amount of the portable terminal 100, the current time, a connection state of a long-distance or short-distance network of the portable terminal 100, a destination mode state (e.g., vibration mode, silent mode, or sound mode) of the portable terminal 100, or a existence/nonexistence state of alarm information set by a user.

According to an exemplary embodiment of the present disclosure, if the notification information 501 is generated in a state that the front display region of the portable terminal 100 is not in use (e.g., in a state where the front display region is hidden by an object (e.g., cover of the portable terminal 100) or a notebook, or the front surface of the portable terminal 100 is directed downward to come in contact with the surface of the table), the portable terminal 100 may provide the notification information 501 through the side display region 312. This state may also include a state that a user places the portable terminal 100 face down on the table, for example, during a meeting. That is, the user may change the state of the portable terminal 100, such as the front display region 311 of the portable terminal 100 is directed downward to come in contact with the surface of the table. Further, as shown in FIG. 3D, the front display region 311 of the portable terminal 100 may be hidden by a separate cover or a notebook.

In the above-described state, the portable terminal 100 may detect the state of the portable terminal 100 and enter into a side display use mode. The state of the portable terminal 100 may be detected by an illumination sensor for detecting a change of a quantity of light, a sensor for detecting the posture of the portable terminal 100 (e.g., a geomagnetic sensor or an acceleration sensor), a hall sensor, and/or a timer. Here, the above-described sensors may be integrated into one chip, or a plurality of sensors may be implemented as separate chips. For example, the portable terminal 100 may determine the current state in accordance with an illumination value that is detected by the illumination sensor. Further, the portable terminal 100 may determine the current state in accordance with posture information (e.g., measurement values with respect to X, Y, and Z axes) that is detected by an operation sensor. Further, the portable terminal 100 may determine the current state in accordance with the current time that is detected by the timer. In the case of using the timer, the portable terminal 100 may determine whether the current time of the portable terminal 100 corresponds to a time that is set by a user to automatically execute a manner notification mode, and if the current time corresponds to the user set time, portable terminal 100 may enter into the manner notification mode.

As described above, if the front display region of the portable terminal 100 is hidden and the side display region use mode is executed, the front display region may be processed with a single color (e.g., black color), or the power supply to the front display region and the side display region may be separated to intercept the power supply to the front display region. In this case, in the side display use mode, only a screen output may be performed with a sound output and a vibration output omitted, and this may be diversely defined in accordance with the user's setting.

Further, a right-hand mode or a left-hand mode of the portable terminal 100 may be defined through environment setting or a separate application provided by the portable terminal 100. In this case, the portable terminal 100 may operate only the side display region that corresponds to the determined mode. As an example, as shown in FIG. 3B, if the right-hand mode is set in a state that the portable terminal 100 has both a right-side display region and a left-side display region, the alarm information may be output using the right-side display region, while if the left-hand mode is set, the alarm information may be output using the left-side display region.

FIGS. 6A to 6H are views illustrating various examples of covers having transparent regions according to exemplary embodiments of the present disclosure. A transparent region is a region through which a user can see a display region that corresponds to the transparent region. That is, the transparent region may include not only a region of the cover having a hole, that is to say a region of the cover in which the cover is cut away such that no material of the cover is present, but also a partial region of the cover that is formed of a transparent or semi-transparent material to show the display region.

Referring to FIG. 6A, a transparent region 611 of the cover is positioned within the cover, and may be spaced apart from the display region 612 that is exposed to an outside of the cover. In this case, the transparent region 611 of the cover may have a circular shape as shown as 610 of FIG. 6A, or may have a rectangular shape as shown as 610-2 of FIG. 6A. In addition, the transparent region 611 of the cover may have a polygonal shape, a rounded polygonal shape, or an elliptical shape, but the shape of the transparent region 611 is not limited thereto.

Further, referring to FIG. 6B, the transparent region 611 of the cover may be connected to a display region 612 that is exposed to the outside of the cover to open a part of the cover. In this case, the transparent region 611 of the connection type cover may have a circular shape as shown as 610-3 of FIG. 6B, or may have a rectangular shape as shown as 610-4 of FIG. 6B. In addition, the transparent region of the connection type cover may have a polygonal shape, a rounded polygonal shape, or an elliptical shape, but the shape of the transparent region is not limited thereto. As shown in FIG. 6B, in a state that the transparent region 611 of the cover is connected to the display region 612 exposed to the outside of the cover, the display region within the cover means the transparent region 611 of the cover. That is, although the transparent region 611 of the cover is not entirely surrounded by the cover, the transparent region 611 of the cover may be called a display region within the cover in the case that one side of the cover is substantially recessed to be seen as a region that is included in the cover.

Further, as shown in FIGS. 6C and 6D, the cover having the transparent region 611 may cover a part of the front display region of the curved display. Further, as shown in FIGS. 6E and 6F, the cover having the transparent region 611 may cover a part of the front display region of the flat display. Further, as shown in FIGS. 6G and 6H, the cover having the transparent region 611 may cover both the front display region and the side display region of the curved display. In this case, of the cover having the transparent region 611, the cover that covers the front display region may be called a front cover, and the cover that covers the side display region may be called a side cover. Further, the front cover and the side cover may be provided in an integrated shape or in a separated shape.

Hereinafter, various examples to display information in the portable terminal 100 according to exemplary embodiments of the present disclosure will be described with reference to FIGS. 7A to 25B.

Various examples of FIGS. 7A to 25B are disclosed with respect to the portable terminal 100 mainly having a curved display, but may also be applicable to the portable terminal 100 having a flat display as shown in FIG. 3F. In this case, the front display region of the bended display may correspond to the display region within the cover of FIG. 3F. The side display region of the curved display may correspond to the display region outside the cover of FIG. 3E.

In an exemplary embodiment, the controller 190 may display a UI (User Interaction) element (e.g., application identification information) on the exposed display region in a state that a part of the display region is covered by the cover including the transparent region to be exposed to the outside of the cover. Further, the controller 190 may control the display region that corresponds to the transparent region in response to the user input for selecting the UI element while the UI element is displayed.

In another exemplary embodiment, the controller 190 may display a UI element on the display region that corresponds to the transparent region in a state that a part of the display region is covered by the cover including the transparent region to be exposed to the outside of the cover. Further, the controller 190 may control the display region that is exposed to the outside of the cover in response to the user input for selecting the UI element while the UI element is displayed.

Figure 7A:
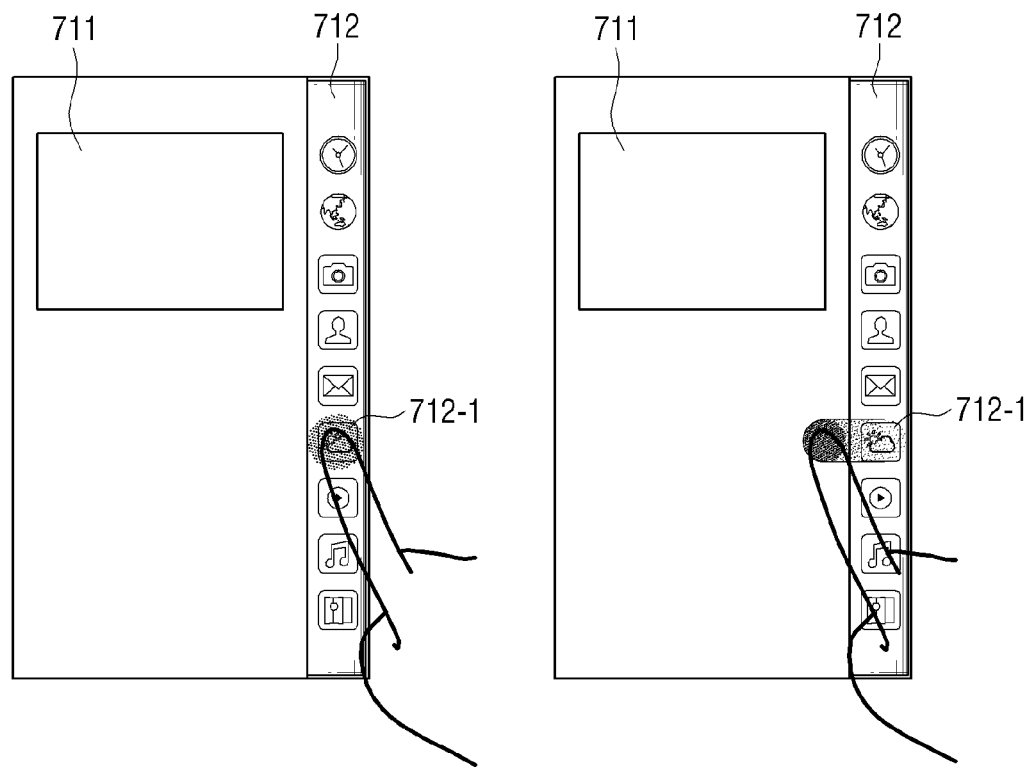
Figure 7B:
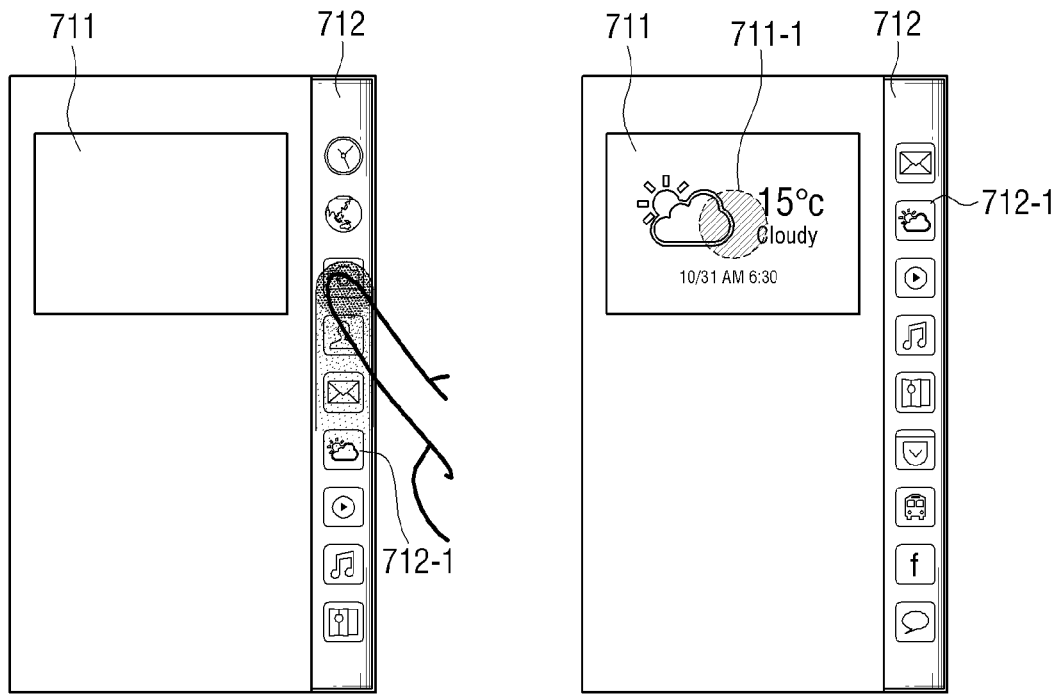
Figure 7C:
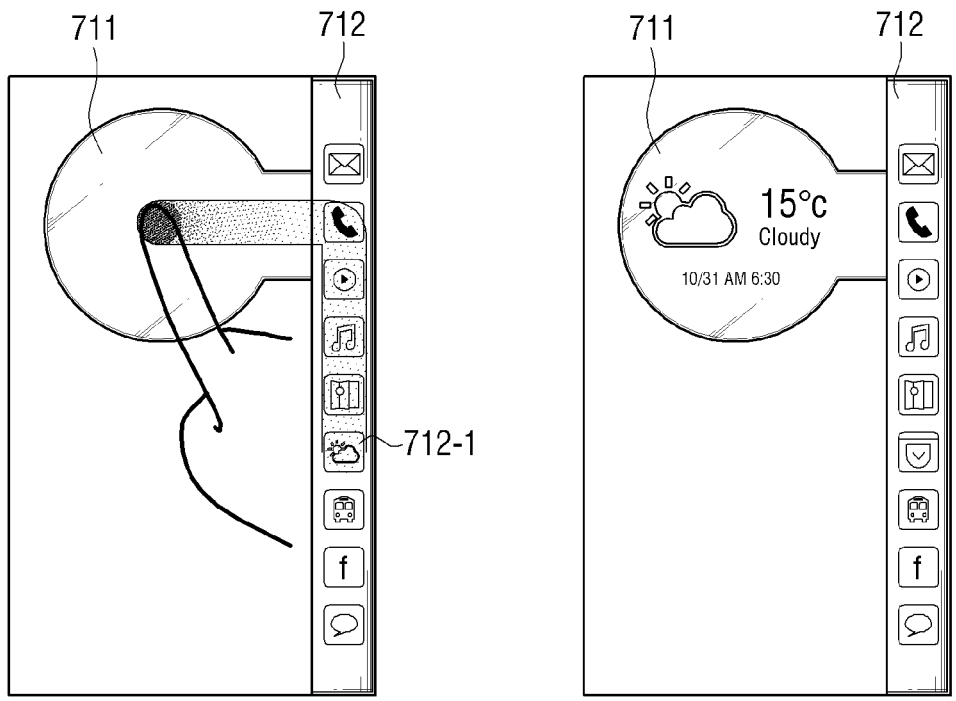

First, as shown in FIGS. 7A to 7C, in a state that a plurality of UI elements are displayed on a display region 712 exposed to the outside of the cover, the sensor 180 may sense a user input for selecting one element 712-1 of the plurality of UI elements. Further, the controller 190 may control the display 130 so that information related to the UI element 712-1 is displayed on a display region 711 that corresponds to the transparent region of the cover in response to the user input for selecting the UI element 712-1.

As an example, referring to 710 of FIG. 7A, the user input for selecting the UI element 712-1 may include a user's tap gesture that touches the UI element 712-1 on the display region 712 that is exposed to the outside of the cover.

As another example, referring to 720 of FIG. 7A, the user input for selecting the UI element 712-1 may include a user's flick gesture that flicks the UI element 712-1 in a direction in which the cover is positioned after the UI element 712-1 is touched on the display region 712 that is exposed to the outside of the cover.

As still another example, referring to 730 of FIG. 7B, the user input for selecting the UI element 712-1 may include a user's drag gesture that drags the UI element 712-1 along a long side after the UI element 712-1 of the display region 712 that is exposed to the outside of the cover is touched. In response to the user's drag gesture, as shown as 740 of FIG. 7B, the UI element 712-1 moves to a position that is adjacent to the display region 711 that corresponds to the transparent region, and if the user input is not received for a predetermined time (about 0.5 to 1.5 seconds), the controller 190 may control the display 130 so that information related to the UI element 712-1 is automatically displayed on the display region 711 that corresponds to the transparent region. In this case, the position that is adjacent to the transparent region may be, for example, a position that is horizontal to a center portion 711-1 of the transparent region on the display region that is exposed to the outside of the cover.

As still another example, referring to 750 of FIG. 7C, the user input for selecting the UI element 712-1 may include a user's drag gesture that drags the UI element 712-1 to the display region 711 that corresponds to the transparent region after the UI element 712-1 of the display region 712 that is exposed to the outside of the cover is touched. In this case, because the display region 711 that corresponds to the transparent region and the display region 712 that is exposed to the outside of the cover are connected to each other, a user can seamlessly drag the UI element 712-1. Further, if the touch of the UI element 712-1 is released on the display region 711 that corresponds to the transparent region, as shown as 760 of FIG. 7C, the controller 190 may control the display 130 so that information related to the UI element 712-1 is displayed on the display region 711 that corresponds to the transparent region.

Referring to 810 of FIG. 8, if the cover of the portable terminal 100 is opened, the display 130 may display application identification information on a display region 811. If the user closes the cover in the state as described above, as shown as 820 of FIG. 8, the controller 190 may control the display 130 so that reconfigured application identification information is displayed on an exposed display region 812. In this case, the reconfigured application identification information on the exposed display region 812 may be a subset of identification information of applications displayed on the front display region 811 before being covered by the cover. For example, the reconfigured application identification information on the exposed display region 812 may have a size that is equal to or smaller than the size of the application identification information displayed on the front display region 811 before being covered by the cover, or may be a different type of UI element.

Referring to 910 of FIG. 9, in a state that an application identification information list that includes application identification information is displayed on an exposed display region 912, the sensor 180 may sense the user input that moves along the long side of the exposed display region 912. The user input may be, for example, a touch drag gesture in a vertical direction. In response to the user input, the controller 190 may move the application identification information included in the application list.

As the result of the movement, as shown as 920 of FIG. 9, the controller 190 may control the display 130 so that the application list that includes the identification information of which the position has been moved is displayed on the exposed display region 912. In this case, in response to a user history, the identification information may be displayed through circular movement. As an example, if one piece of identification information disappears from one side of the exposed display region 912, the one piece of identification information may be displayed again on an opposite side of the exposed display region 912. Further, if one piece of identification information disappears from one side of the exposed display region 912, new identification information may be displayed on one opposite side of the exposed display region 912.

Referring again to 920 of FIG. 9, one piece of application identification information 912-1 may move to a position that is adjacent to a display region 911 that corresponds to the transparent region of the cover. If the sensor 180 does not receive the user input for a predetermined time (about 0.5 to 1 second) in this state, the controller 190 may control the display 130 so that the display region 911 that corresponds to the transparent region is switched from an off state to an on state. Further, the controller 190 may control the display 130 so that information related to an execution of one application is displayed on the display region 911 that corresponds to the transparent region. The information related to the execution of one application may be, for example, at least one of an application execution screen, application summary information, and a menu screen for executing the application. For example, if one piece of application identification information is a weather icon 912-1, the information related to the execution of the application may be an execution screen of a weather application related to the weather icon.

Referring to 1010 of FIG. 10A, in a state that an application identification information list that includes phone application identification information (e.g., phone application icons) is displayed on an exposed display region 1012, the sensor 180 may sense a user input for selecting phone application identification information 1012-1. The user input may be a tap gesture that touches the identification information and then releases the touch. In response to the user input, as shown as 1020 of FIG. 10A, the controller 190 may display at least one of a keypad, a call button, a text message switchover button, a video call button, and a delete button on a display region 1011 that corresponds to the transparent region. Further, the controller 190 may control the display 130 so that information related to a phone application (e.g., UI element that can control the phone application) is displayed on the exposed display region 1012. The UI element that can control the phone application may include, for example, at least one of a keypad UI element, a latest phone record search UI element, a favorite phone number search UI element, and a contact address search UI element.

In the case where a keypad is displayed on the display region 1012 that corresponds to the transparent region, the sensor 180 can sense a user input for selecting at least one of numerals or characters of the keypad. In response to the user input, as shown as 1030 of FIG. 10B, the controller 190 may control the display 130 so that phone number information related to an input numeral or character is displayed on the exposed display region 1012 as the result of performing an auto complete function. For example, in response to a user input for selecting several numerals, the controller 190 may search for a phone number that includes the selected numerals, and control the display 130 so that the searched phone number is displayed on the exposed display region 1012. Next, as shown as 1040 of FIG. 10B, if the sensor 180 senses a user input for selecting a call button, the controller 190 may perform call connection with the searched phone number in response to the user input.

Figure 11A:
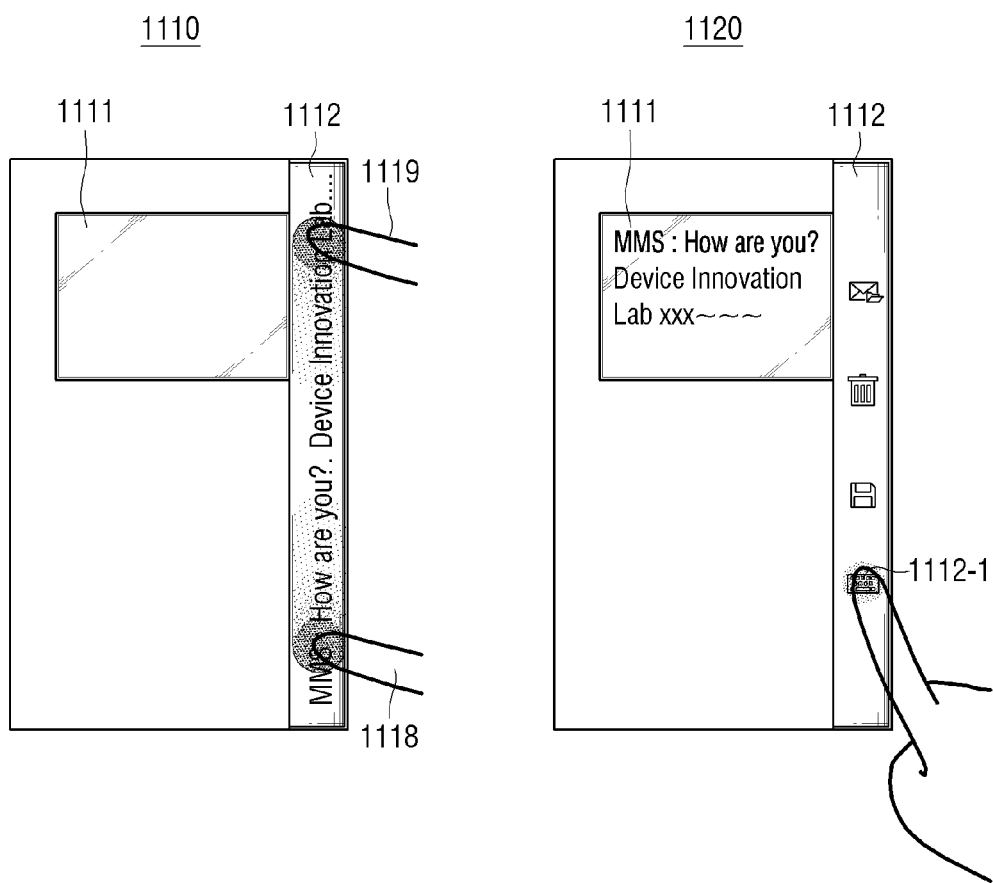

Referring to 1110 of FIG. 11A, in the case that a message is received in the portable terminal 100, the controller 190 may control the display 130 so that at least a part of the received message is displayed on an exposed display region 1112. In a state that the message is displayed on the exposed display region 1112, the sensor 180 may sense a user input on the exposed display region 1112. For example, the sensor 180 may sense a user input that moves along the long side of the exposed display region 1112 of the exposed region. The user input may be, for example, a touch drag gesture in the lower or upper direction. If the user input is a touch drag gesture 1118 in the lower direction, the controller 190 may delete the message and control the display so that the message is not displayed on the exposed display region 1112.

In contrast, if the user input is a touch drag gesture 1119 in the upper direction, as shown as 1120 of FIG. 11A, the controller 190 may display information related to the message on a display region 1111 that corresponds to the transparent region. The information related to the message may be, for example, a message having more information. For example, if the title of the message is displayed on the exposed display region 1112, the text of the message may be displayed on the display region 1111 that corresponds to the transparent region. Further, in the case that a part of the text of the message is displayed on the exposed display region 1112, the entire text of the message or a larger amount of the message text than the amount of a part of the message text may be displayed on the display region 1111 that corresponds to the transparent region.

Here, as an example, if the information related to the message is displayed on the display region 1111 that corresponds to the transparent region, the sensor 180 may sense the user input on the display region 1111 that corresponds to the transparent region. The user input may be, for example, a touch drag gesture. In response to the user input, the controller 190 may control the display 130 so that other information related to the message is displayed on the display region 1111 that corresponds to the transparent region. Here, the other information related to the message may be the text of the message that includes the contents that are different from the contents of the message that is being displayed or a UI element that can control the message.

Referring again to 1120 of FIG. 11A, while the information related to the message is displayed on the display region 1111 that corresponds to the transparent region is displayed, the controller 190 may control the display 130 so that a UI element that can control a message application is displayed on the exposed display region 1112. The UI element may include, for example, at least one of a message storage UI element, a message delete UI element, a message origination storage UI element, a message spam registration UI element, and a keypad UI element for message preparation. While the UI element is displayed on the exposed display region 1112, the controller 190 may sense a user input for selecting a keypad UI element 1112-1 to respond to the received message. In response to the user input, as shown as 1130 of FIG. 11B, the controller 190 may control the display 130 so that the keypad is displayed on the display region 1111 that corresponds to the transparent region.

Referring to 1130 of FIG. 11B, while the keypad is displayed on the display region 1111 that corresponds to the transparent region, the sensor 180 may sense a user input for selecting at least one of numerals or characters of the keypad. In response to the user input, as shown as 1140 of FIG. 11B, the controller 190 may control the display so that the result of the input through the keypad is displayed. For example, the controller 190 may control the display 130 so that at least a part of a response message according to input characters is displayed on the exposed display region 1112. Next, if the sensor 180 senses a user input for selecting a send button, the controller 190 may send the response message that is prepared using the keypad to a contact address that has sent the received message.

Figure 12A:
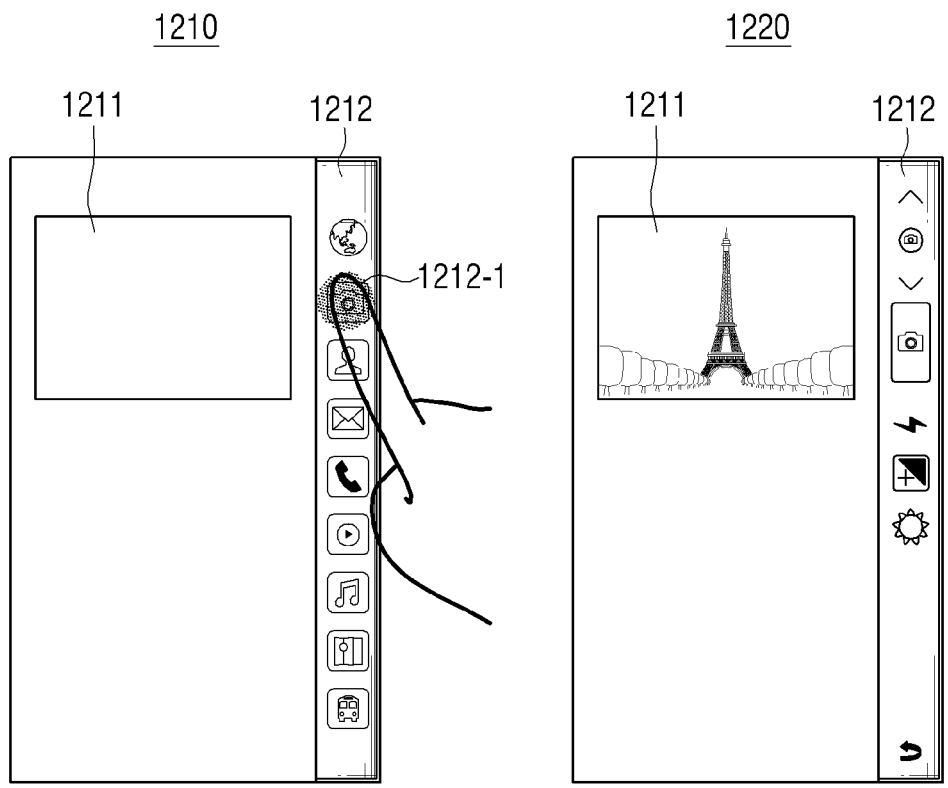
Figure 12B:
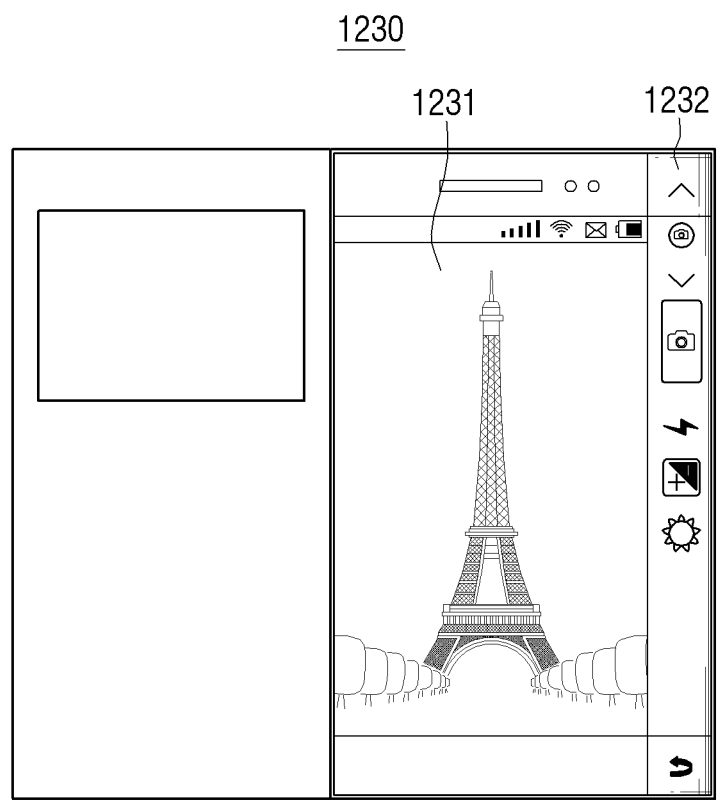

Referring to 1210 of FIG. 12A, in a state that an application identification information list that includes camera application identification information (e.g., camera application icons) is displayed on an exposed display region 1212, the sensor 180 may sense a user input for selecting the camera application identification information 1212-1. In response to the user input, as shown as 1220 of FIG. 12A, the controller 190 may control the display 130 so that information related to a camera application is displayed on a display region 1211 that corresponds to the transparent region. The information related to the camera application may be, for example, a preview screen before image capturing. Further, the controller 190 may control the display 130 so that a UI element that can control the camera application is displayed on the exposed display region 1212. The UI element may include, for example, at least one of a zoom-in UI element, a zoom-out UI element, an image capturing UI element, a setting UI element or a camera application end UI element, a flash on/off UI element, and an image capturing effect setting UI element. In a state that information related to the camera application is displayed on the display region 1211 that corresponds to the transparent region, the sensor 180 may sense a user input for opening the cover so that the whole display region is exposed. In response to the user input, as shown as 1230 of FIG. 12B, the controller 190 may control the display 130 so that the information related to the camera application is displayed on a display region 1231 that was covered by the cover. The information related to the camera application may be, for example, at least one of an enlarged preview screen before image capturing and a UI element that can control the preview screen before the image capturing.

Figure 13A:
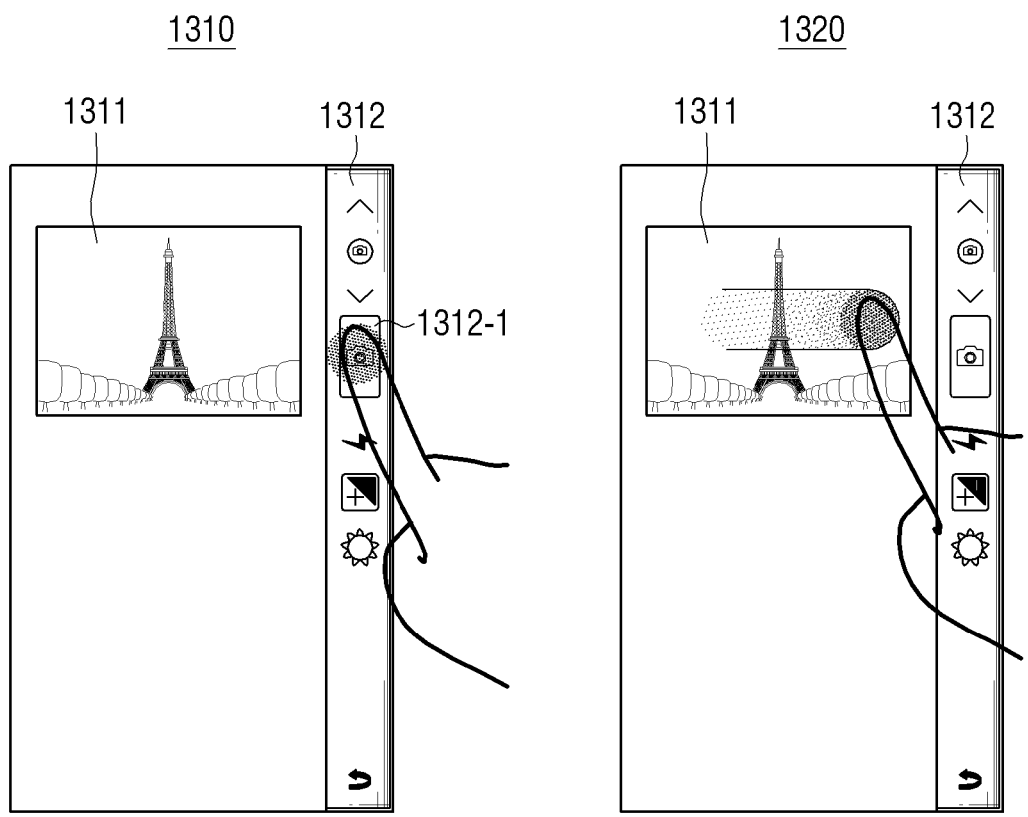
Figure 13B:
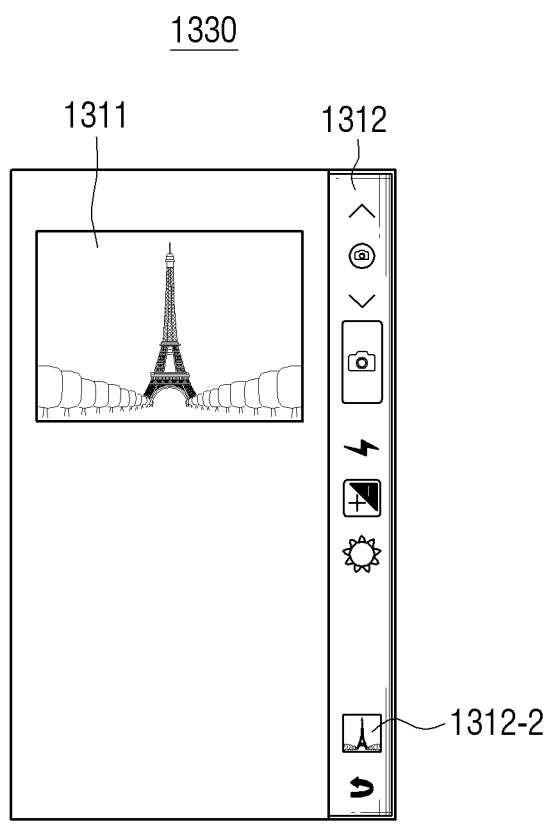

Referring to 1310 of FIG. 13A, while a preview screen is displayed on a display region 1311 that corresponds to the transparent region, the sensor 180 may sense a user input for selecting a UI element 1312-1 for capturing an image of an object of the preview screen on an exposed display region 1312. If the image of the object is captured, as shown as 1320 of FIG. 13A, the controller 190 may control the display so that captured video content (e.g., image or moving image) is displayed on the display region 1311 that corresponds to the transparent region. In this state, the sensor 180 may sense a user input on the display region 1311 that corresponds to the transparent region. The user input may be, for example, a flick gesture which touches the display region 1311 that corresponds to the transparent region and flicks in a direction of an exposed display region 1312. In response to the user input, as shown as 1330 of FIG. 13B, the controller 190 may control the display 130 so that a thumbnail 1312-2 of an image is displayed on the exposed display region 1312. As described above, the controller 190 may control the display 130 so that thumbnails of the video content are displayed in order on one side of the exposed display region 1312 in response to the user's flick gesture with respect to the captured video content.

Figure 13C:
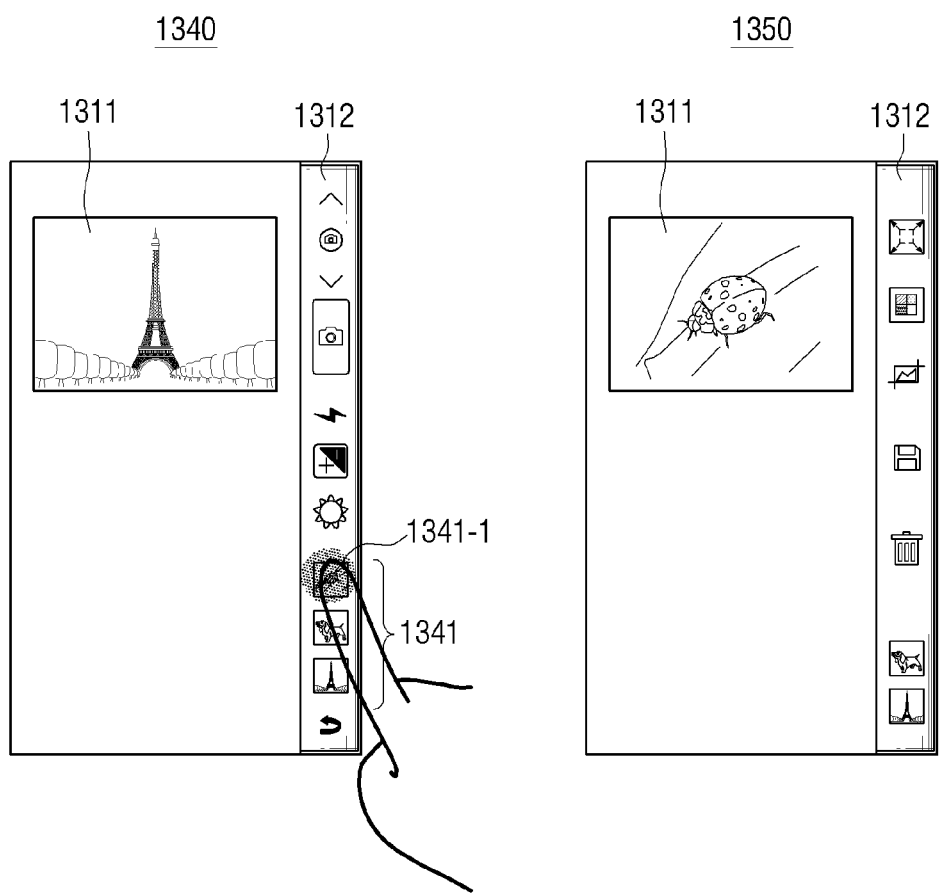

Referring to 1340 of FIG. 13C, in a state that thumbnails 1341 of the image are accumulated on one side of the exposed display region 1312, the sensor 180 may receive a user input for selecting one thumbnail 1341-1 among the thumbnails 1341 of the image. The user input may be, for example, a touch and hold gesture that touches one thumbnail 1341-1 and then maintains the touch over a predetermined time. In response to the user input, as shown as 1350 of FIG. 13C, the controller 190 may control the display 130 so that the video content of the selected thumbnail 1341-1 is displayed on the display region 1311 that corresponds to the transparent region and UI elements that can edit the video content or send the video content to a third party are displayed on the exposed display region 1312. The UI element for editing the video content may include, for example, at least one of a UI element for editing colors of the video content, a UI element for adopting a filter effect of the video content, a UI element for adding information to the video content, a UI element for storing the edited video content, a UI element for deleting the video content, and a UI element for deleting/moving/modifying a part of the video content in the case where the video content is a moving image.

Figure 14A:
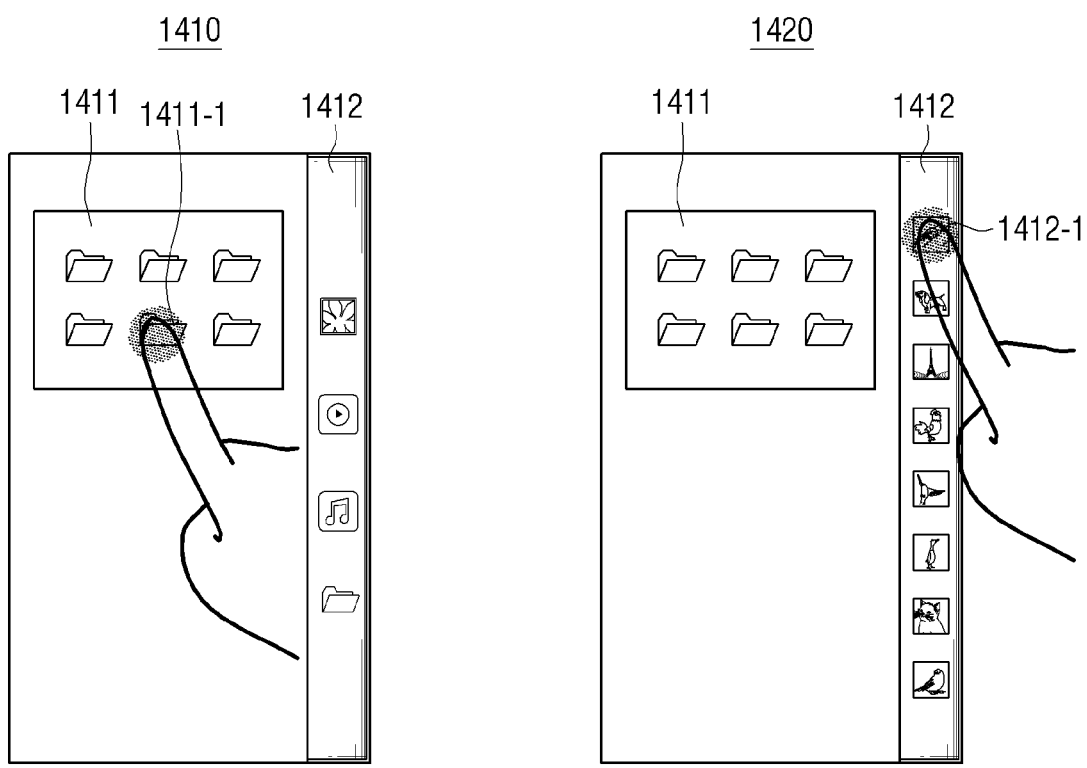
Figure 14B:
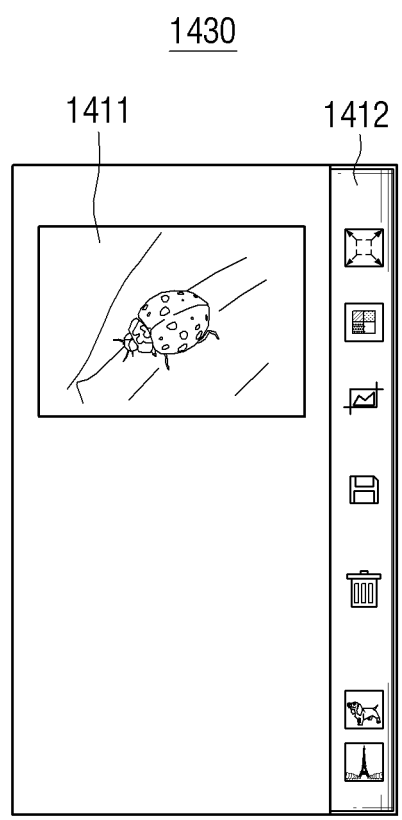

Referring to 1410 of FIG. 14A, the controller 190 may control the display 130 so that at least one folder in which content (e.g., image, audio, or moving image) is stored is displayed on a display region 1411 that corresponds to the transparent region. Further, the controller 190 may control the display 130 so that UI elements for performing content search are displayed on an exposed display region 1412. The UI element may include, for example, at least one of a text search UI element, a moving image search UI element, an image search UI element, and an audio search UI element. In this state, the sensor 180 may sense a user input for selecting one folder 1411-1 on the display region 1411 that corresponds to the transparent region. In response to the user input, as shown as 1420 of FIG. 14A, the controller 190 may control the display 130 so that thumbnails of the content included in the selected folder are displayed on the exposed display region 1412. While the thumbnails of the images are displayed, the sensor 180 may sense a user input for selecting one thumbnail 1412-1. In response to the user input, as shown as 1430 of FIG. 14B, the controller 190 may control the display 130 so that the video content of the selected thumbnail is displayed on the display region 1411 that corresponds to the transparent region and UI elements that can edit the video content or send the video content to a third party are displayed on the exposed display region 1412.

Referring to 1510 of FIG. 15, in the case that a gallery application is executed, the controller 190 may control the display 130 so that an image that is most recently stored, an image that is most frequently searched, or an image that is pre-designated by a user is displayed on a display region 1511 that corresponds to the transparent region. While the image is displayed, the sensor 180 may sense a user input for selecting the image. In response to the user input, as shown as 1520 of FIG. 15, the controller 190 may control the display 130 so that UI elements that can edit the image or send the image to a third party are displayed on the exposed display region. The UI element that can edit the image may include, for example, at least one of a UI element for adjusting the size of the image, a UI element for editing colors of the image, a UI element for applying a filter effect to the image, a UI element for adding information to the image, a UI element for storing the edited image, and a UI element for deleting the image.

Figure 16A:
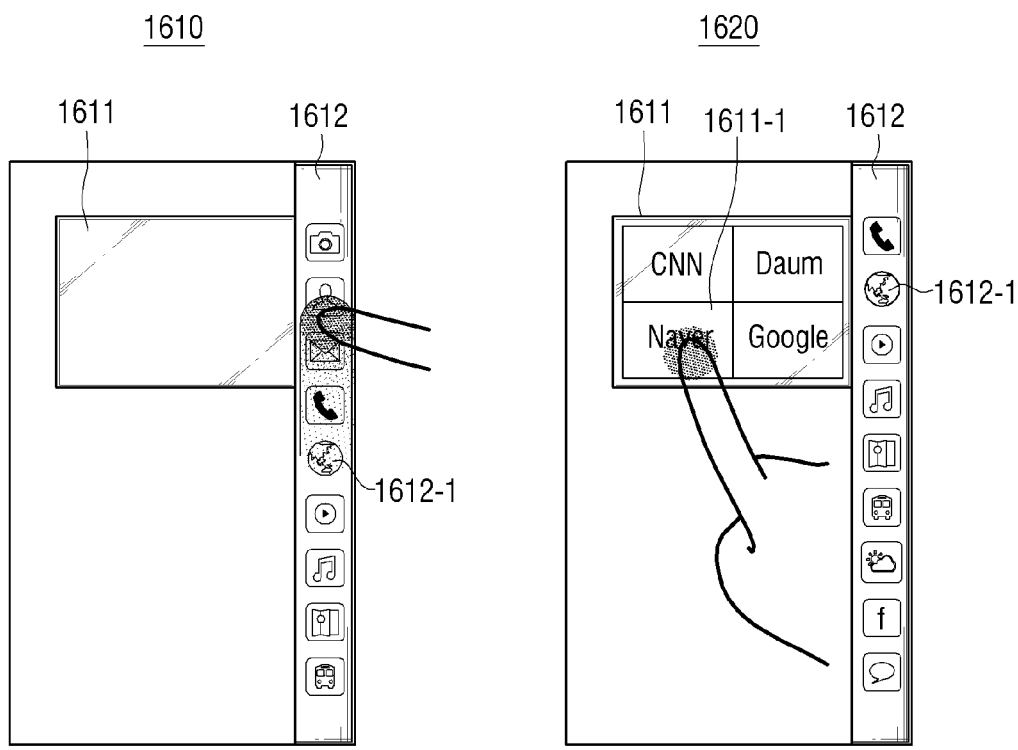
Figure 16B:
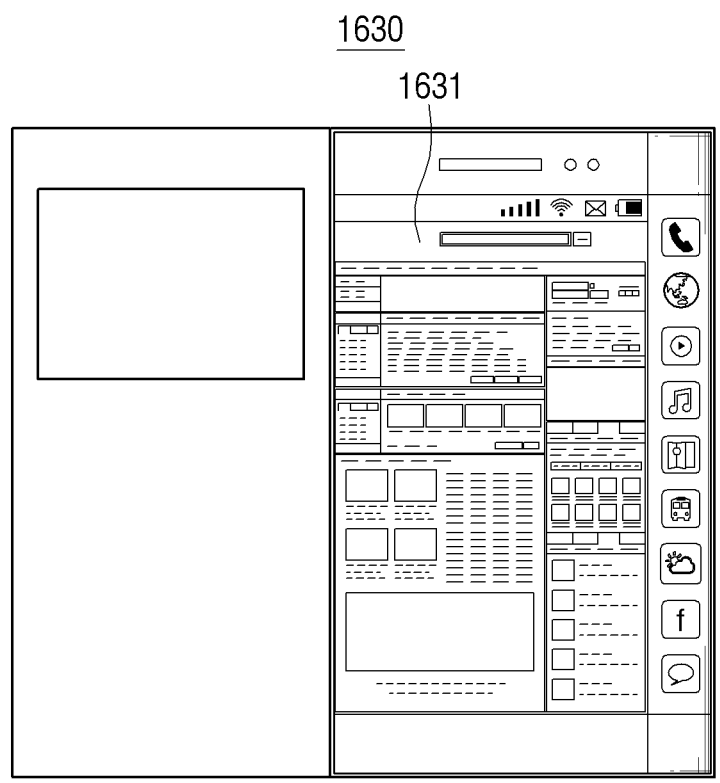

Referring to 1610 of FIG. 16A, in a state that an application identification information list that includes web application identification information 1612-1 is displayed on an exposed display region 1612, the sensor 180 may sense the user input for selecting the web application identification information 1612-1. The user input may be, for example, a touch drag gesture which touches the web application identification information 1612-1 and then drags the touch up to a predetermined position. Here, the predetermined position is a position that corresponds to the permeation region of the cover, and may be a position that is closest to the center of a display region 1611 that corresponds to the transparent region in the exposed region. In response to the user input, as shown as 1620 of FIG. 16A, the controller 190 may display information related to the web application on the display region 1611 that corresponds to the transparent region. The information related to the web application may include, for example, a plurality of pieces of web page identification information. The web page identification information may include, for example, at least one of a web page image, web page link information, and a web page name. In a state that the plurality of pieces of web page identification information are displayed, the sensor 180 may sense a user input for selecting one piece of web page identification information 1611-1 among the plurality of pieces of web page identification information. The user input may be, for example, a tap gesture that touches one piece of web page identification information 1611-1. In a state that one piece of web page identification information 1611-1 is touched, the sensor 180 may sense a user input for opening the cover so that the display region is entirely exposed. In response to the user input, as shown as 1630 of FIG. 16B, the controller 190 may control the display 130 so that a web page that corresponds to the one piece of web page identification information 1611-1 is displayed on a display region 1630 that was covered by the cover.

Figure 17:
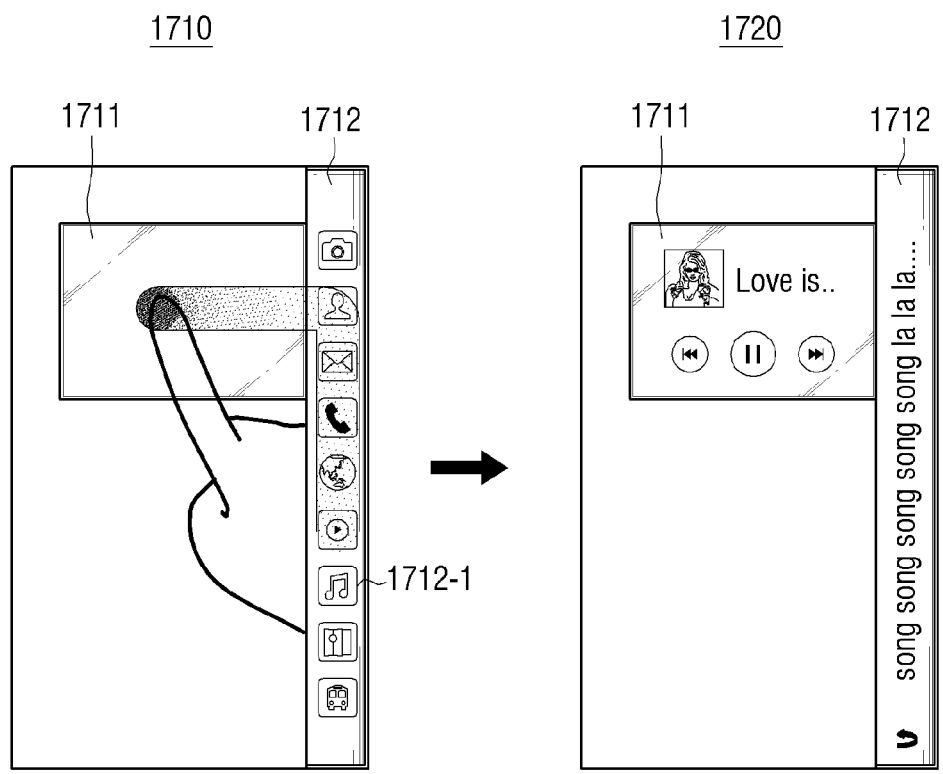

Referring to 1710 of FIG. 17, in a state that an application identification information list that includes music application identification information 1712-1 is displayed on an exposed display region 1712, the sensor 180 may sense the user input for selecting the music application identification information 1712-1. The user input may be, for example, a touch drag gesture that touches the music application identification information 1712-1 and then drags the touch up to a predetermined position to release the touch. Here, the predetermined position may be a display region 1711 that corresponds to the transparent region of the cover. In response to the user input, as shown as 1720 of FIG. 17, the controller 190 may automatically reproduce music content and control the display 130 so that a UI element that can control the music content or information related to the music content (e.g., image or music title) is displayed on the display region 1711 that corresponds to the transparent region of the cover. Here, the reproduced music content may be, for example, music content recently reproduced by a user or music content pre-designated by the user. Further, the controller 190 may control the display 130 so that other information related to the music content (e.g., music title, music lyrics, or a composer) is also displayed on the exposed display region 1712.

Figure 18:
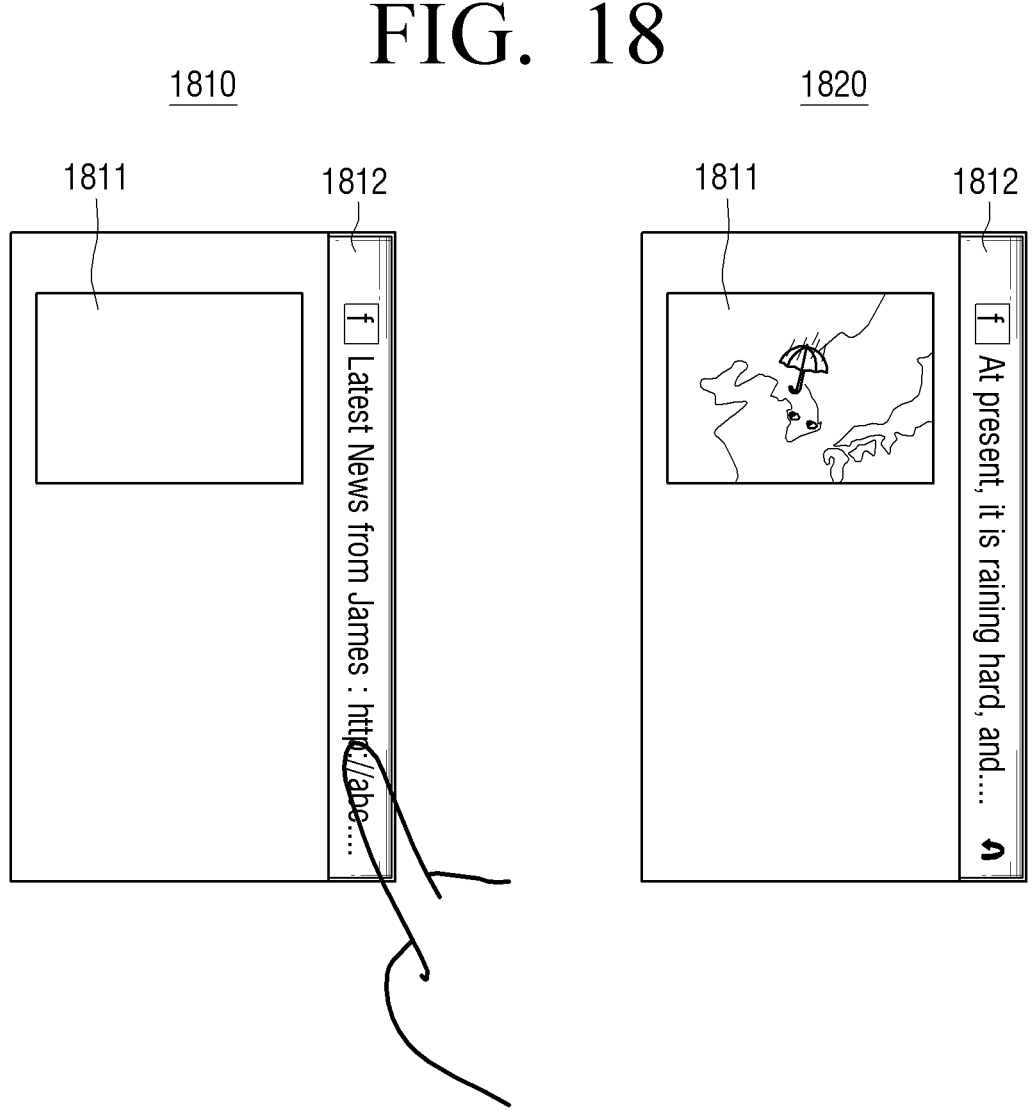

Referring to 1810 of FIG. 18, in a state where a message (e.g., SNS message) is displayed on an exposed display region 1812, the sensor 180 may sense a user input for selecting the message. In this case, if the message is connected to content or content identification information, as shown as 1820 of FIG. 18, the controller 190 may control the display 130 so that the content connected to the message is displayed on a display region 1811 that corresponds to the transparent region in response to the user input. For example, if the content connected to the message is an image, the controller 190 may control the display 130 so that the connected image is displayed on the display region 1811 that corresponds to the transparent region. In this case, the controller 190 may control the display 130 so that additional information related to the content (e.g., the source of the content, the title of the content, and an author of the content) or the message contents are displayed on the exposed display region 1812.

Figure 20:
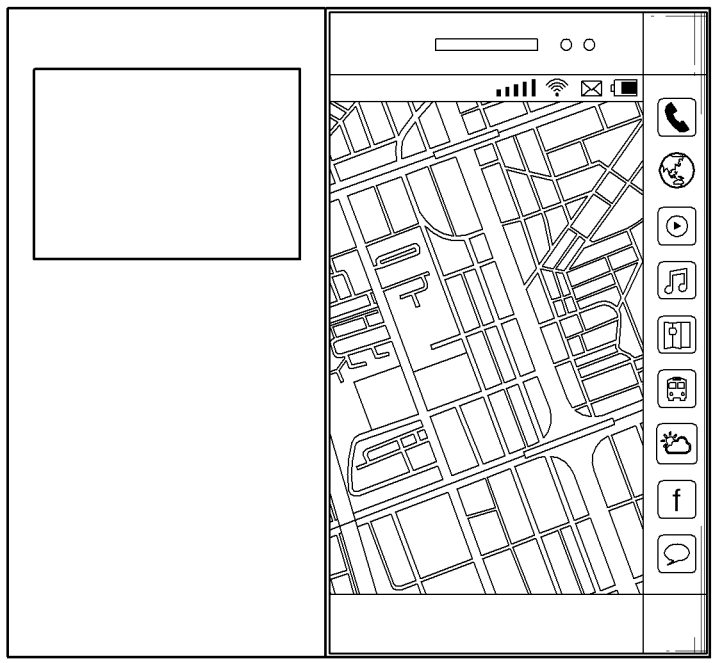

Referring to 1910 of FIG. 19, while an application list that includes identification information of one application (e.g., map application) is displayed, the sensor 180 may sense a user input for selecting identification information 1912-1 of one application. In response to the user input, as shown as 1920 of FIG. 19, the controller 190 may control the display so that video content (e.g., map image) related to one application is displayed on a display region 1911 that corresponds to the transparent region. In this case, the controller 190 may control the display 130 so that the video content is not displayed on a front display region, except for the display region 1911 that corresponds to the transparent region. Further, the controller 190 may control the display 130 so that a front display region that is covered by the cover, except for the display region 1911 that corresponds to the transparent region, is deactivated. While the video content is displayed, the sensor 180 may sense a user input for opening the cover. In response to the user input, as shown in FIG. 20, the controller 190 may control the display so that information related to the video content is displayed on the front display region. The information related to the video content may be, for example, at least one of enlarged video content, other video content connected to the video content, detailed information of the video content, and a map image of an adjacent region in the case where the video content is the map image.

As still another exemplary embodiment, in the case that notification information is acquired in a state that a display region is covered by the cover, the controller 190 may control the display 130 to display the notification information on a display region that is exposed to an outside of the cover.

Further, in the case that the portable terminal 100 is provided with a curved display, the controller 190 may control the display 130 to display the notification information on a side display region. In this case, the portable terminal 100 may be provided with or may not be provided with the cover.

Conventionally, the notification information is displayed on a predetermined region (e.g., upper end of the display region) of the front display region of the portable terminal. According to exemplary embodiments of the present disclosure, the notification information is displayed on the side display region, and thus more information can be displayed.

Referring to 2110 of FIG. 21, the controller 190 may control the display 130 so that the notification information is displayed on a side display region 2112. In this case, the notification information may be displayed in a horizontal text mode or in a vertical text mode according to predetermined information or a user setting. Further, in the case that a plurality of pieces of notification information are provided, the pieces of notification information may be automatically aligned in predetermined priority order or may be aligned from top to bottom or from bottom to top in the order of their occurrence.

The sensor 180 may sense a user input for controlling the display of the notification information. The user input may be, for example, a touch drag gesture that touches the side display region 2112, drags the touch, and then releases the touch on the front display region 2111. In response to the user input, as shown as 2120 of FIG. 21, the controller 190 may control the display 130 so that detailed information of the notification information and other notification information are displayed on the front display region 2111 together with sliding animation effects. Further, as shown as 2130 of FIG. 21, the controller 190 may control the display 130 so that the detailed information of the notification information and other notification information are displayed on the whole of the front display region 2111. In this case, the detailed information of the notification information may include at least one of a UI element that indicates the state of the portable terminal 100 related to the notification information, a UI element that can change the state of the portable terminal 100, and a UI element that indicates identification information of the notification information. For example, upon selection of one 2131-1 of the UI elements that can change the state of the portable terminal 100, the state of the portable terminal 100 may be changed from a non-power saving mode to a power saving mode.

As described above, in the case that the frequently used notification information is displayed using the side display region 2112, a user can easily select the notification information if needed, and easily confirm the detailed information of the notification information through the front display region 2111.

Figure 22:
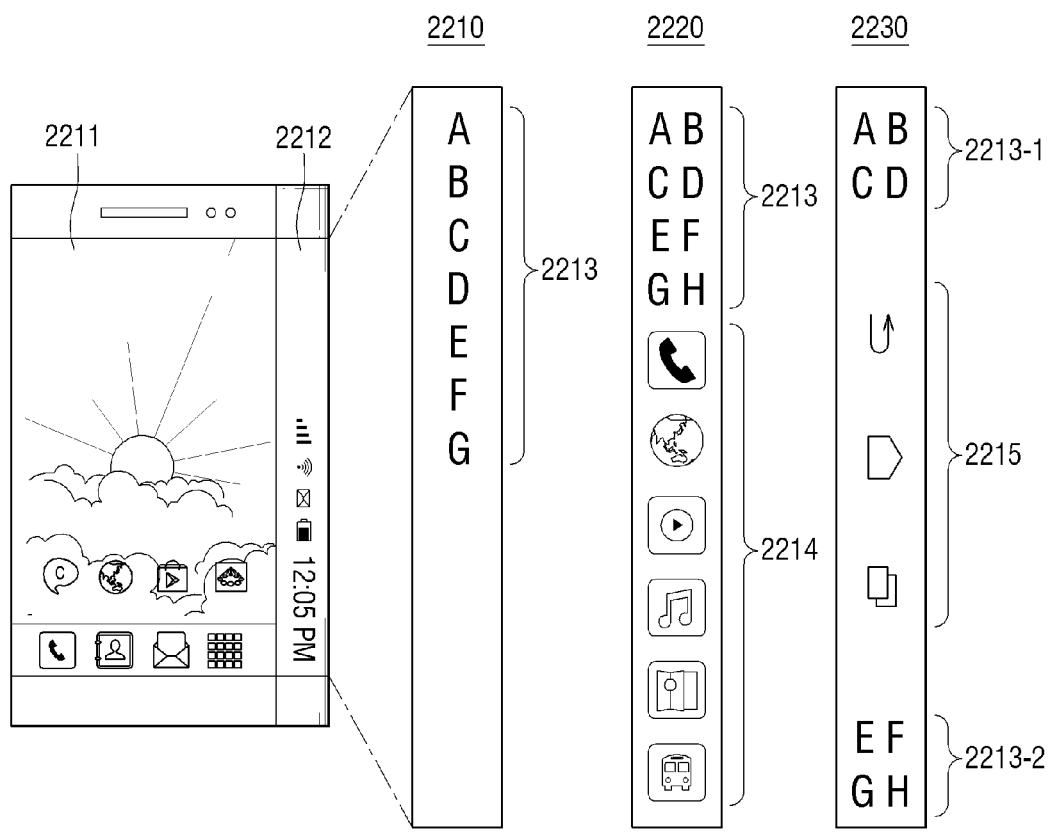

Referring to FIG. 22, the controller 190 may control the display 130 so that the notification information can be displayed on the side display region 2212 in various shapes. As one example, referring to 2210 of FIG. 22, only notification information 2213 can be displayed on the side display region 2212. As another example, referring to 2220 of FIG. 22, the notification information 2213 and application identification information 2214 can be displayed together on the side display region 2212. In this case, because the display region of the notification information 2213 is reduced, the notification information 2213 may be arranged to be displayed in 2 or 3 lines, or a simplified UI element may be displayed instead of the notification information 2213. As still another example, referring to 2230 of FIG. 22, pieces of notification information 2213-1 and 2213-2, a screen being displayed, and/or a UI element 2215 that can control the content being displayed may be displayed on the side display region 2212. The UI element may be, for example, a soft key 2215. The soft key may be a key that controls the screen displayed on the display region in replacement of the existing physical button. The soft key may include at least one of a soft key for executing a home screen, a soft key for displaying a menu related to the screen being displayed, and a soft key for returning to the previous screen of the screen being displayed. In this case, the pieces of notification information 2213-1 and 2213-2 may be separated into an upper end and a lower end around the UI element, such as the soft key, to be displayed.

Figure 23:
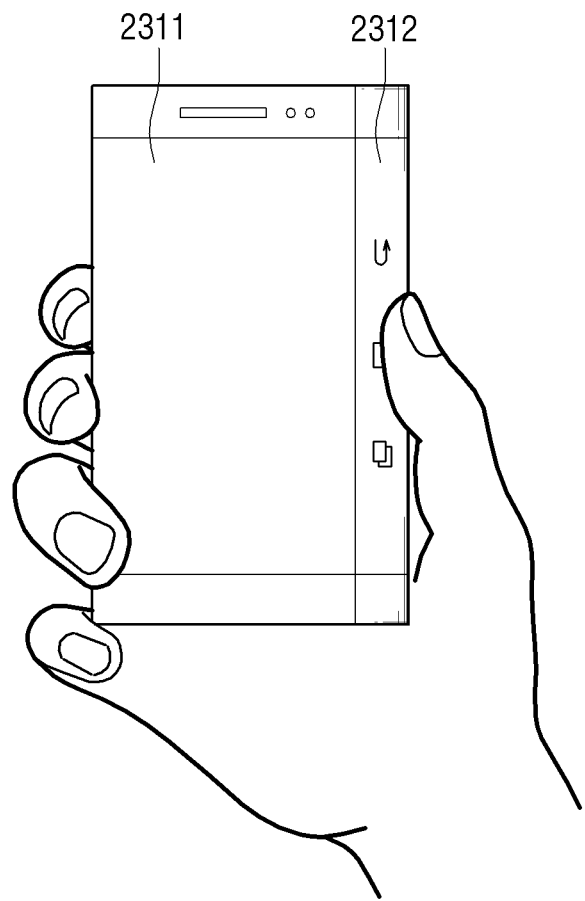

Referring to FIG. 23, the controller 190 may control the display 130 so that a soft key is displayed on a side display region 2312. If the soft key is displayed on the side display region 2312 as described above, a user can easily and rapidly control the screen being displayed using the soft key. According to the existing portable terminal 100 having no side display region, the soft key is positioned at the lower end of the front display region of the portable terminal 100, and thus information on the display region may be partially hidden or omitted. Further, according to the existing portable terminal 100 having no side display region, a user operates the soft key with one hand to cause difficulty in use. In particular, as the display region becomes larger, the user may experience great difficulty in selecting the soft key at the lower end of the front display region using one hand.

While the soft key is displayed on the side display region 2312, the sensor 180 may sense a user input for selecting a soft key to execute the soft key function. In this case, because the user can easily touch the side display region 2312 due to the physical characteristics thereof, the sensor 180 can consider malfunction that occurs during the touch. For example, an input sensor may be used in the sensor 180, and if the soft key is pressed over predetermined pressure, the sensor 180 may determine that the soft key is selected. Further, if the soft key is touched over a predetermined time, the sensor 180 may determine that the soft key is selected. Further, if a user input is sensed, which successively touches the soft key within a predetermined time (e.g., 1 to 3 seconds) after the soft key is displayed on the side display region 2312 through a user's touch drag, the sensor 180 may determine that the soft key is selected.

Figure 24:
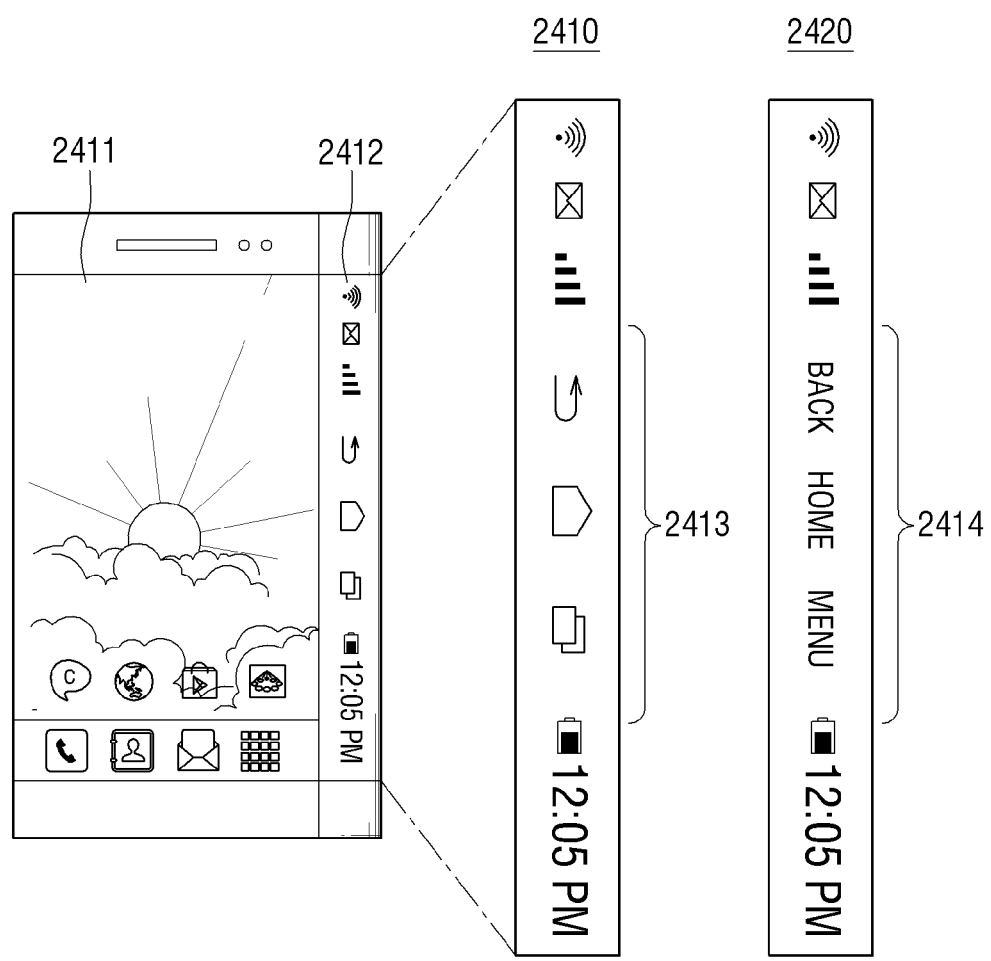

FIG. 24 shows examples of screens displayed on a side display region 2412. Because the vertical length of the side display region 2412 is about 1.5 to 2 times longer than the horizontal length of the front display region 2412, various pieces of information, which are traditionally displayed on different regions of the front display region of the portable terminal, can be provided together through the side display region. For example, the notification information and the soft key are displayed at the upper end and the lower end of the front display region of the conventional portable terminal. However, according to an exemplary embodiment of the present disclosure, as shown as 2410 of FIG. 24, objects 2413 that indicate the soft key may be displayed in the center of the side display region 2412, and pieces of notification information may be displayed at the lower end and the upper end of the soft key. Further, referring to 2420 of FIG. 24, texts 2414 that indicate the soft key are displayed in the center of the side display region 2412, and the notification information may be displayed at the lower end and the upper end of the soft key.

Figure 25A:
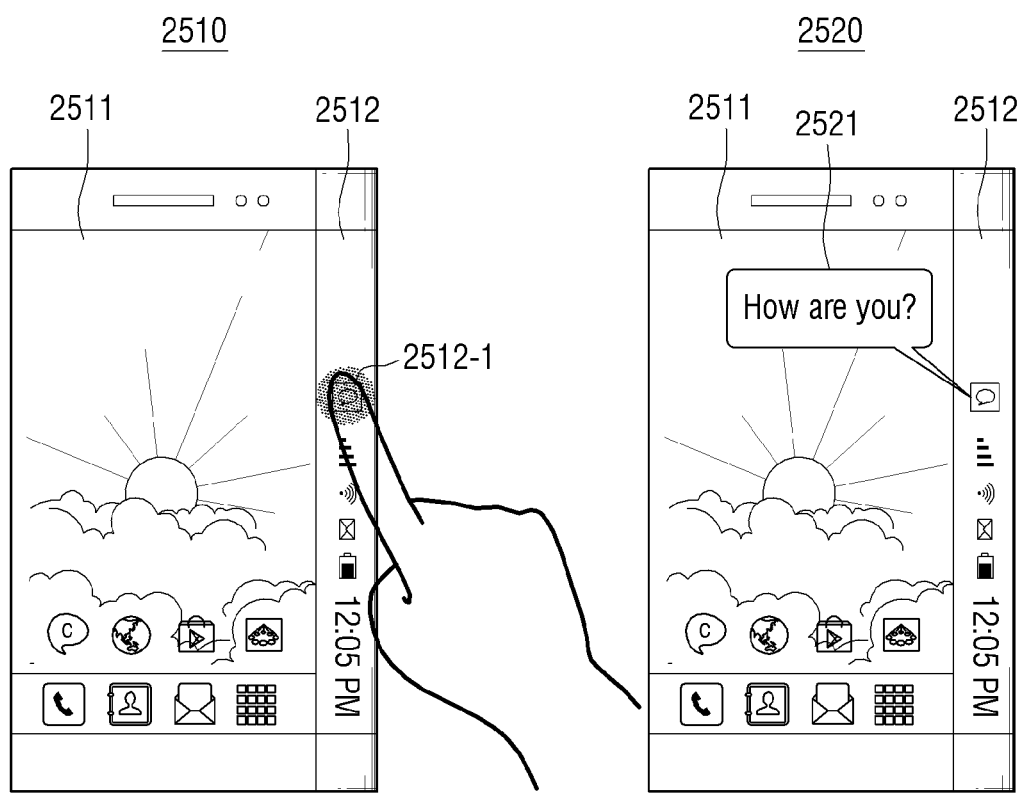
Figure 25B:

Referring to 2510 of FIG. 25A, in the case that notification information is displayed on a side display region 2512, the sensor 180 may sense a user input for selecting one piece of notification information 2512-1 among pieces of notification information. The user input may be, for example, a tap gesture that touches one piece of notification information 2512-1 or a flick gesture that flicks one piece of notification information 2512-1 in a direction in which a front display is positioned. In response to the user input, as shown as 2520 of FIG. 25A, the controller 190 may control the display 130 so that detailed information 2521 of the notification information is displayed on a front display region 2511. For example, if the notification information is an icon that indicates that a message has been received, the detailed information 2521 of the notification information may be the text of the message or the title of the message. Further, as shown as 2530 of FIG. 25B, in the case that the front region of the portable terminal 100 is covered by the cover that has the transparent region, the controller 190 may control the display 130 so that the detailed information 2521 of the notification information is displayed on a display region 2531 that corresponds to the transparent region.

FIGS. 26A to 27B are views explaining user interactions using the palm of the hand on a side display region according to an exemplary embodiment of the present disclosure.

As one example, various user inputs using a side display region may be considered.

In this case, the frequency of touching a front display region of the portable terminal 100 is reduced, and thus the front display region may be less polluted.

In particular, if a user input on a front display region using the palm of the hand is replaced by a user input on a side display, the pollution of the front display region can be reduced. Further, because the side of the front display region and the side display region are divided with predetermined curvature, it is difficult for the palm of the hand on the side display region to reach the front display region.

Further, if a touch area of the palm of the hand on the front display region is not sufficiently large, it becomes difficult to discriminate between the touch of the palm of the hand and a finger touch to cause the occurrence of malfunction. If the user input using the palm of the hand is performed on the side display region, the palm of the hand can cover the whole width of the side display region, and thus probability of occurrence of malfunction can be reduced.

In an exemplary embodiment of the present disclosure, the display 130 that is combined with the sensor 180 may be provided on the side surface of the portable terminal 100, or only the sensor 180 may be provided without the display 130. Further, a part of the side surface of the portable terminal 100 may be provided with the sensor 180 only, and another part thereof may be provided with the display 130 only.

Figure 26A:
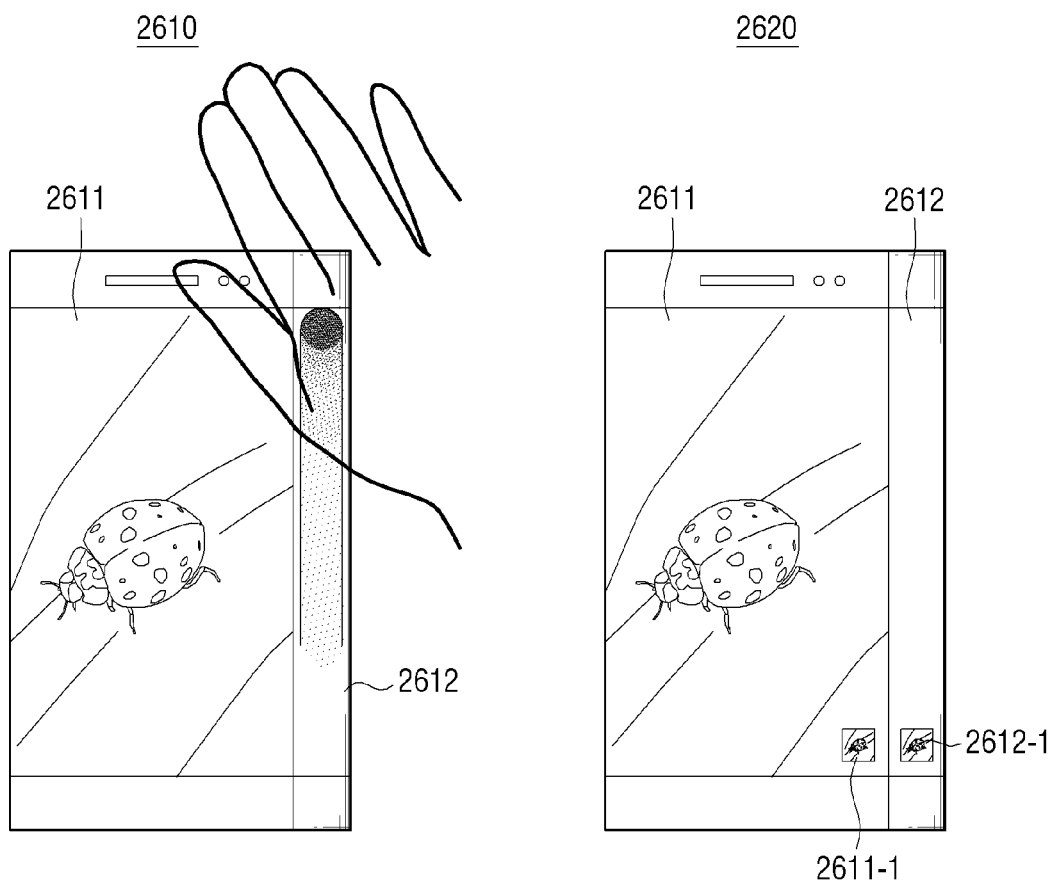
FIGS. 26A to 27B are views illustrating user interactions using the palm of a hand on a side display region according to exemplary embodiments of the present disclosure.

As shown as 2610 of FIG. 26A, while a screen that includes video content is displayed on a front display region 2611, the sensor 180 may sense a user gesture that drags from bottom to top along the long side using the palm of the hand on the side display region 2612. In response to the user gesture, as shown as 2620 of FIG. 26A, the controller 190 may capture a screen that is being displayed on the front display region 2611. Further, the controller 190 may control the display 130 so that thumbnails 2611-1 and 2612-1 of the capture image are displayed on one side of the front display region 2611 or on the side display region 2612.

Figure 26B:
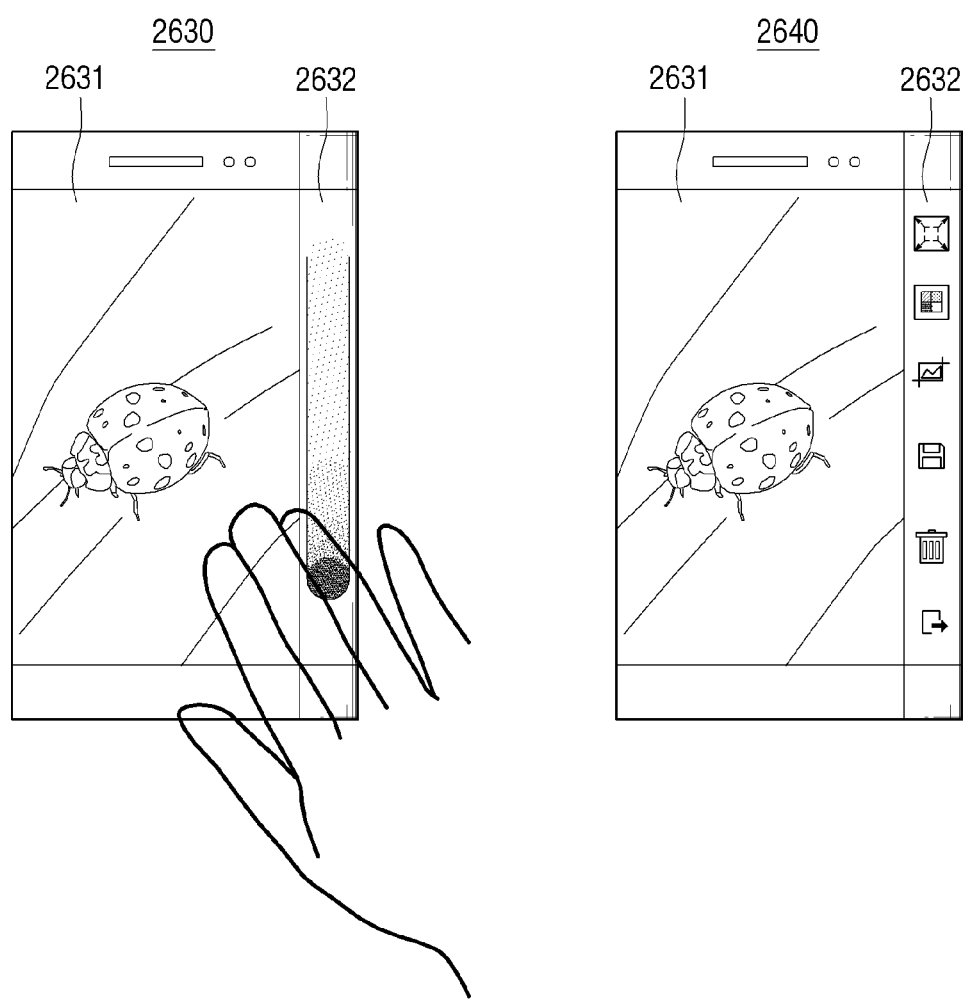

As shown as 2630 of FIG. 26B, while a screen that includes video content is displayed on a front display region 2631, the sensor 180 may sense a user gesture that drags from top to bottom along the long side using the palm of the hand on a side display region 2632. In response to the user gesture, the controller 190 may capture a screen that is being displayed on the front display region 2631, and may control the display 130 so that the captured image is continuously displayed on the front display region 2631. Further, the controller 190 may control the display 130 so that a UI element, which can edit the captured image, is displayed on the side display region 2632. The UI element may include, for example, at least one of a UI element for adjusting the size of the captured image, a UI element for editing colors of the captured image, a UI element for applying a filter effect to the captured image, a UI element for adding information to the captured image, a UI element for storing the captured image, and a UI element for deleting the captured image without storing the same.

As described above, the controller 190 may control the display 130 so that UI elements that provide different functions are displayed on the side region along the drag direction of the side region using the palm of the hand. As another example, even in the case of using a finger, rather than the palm of the hand, the controller 190 may control the display 130 so that the UI elements that provide different functions are displayed on the side region along the drag direction.

Figure 27A:
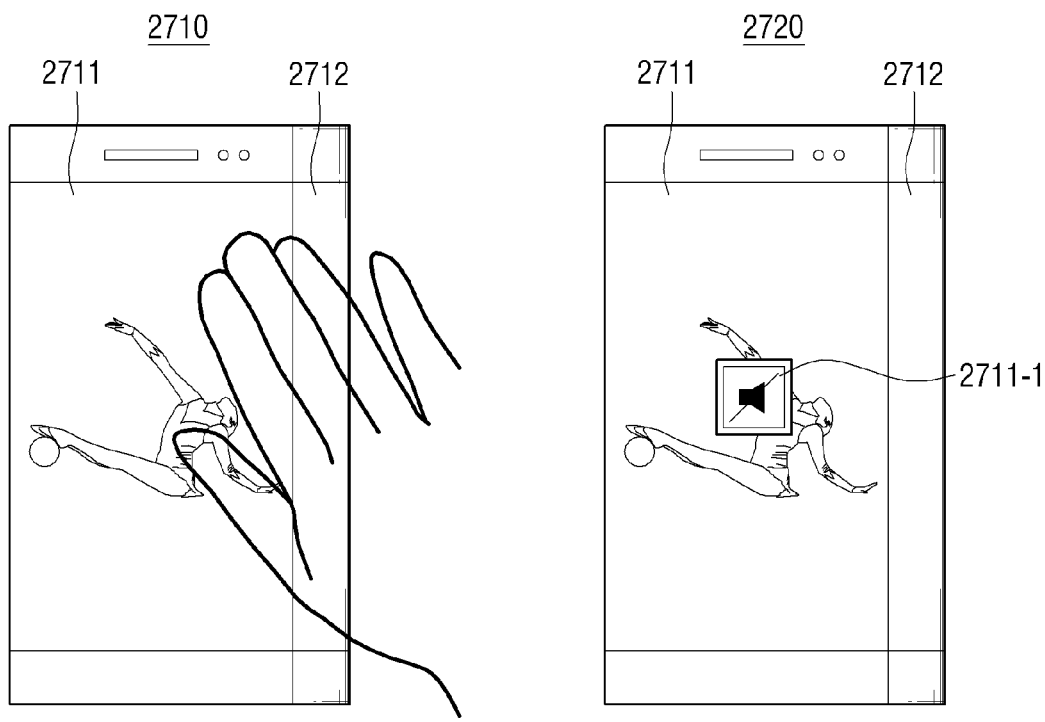

As shown as 2710 of FIG. 27A, while the portable terminal 100 outputs sound at a first level, the sensor 180 may sense a user gesture that hides a side display region 2712 with the palm of the hand or drags in a predetermined direction on the side display region 2712. In response to the user gesture, as shown as 2720 of FIG. 27A, the controller 190 may mute the sound being output and control the display 130 so that notification information 2711-1 indicating that the sound has been muted is displayed. Further, the controller 190 may lower the level of the sound being output from the first level to a second level.

Figure 27B:
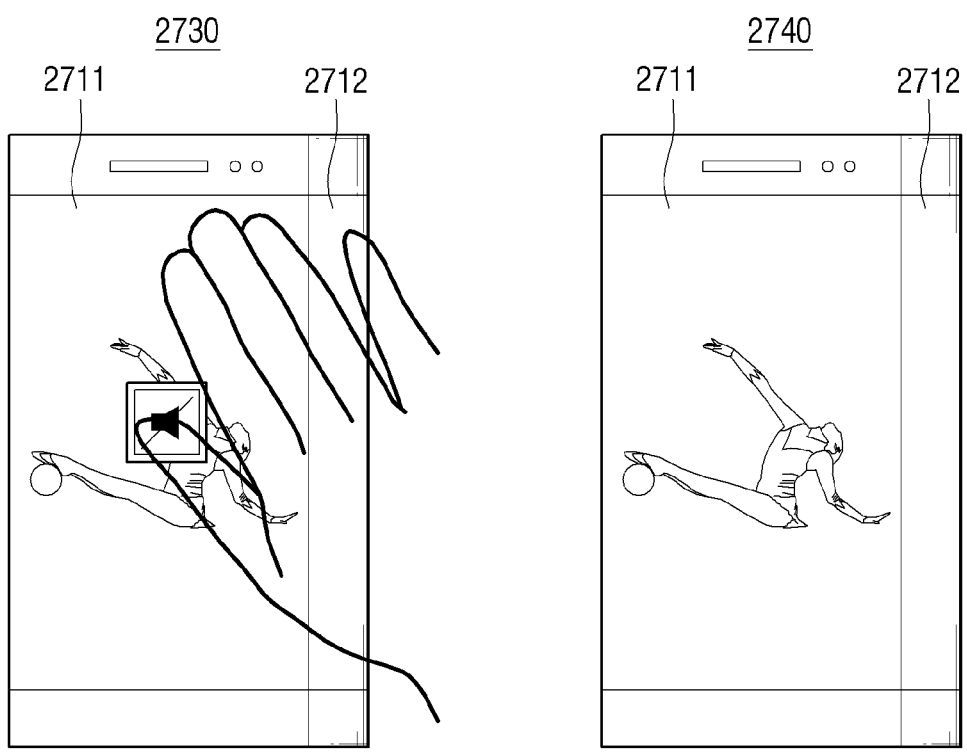

As shown as 2730 of FIG. 27B, while the sound being output is muted in the portable terminal 100, the sensor 180 may sense a user gesture, which hides a side display region 2712 with the palm of the hand or drags in a predetermined direction, on the side display region 2712. In response to the user gesture, as shown as 2740 of FIG. 27B, the controller 190 may output the sound at the level before the sound is muted. Further, the controller 190 may output the sound at a predetermined third level.

Figure 28:
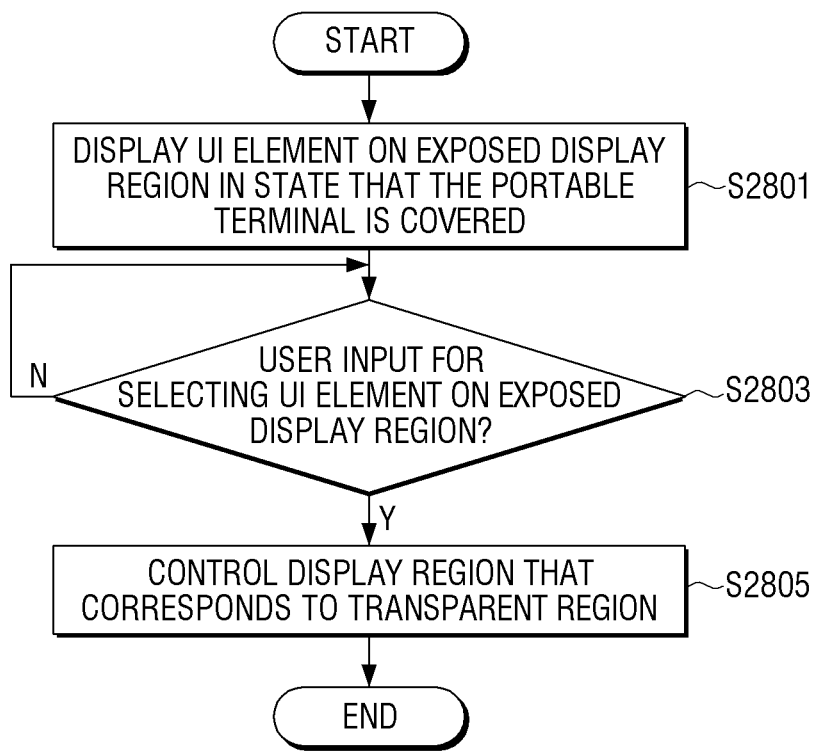
FIGS. 28 to 30 are flowcharts illustrating methods of displaying information according to exemplary embodiments of the present disclosure.
Figure 29:
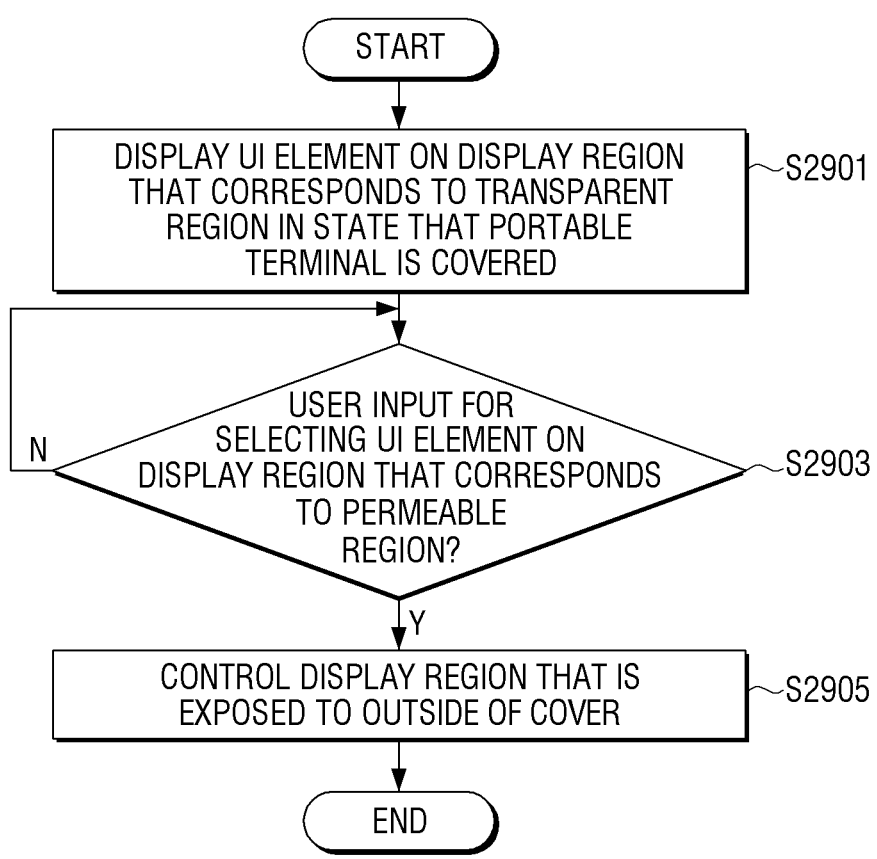
Figure 30:
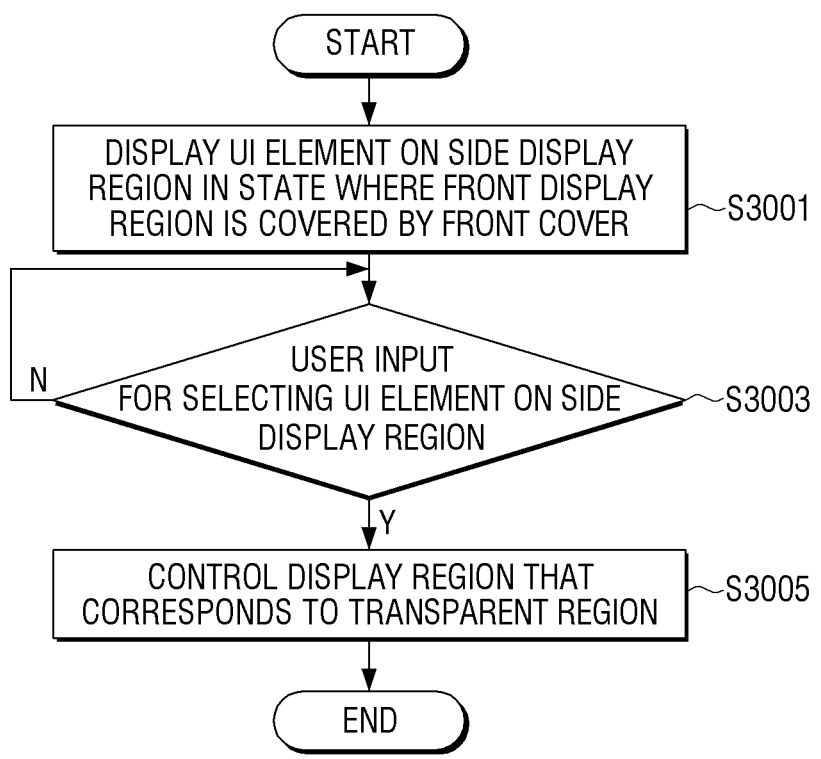

FIGS. 28 to 30 are flowcharts explaining various display methods according to the present disclosure.

Referring to FIG. 28, a portable terminal 100 may display a UI element on an exposed display region in a state that a part of the display region is covered by a cover including a transparent region to be exposed (S2801). Then, while the UI element is displayed on the exposed display region, the portable terminal 100 may determine whether a user input for selecting the UI element is sensed (S2803). The user input may be, for example, at least one of a tap gesture that touches the UI element and then releases the touch, a flick gesture that touches the UI element and then flicks the touched UI element in a direction in which the cover is positioned, a drag gesture that touches the UI element and then drags the touched UI element to the transparent region, and a drag gesture that touches the UI element and then drags the touched UI element from the exposed display region to a position that corresponds to the transparent region of the cover.

If the user input is sensed as the result of the determination (S2803-Y), the portable terminal may control the display region that corresponds to the transparent region (S2805). For example, the portable terminal 100 may display information about an execution of an application related to the UI element on the display region that corresponds to the transparent region.

Referring to FIG. 29, a portable terminal 100 may display a UI element on a display region that corresponds to a transparent region in a state that a part of the display region is covered by a cover including the transparent region to be exposed to an outside of the cover (S2901). While the UI element is displayed on the display region that corresponds to the transparent region, the portable terminal 100 may determine whether a user input for selecting the UI element is sensed (S2903).

If the user input is sensed as the result of the determination (S2903-Y), the portable terminal 100 may control the display region that is exposed to the outside of the cover (S2905). For example, the portable terminal 100 may display another UI element that can control information related to the UI element on the display region that is exposed to the outside of the cover.

Referring to FIG. 30, a portable terminal 100 may display a UI element on a side display region in a state where a front display region is covered by a front cover including a transparent region (S3001). While the UI element is displayed on the side display region, the portable terminal 100 may determine whether a user input for selecting the UI element is sensed (S3003).

If the user input is sensed as the result of the determination (S3003-Y), the portable terminal 100 may control a display region that corresponds to the transparent region (S3005). For example, the portable terminal 100 may display information about the execution of an application related to the UI element on the display region that corresponds to the transparent region.

Figure 31:
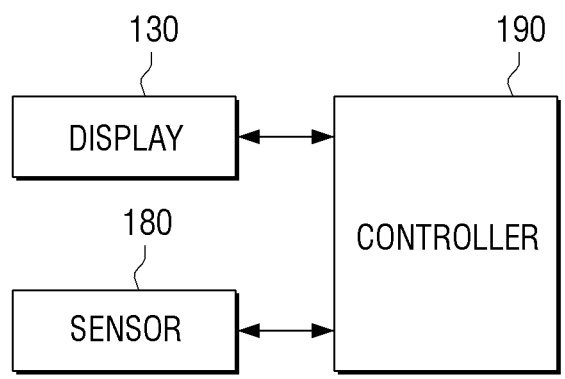
FIG. 31 is a block diagram illustrating the configuration of a portable terminal according to an exemplary embodiment of the present disclosure.

FIG. 31 is a block diagram illustrating the configuration of a portable terminal according to an exemplary embodiment of the present disclosure.

Referring to FIG. 31, a portable terminal 100 includes a display 130, a sensor 180, and a controller 190. Because the configurations of the display 130, the sensor 180, and the controller 190 have been described, redundant explanation thereof will be omitted.

In an exemplary embodiment, in a state that a part of a display region is covered by a cover that includes a transparent region to be exposed to an outside of the cover, the display 130 may display a UI element on an exposed display region. While the UI element is displayed, the sensor 180 may sense a user input for selecting the UI element. In response to the user input through the sensor 180, the controller 190 may control the display region that corresponds to the transparent region that is provided by the display 130.

In another exemplary embodiment, in a state that a part of a display region is covered by a cover that includes a transparent region to be exposed to an outside of the cover, the display 130 may display a UI element on a display region that corresponds to the transparent region. While the UI element is displayed, the sensor 180 may sense a user input for selecting the UI element. In response to the user input through the sensor 180, the controller 190 may control the display region which is exposed to the outside of the cover and is provided by the display 130.

In still another exemplary embodiment, in a state that a front display region is covered by a front cover including a transparent region, the display 130 may display a UI element on a side display region. While the UI element is displayed, the sensor 180 may sense a user input for selecting the UI element. In response to the user input through the sensor 180, the controller 190 may control the display region that corresponds to the transparent region that is provided by the display 130.

The display methods of the portable terminal 100 according to various exemplary embodiments as described above may be implemented by programs to be provided to the potable terminal 100. Specifically, a non-transitory computer readable medium, which stores a program that includes the display method of the portable terminal 100, may be provided.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a CD, a DVD, a hard disc, a Blu-ray disc, a USB, a memory card, and a ROM. Further, the above-described programs may be stored and provided in the storage 150 of the portable terminal 100 as an example of the non-transitory computer readable medium.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. An electronic apparatus, comprising:
   a front surface;
   a touch display configured to display information on the front surface, the touch display comprising:
      a main area; and
      a curved area, the curved area comprising a curved portion continuously extending from the main area;
   a sensor configured to detect a state of a cover connected to the electronic apparatus, the state of the cover comprising a closing state in which the cover covers the main area and an opening state in which the cover is opened; and
   a central processing unit (CPU) configured to determine, based on a result of the detecting by the sensor, the state of the cover, in response to the cover being covered with the main area, control the touch display to display a user interface (UI) on the curved area which is exposed, in response to a touch input to the UI being received, control the touch display to display information related to the UI on a portion of the main area which is provided through a transparent area of the cover, and in response to the cover being opened, control the touch display to display the information related to the UI on the main area.

2. The electronic apparatus of claim 1, wherein the central processing unit (CPU), while information is being displayed on the portion of the main area, displays a black screen on a remaining area other than the portion of the main area or turns off the remaining area.

3. The electronic apparatus of claim 1, wherein the user interface is a user interface for controlling an application displayed on the portion of the main area.

4. The electronic apparatus of claim 1, wherein the central processing unit (CPU), in response to a touch input being received on the portion of the main area, controls the touch display to display information provided from an application displayed on the portion of the main area on the curved area.

5. A method for controlling an electronic apparatus, the electronic apparatus comprising a front surface, a touch display configured to display information on the front surface, the touch display comprising a main area and a curved area, and the curved area comprising a curved portion continuously extending from the main area, the method comprising:
   detecting a state of a cover connected to the electronic apparatus, the state of the cover comprising a closing state in which the cover covers the main area and an opening state in which the cover is opened;
   in response to the cover being covered with the main area, displaying a user interface (UI) on the curved area which is exposed;
   in response to a touch input to the UI being received, displaying information related to the UI on a portion of the main area which is provided through a transparent area of the cover; and
   in response to the cover being opened, displaying to the information related to the UI on the main area.

6. The method of claim 5, further comprising:
   while information is being displayed on the portion of the main area, displaying a black screen on a remaining area other than the portion of the main area or turns off the remaining area.

7. The method of claim 5, wherein the user interface is a user interface for controlling an application displayed on the portion of the main area.

8. The method of claim 5, wherein further comprising:
   in response to a touch input being received on the portion of the main area, displaying information provided from an application displayed on the portion of the main area on the curved area.

* * * * *